US012679763B2

(12) United States Patent
Li et al.

(10) Patent No.: US 12,679,763 B2
(45) Date of Patent: *Jul. 14, 2026

(54) GLASS COMPOSITIONS, FIBERIZABLE GLASS COMPOSITIONS, AND GLASS FIBERS MADE THEREFROM

(71) Applicant: Electric Glass Fiber America, LLC, Shelby, NC (US)

(72) Inventors: Hong Li, Stanley, NC (US); Paul A. Westbrook, Shelby, NC (US)

(73) Assignee: Electric Glass Fiber America, LLC, Shelby, NC (US)

( * ) Notice: Subject to any disclaimer, the term of this patent is extended or adjusted under 35 U.S.C. 154(b) by 4 days.

This patent is subject to a terminal disclaimer.

(21) Appl. No.: 18/422,112

(22) Filed: Jan. 25, 2024

(65) Prior Publication Data

US 2024/0158289 A1     May 16, 2024

Related U.S. Application Data

(63) Continuation of application No. 16/950,491, filed on Nov. 17, 2020, now Pat. No. 11,905,199, which is a continuation of application No. 15/926,519, filed on Mar. 20, 2018, now Pat. No. 10,870,602, which is a continuation of application No. 14/848,656, filed on Sep. 9, 2015, now Pat. No. 9,957,191.

(60) Provisional application No. 62/047,967, filed on Sep. 9, 2014.

(51) Int. Cl.
| | |
|---|---|
| *C03C 3/095* | (2006.01) |
| *C03C 3/087* | (2006.01) |
| *C03C 3/091* | (2006.01) |
| *C03C 3/097* | (2006.01) |
| *C03C 13/00* | (2006.01) |

(52) U.S. Cl.
CPC .............. *C03C 13/00* (2013.01); *C03C 3/087* (2013.01); *C03C 3/091* (2013.01); *C03C 3/095* (2013.01); *C03C 3/097* (2013.01)

(58) Field of Classification Search
CPC ......... C03C 3/085; C03C 3/095; C03C 3/097; C03C 13/00; C03C 13/001; C03C 13/06
See application file for complete search history.

(56) References Cited

U.S. PATENT DOCUMENTS

| | | | |
|---|---|---|---|
| 3,804,646 A | 4/1974 | Dumbaugh | |
| 4,102,692 A | 7/1978 | Schartau et al. | |
| 4,542,106 A | 9/1985 | Sproull | |
| 5,789,329 A | 8/1998 | Eastes et al. | |
| 6,358,873 B1 | 3/2002 | Stewart | |
| 6,818,575 B2 | 11/2004 | Wallenberger | |
| 9,278,883 B2 * | 3/2016 | Li | C03C 3/095 |
| 9,957,191 B2 * | 5/2018 | Li | C03C 3/091 |
| 10,035,727 B2 * | 7/2018 | Li | C03C 3/095 |
| 10,065,883 B2 * | 9/2018 | Li | C03C 13/00 |
| 10,870,602 B2 * | 12/2020 | Li | C03C 13/00 |
| 10,906,835 B2 * | 2/2021 | Li | C03C 13/00 |
| 11,905,199 B2 * | 2/2024 | Li | C03C 13/00 |
| 2003/0181309 A1 | 9/2003 | Kunert et al. | |
| 2003/0184211 A1 | 10/2003 | Hueber et al. | |
| 2005/0085370 A1 | 4/2005 | Fechner et al. | |
| 2007/0042894 A1 | 2/2007 | Aitken et al. | |
| 2012/0135849 A1 | 5/2012 | Hoffman et al. | |
| 2012/0163987 A1 | 6/2012 | Hausrath et al. | |
| 2016/0068428 A1 | 3/2016 | Li et al. | |
| 2016/0152514 A1 | 6/2016 | Li et al. | |
| 2021/0147283 A1 * | 5/2021 | Li | C03C 13/00 |

FOREIGN PATENT DOCUMENTS

| | | | | |
|---|---|---|---|---|
| CN | 101243018 A | 8/2008 | | |
| CN | 101580344 A | 11/2009 | | |
| CN | 101691278 A | 4/2010 | | |
| CN | 102276153 A | 12/2011 | | |
| CN | 102690058 A | 9/2012 | | |
| CN | 102786223 A | * 11/2012 | | C03C 1/00 |
| CN | 102849958 A | 1/2013 | | |
| CN | 103086605 A | * 5/2013 | | |
| CN | 102306708 B | 11/2013 | | |
| CN | 103781736 A | 5/2014 | | |
| CN | 104591541 A | 5/2015 | | |
| CN | 104743887 A | 7/2015 | | |
| CN | 106795040 A | 5/2017 | | |
| EP | 1900699 A1 | 3/2008 | | |
| EP | 2017236 A1 | 1/2009 | | |
| EP | 2351716 A1 | * 8/2011 | | C03C 3/087 |
| EP | 3191421 A1 | 7/2017 | | |
| EP | 2630094 B1 | 7/2020 | | |
| FR | 89522 E | 7/1967 | | |

(Continued)

OTHER PUBLICATIONS

"Assignment Recorded at the USPTO for U.S. Appl. No. 14/848,656", Nov. 17, 2015, 8 pages.
"Certified Copy of U.S. Appl. No. 62/047,967", Sep. 9, 2014, 90 pages.
"Machine Translation of CN 101580344", Nov. 18, 2009, 13 pages.
"Machine Translation of CN 101691278", Apr. 7, 2010, 15 pages.
"Machine Translation of CN 102276153", Dec. 14, 2011, 12 pages.
"Machine Translation of CN 102786223", Nov. 21, 2012, 11 pages.
"Machine Translation of CN 102849958", Jan. 2, 2013, 12 pages.
"Machine Translation of CN 103086605", May 8, 2013, 17 pages.

(Continued)

*Primary Examiner* — Elizabeth A. Bolden

(74) *Attorney, Agent, or Firm* — Kilpatrick Townsend & Stockton, LLP

(57) ABSTRACT

Embodiments of the present invention provide glass compositions, fiberizable glass compositions, and glass fibers formed from such compositions, as well as glass strands, yarns, fabrics, and composites comprising such glass fibers adapted for use in various applications. In some embodiments of the present invention, the glass compositions additionally include at least one rare earth oxide.

20 Claims, 3 Drawing Sheets

(56)                References Cited

FOREIGN PATENT DOCUMENTS

| GB | 1147718 A | 4/1969 | | |
| GB | 2233643 A | 1/1991 | | |
| JP | 11232628 A | 8/1999 | | |
| JP | 2001048572 A | 2/2001 | | |
| JP | 2009504563 A | 2/2009 | | |
| JP | 2011105554 A | 6/2011 | | |
| JP | 2011105555 A | 6/2011 | | |
| JP | 2011232628 A | 11/2011 | | |
| JP | 2017526607 A | 9/2017 | | |
| TW | 201615585 A | 5/2016 | | |
| WO | 2013036736 A2 | 3/2013 | | |
| WO | WO-2014062715 A1 * | 4/2014 | ............ | C03C 13/06 |
| WO | 2015009686 A1 | 1/2015 | | |
| WO | 2015049101 A1 | 4/2015 | | |

OTHER PUBLICATIONS

"Machine Translation of CN 104591541 A", May 6, 2015, 19 pages.
"Machine Translation of JP 2011105554 A", Jun. 2, 2011, 3 pages.
"PCT Request Form for PCT/US2015/049101", Sep. 9, 2015, 5 pages.
"WIPO Form IB301 for PCT/US2015/049101", Oct. 1, 2015, 1 page.
U.S. Appl. No. 14/848,656 , Final Office Action, Mailed On Sep. 7, 2017, 11 pages.
U.S. Appl. No. 14/848,656 , Non Final Office Action, Mailed On Feb. 8, 2017, 12 pages.
U.S. Appl. No. 14/848,656 , Notice of Allowance, Mailed On Dec. 29, 2017, 8 pages.
U.S. Appl. No. 15/926,519 , Advisory Action, Mailed On Aug. 5, 2019, 3 pages.
U.S. Appl. No. 15/926,519 , "Corrected Notice of Allowability", Oct. 1, 2020, 2 pages.
U.S. Appl. No. 15/926,519 , Final Office Action, Mailed On Apr. 26, 2019, 10 pages.
U.S. Appl. No. 15/926,519 , Final Office Action, Mailed On Mar. 4, 2020, 8 pages.
U.S. Appl. No. 15/926,519 , Non-Final Office Action, Mailed On Sep. 6, 2019, 7 pages.
U.S. Appl. No. 15/926,519 , Non-Final Office Action, Mailed On Sep. 28, 2018, 9 pages.
U.S. Appl. No. 15/926,519 , Notice of Allowance, Mailed On Aug. 18, 2020, 7 pages.
U.S. Appl. No. 16/950,491 , Non-Final Office Action, Mailed On Oct. 5, 2022, 10 pages.
U.S. Appl. No. 16/950,491 , Notice of Allowance, Mailed On Jun. 16, 2023, 7 pages.
U.S. Appl. No. 16/950,491 , Notice of Allowance, Mailed On Mar. 31, 2023, 7 pages.
Calkins , "Affidavit of Charles W. Calkins", Jul. 12, 2022, 12 pages.
Calkins , "Exhibit A of the Affidavit—Biography", Jul. 12, 2022, 5 pages.
Application No. CN201580048365.4 , Office Action, Mailed On Feb. 25, 2019, 19 pages.
Application No. CN201580048365.4 , Office Action, Mailed On Jul. 17, 2020, 21 pages.
Application No. CN201580048365.4 , Office Action, Mailed On Mar. 10, 2020, 21 pages.
Application No. CN201580048365.4 , Office Action, Mailed On Oct. 12, 2019, 33 pages.
Application No. CN202310142702.2 , Office Action, Mailed On Jul. 2, 2024, 15 pages.
Application No. EP15771328.0 , Interlocutory Decision in Opposition Proceedings, Mailed On May 10, 2024, 26 pages.
Application No. EP15771328.0 , Notice of Decision to Grant, Mailed On Apr. 2, 2020, 1 page.
EP15771328.0 , "Notice of Opposition", Jan. 28, 2021, 21 pages.
EP15771328.0 , "Notice of Opposition", Feb. 18, 2021, 3 pages.
EP15771328.0 , "Observations By Third Parties Pursuant To Article 115 EPC", Aug. 28, 2018, 108 pages.

Application No. EP15771328.0 , Office Action, Mailed On Apr. 16, 2019, 4 pages.
EP15771328.0 , "Summons to Attend Oral Proceedings", Jul. 12, 2023, 15 pages.
EP15771328.0 , "Summons to Attend Oral Proceedings", Oct. 27, 2021, 8 pages.
Hyatt et al., "Glass Properties in the Yttria-Alumina-Silica System", Journal of the American Ceramic Society, vol. 70, No. 10, Oct. 1, 1987, C-283-C-287.
Application No. JP2017-513108 , Notice of Allowance, Mailed On Feb. 26, 2021, 3 pages.
Application No. JP2017-513108 , Office Action, Mailed On Jul. 9, 2020, 11 pages.
Application No. JP2017-513108 , Office Action, Mailed On Aug. 2, 2019, 5 pages.
Application No. JP2020-186520 , Office Action, Mailed On Aug. 3, 2022, 1 page.
Application No. JP2020-186520 , Office Action, Mailed On Nov. 5, 2021, 1 pages.
Application No. JP2022-194231 , Office Action, Mailed On Oct. 17, 2023, 1 page.
Application No. JP2022-194231 , Office Action, Mailed On Jun. 28, 2024, 13 pages.
Application No. JP2022-194231 , Office Action, Mailed On Feb. 17, 2025, 2 pages.
Application No. JP2024-066949 , Office Action, Mailed On Apr. 9, 2025, 1 page.
Li , "Confirmatory Patent Assignment", Jul. 15, 2022, 1 page.
Li , "Employee Agreement", PPG Industries Inc., Jun. 1, 2010, 4 pages.
Li et al., "High-Performance Glass Fiber Development for Composite Applications", International Journal of Applied Glass Science, vol. 5, No. 1, Mar. 2014, pp. 65-81.
Loewenstein , "The Manufacturing Technology of Continuous Glass Fibers", 3rd Edition, Glass Science and Technology, 1993, 119 pages.
Application No. MX/A/2017/002820 , Notice of Allowance, Mailed On Apr. 17, 2023, 3 pages.
Application No. MX/A/2017/002820 , Office Action, Mailed On Nov. 11, 2022, 5 pages.
Application No. PCT/US2015/049101 , International Preliminary Report on Patentability, Mailed On Mar. 23, 2017.
Application No. PCT/US2015/049101 , International Search Report and Written Opinion, Mailed On Nov. 25, 2015, 11 pages.
Shelby , "Introduction to Glass Science and Technology", 2nd Edition, Royal Society of Chemistry, Chapter 9, 2005, 309 pages.
Application No. TW104129822 , Notice of Decision to Grant, Mailed On Apr. 9, 2020, 3 pages.
Application No. TW104129822 , Office Action, Mailed On Jan. 23, 2019, 21 pages.
Application No. TW104129822 , Office Action, Mailed On Jul. 18, 2019, 5 pages.
Application No. TW109123613 , Notice of Decision to Grant, Mailed On Nov. 13, 2020, 3 pages.
Application No. TW109123613 , Office Action, Mailed On Aug. 4, 2020, 5 Pages.
Wallenberger et al., "Glass Fibers", In ASM Handbook, vol. 21, Composites (#06781G), 2001, 9 pages.
Wallenberger et al., "ZnO-Modified High Modulus Glass Fibers", Journal of Non-Crystalline Solids, vol. 152, Nos. 2-3, Feb. 1, 1993, pp. 279-283.
Wang et al., "Structure and properties of soda lime silicate glass doped with rare earth", Physica B: Condensed Matter, vol. 406, No. 2, Jan. 15, 2011.
Westbrook , "Confirmatory Patent Assignment", Jul. 14, 2022, 1 page.
Westbrook , "Employee Agreement", PPG Industries Inc., Apr. 1, 2002, 3 pages.
Westbrook, "Separation Agreement", PPG Industries Inc., Jun. 21, 2015, 4 pages.

(56)          References Cited

OTHER PUBLICATIONS

Zu et al., "Compositional Effects on Mechanical Properties, Viscosity, and Crystallization of (Li2O, B2O3, MgO)-Al2O3—SiO2 Glasses", Journal of Alloys and Compounds, vol. 728, Dec. 25, 2017, pp. 552-563.

* cited by examiner

GLASS COMPOSITIONS, FIBERIZABLE GLASS COMPOSITIONS, AND GLASS FIBERS MADE THEREFROM

CROSS-REFERENCE TO RELATED APPLICATIONS

This application is a continuation of U.S. patent application Ser. No. 16/950,491, filed on Nov. 17, 2020, which is a continuation of U.S. patent application Ser. No. 15/926,519, filed on Mar. 20, 2018, now U.S. Pat. No. 10,870,602, which is a continuation of U.S. patent application Ser. No. 14/848, 656, filed on May 7, 2015, now U.S. Pat. No. 9,957,191, which claims priority to U.S. Provisional Application Ser. No. 62/047,967, filed Sep. 9, 2014, which are each hereby incorporated by reference as though fully set forth herein.

FIELD OF THE INVENTION

The present invention relates to glass compositions and, in particular, to glass compositions for forming fibers.

BACKGROUND OF THE INVENTION

Glass fibers have been used to reinforce various polymeric resins for many years. Some commonly used glass compositions for use in reinforcement applications include the "E-glass", "R-glass", and "D-glass" families of compositions. "S-glass" is another commonly used family of glass compositions that includes, for example, glass fibers commercially available from AGY (Aiken, South Carolina) under the trade name "S-2 Glass."

In reinforcement and other applications, certain mechanical properties of glass fibers or of composites reinforced with glass fibers can be important. However, in many instances, the manufacture of glass fibers having improved mechanical properties (e.g., higher strength, higher modulus, etc.) can result in higher costs due, for example, due to increased batch material costs, increased manufacturing costs, or other factors. For example, the aforementioned "S-2 Glass" has improved mechanical properties as compared to conventional E-glass but costs significantly more as well as a result of substantially higher temperature and energy demands for batch-to-glass conversion, melt fining, and fiber drawing. Fiber glass manufacturers continue to seek glass compositions that can be used to form glass fibers having desirable mechanical properties in a commercial manufacturing environment.

SUMMARY

Various embodiments of the present invention provide glass compositions, fiberizable glass compositions, and glass fibers formed from such compositions, as well as fiber glass strands, yarns, fabrics, and composites comprising such glass fibers adapted for use in various applications.

In one embodiment, a glass composition suitable for fiber forming comprises 56-68 weight percent $SiO_2$, 11 to less than 20 weight percent $Al_2O_3$; 12 weight percent or less CaO; 7-17 weight percent MgO; 0-1 weight percent $Na_2O$; 0-1 weight percent $K_2O$; 0-5 weight percent $Li_2O$; 0-2 weight percent $TiO_2$; 0-3 weight percent $B_2O_3$; 0-1 weight percent $Fe_2O_3$; 0-4 weight percent $SnO_2$; 0-4 weight percent ZnO; at least one rare earth oxide in an amount not less than 0.05 weight percent; and 0-11 weight percent total other constituents. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide is present in an amount of at least 1 weight percent in some embodiments. The at least one rare earth oxide, in some embodiments, is present in an amount of at least 3 weight percent. In some embodiments, the at least one rare earth oxide is present in an amount up to about 15 weight percent. The at least one rare earth oxide, in some embodiments, is present in an amount up to about 8 weight percent. In some embodiments, the at least one rare earth oxide is present in an amount up to about 5 weight percent. In some embodiments, the CaO content is less than about 5 weight percent. The $Na_2O+K_2O+Li_2O$ content is greater than 1 weight percent in some embodiments. The $Na_2O+K_2O$ content, in some embodiments, is less than about 0.5 weight percent. In some embodiments, the $Al_2O_3$ content is between about 14 and about 19 weight percent. MgO is present, in some embodiments, in an amount between about 10 and about 16 weight percent. In some embodiments, $Li_2O$ is present in an amount between about 0.4 and about 2 weight percent. The glass composition, in some embodiments, comprises at least about 60 weight percent $SiO_2$. In some embodiments, ZnO is present in an amount up to about 4 weight percent. $SnO_2$ is present, in some embodiments, in an amount up to about 4 weight percent. In some embodiments, the at least one rare earth oxide comprises $CeO_2$ and $CeO_2$ is present in an amount up to about 4 weight percent. In some embodiments, both $SnO_2$ and $CeO_2$ are present in a combined amount of up to about 8 weight percent. The glass composition, in some embodiments, further comprises $Nb_2O_5$ in an amount up to about 5 weight percent. In some embodiments, the glass composition is substantially free of $B_2O_3$.

In one embodiment, a glass composition suitable for fiber forming comprises 60-68 weight percent $SiO_2$, 14-19 weight percent $Al_2O_3$; 5 weight percent or less CaO; 10-16 weight percent MgO; 0-1 weight percent $Na_2O$; 0-1 weight percent $K_2O$; 0-2 weight percent $Li_2O$; 0-2 weight percent $TiO_2$; 0-3 weight percent $B_2O_3$; 0-1 weight percent $Fe_2O_3$; 0-4 weight percent $SnO_2$; 0-4 weight percent ZnO; at least one rare earth oxide in an amount not less than 1 weight percent; and 0-11 weight percent total other constituents. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide, in some embodiments, is present in an amount of at least 3 weight percent. In some embodiments, the at least one rare earth oxide is present in an amount up to about 15 weight percent. The at least one rare earth oxide, in some embodiments, is present in an amount up to about 8 weight percent. In some embodiments, the at least one rare earth oxide is present in an amount up to about 5 weight percent. The $Na_2O+K_2O+$ $Li_2O$ content is greater than 1 weight percent in some embodiments. The $Na_2O+K_2O$ content, in some embodiments, is less than about 0.5 weight percent. In some embodiments, $Li_2O$ is present in an amount between about 0.4 and about 2 weight percent. In some embodiments, ZnO is present in an amount up to about 4 weight percent. $SnO_2$ is present, in some embodiments, in an amount up to about 4 weight percent. In some embodiments, the at least one rare earth oxide comprises $CeO_2$ and $CeO_2$ is present in an amount up to about 4 weight percent. In some embodiments, both $SnO_2$ and $CeO_2$ are present in a combined amount of up to about 8 weight percent. The glass composition, in some embodiments, further comprises $Nb_2O_5$ in an amount up to about 5 weight percent. In some embodiments, the glass composition is substantially free of $B_2O_3$.

In one embodiment, a glass composition suitable for fiber forming comprises 60-68 weight percent $SiO_2$, 14-19 weight percent $Al_2O_3$; 5 weight percent or less CaO; 10-16 weight percent MgO; 0-1 weight percent $Na_2O$; 0-1 weight percent $K_2O$; 0.4-2 weight percent $Li_2O$; 0-2 weight percent $TiO_2$; 0-3 weight percent $B_2O_3$; 0-1 weight percent $Fe_2O_3$; 0-4 weight percent $SnO_2$; 0-4 weight percent ZnO; at least one rare earth oxide in an amount between about 1 and about 8 weight percent; and 0-11 weight percent total other constituents, wherein the $Na_2O+K_2O$ content is less than about 0.5 weight percent. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide, in some embodiments, is present in an amount of at least 3 weight percent. In some embodiments, the at least one rare earth oxide is present in an amount up to about 5 weight percent. The $Na_2O+K_2O+Li_2O$ content is greater than 1 weight percent in some embodiments. In some embodiments, ZnO is present in an amount up to about 4 weight percent. $SnO_2$ is present, in some embodiments, in an amount up to about 4 weight percent. In some embodiments, the at least one rare earth oxide comprises $CeO_2$ and $CeO_2$ is present in an amount up to about 4 weight percent. In some embodiments, both $SnO_2$ and $CeO_2$ are present in a combined amount of up to about 8 weight percent. The glass composition, in some embodiments, further comprises $Nb_2O_5$ in an amount up to about 5 weight percent. In some embodiments, the glass composition is substantially free of $B_2O_3$.

In one embodiment, a glass composition suitable for fiber forming comprises 59-62 weight percent $SiO_2$, 14-19 weight percent $Al_2O_3$; 4-8 weight percent CaO; 6-11 weight percent MgO; 0-1 weight percent $Na_2O$; 0-1 weight percent $K_2O$; 0-2 weight percent $Li_2O$; 0-3 weight percent $TiO_2$; 0-3 weight percent $B_2O_3$; 0-1 weight percent $Fe_2O_3$; 0-2 weight percent $Cu_2O$; 0-3 weight percent SrO; at least one rare earth oxide in an amount not less than 3 weight percent; and 0-11 weight percent total other constituents. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide is present in an amount of at least 4 weight percent in some embodiments. The at least one rare earth oxide, in some embodiments, is present in an amount of at least 5 weight percent. In some embodiments, the at least one rare earth oxide is present in an amount up to about 15 weight percent. The at least one rare earth oxide, in some embodiments, is present in an amount up to about 8 weight percent. In some embodiments, the at least one rare earth oxide is present in an amount up to about 5 weight percent. In some embodiments, the CaO content is less than about 8 weight percent. The $Na_2O+K_2O+Li_2O$ content is greater than 1 weight percent in some embodiments. The $Na_2O+K_2O$ content, in some embodiments, is less than about 0.5 weight percent. In some embodiments, the $Al_2O_3$ content is between about 15 and about 18 weight percent. MgO is present, in some embodiments, in an amount between about 8 and about 10 weight percent. In some embodiments, $Li_2O$ is present in an amount between about 0.4 and about 2 weight percent. The glass composition, in some embodiments, comprises at least about 61 weight percent $SiO_2$. In some embodiments, SrO is present in an amount up to about 3 weight percent. $Cu_2O$ is present, in some embodiments, in an amount up to about 2 weight percent. In some embodiments, the at least one rare earth oxide comprises $Y_2O_3$ and $Y_2O_3$ is present in an amount up to about 5 weight percent. In some embodiments, both $Cu_2O$ and $Y_2O_3$ are present in a combined amount of up to about 7 weight percent. The glass composition, in some embodiments, further comprises $Nb_2O_5$ in an amount up to about 5 weight percent. In some embodiments, the glass composition is substantially free of $B_2O_3$.

Some embodiments of the present invention relate to fiber glass strands. A number of fiberizable glass compositions are disclosed herein as part of the present invention, and it should be understand that various embodiments of the present invention can comprise glass fibers, fiber glass strands, yarns, and other products incorporating glass fibers formed from such compositions.

Some embodiments of the present invention relate to yarns formed from at least one fiber glass strand formed from a glass composition described herein. Some embodiments of the present invention relate to fabrics incorporating at least one fiber glass strand formed from a glass composition described herein. In some embodiments, a fill yarn used in the fabric can comprise the at least one fiber glass strand. A warp yarn, in some embodiments, can comprise the at least one fiber glass strand. In some embodiments, fiber glass strands can be used in both fill yarns and warp yarns used to form fabrics according to the present invention. In some embodiments, fabrics of the present invention can comprise a plain weave fabric, a twill fabric, a crowfoot fabric, a satin weave fabric, a stitch bonded fabric, or a 3D woven fabric.

Some embodiments of the present invention relate to composites comprising a polymeric resin and glass fibers formed from one of the various glass compositions described herein. The glass fibers can be from a fiber glass strand according to some embodiments of the present invention. In some embodiments, the glass fibers can be incorporated into a fabric, such as a woven fabric. For example, the glass fibers can be in a fill yarn and/or a warp yarn that are woven to form a fabric. In embodiments where the composite comprises a fabric, the fabric can comprise a plain weave fabric, a twill fabric, a crowfoot fabric, a satin weave fabric, a stitch bonded fabric, or a 3D woven fabric.

The glass fibers can be incorporated into the composite in other forms as well as discussed in more detail below.

With regard to polymeric resins, composites of the present invention can comprise one or more of a variety of polymeric resins. In some embodiments, the polymeric resin comprises at least one of polyethylene, polypropylene, polyamide, polyimide, polybutylene terephthalate, polycarbonate, thermoplastic polyurethane, phenolic, polyester, vinyl ester, polydicyclopentadiene, polyphenylene sulfide, polyether ether ketone, cyanate esters, bis-maleimides, and thermoset polyurethane resins. The polymeric resin can comprise an epoxy resin in some embodiments.

Composites of the present invention can be in a variety of forms and can be used in a variety of applications. Some examples of potential uses of composites according to some embodiments of the present invention include, without limitation, wind energy (e.g., windmill blades), automotive applications, safety/security applications (e.g., ballistics armor), aerospace or aviation applications (e.g., interior floors of planes), high pressure vessels or tanks, missile casings, electronics, and others.

These and other embodiments of the present invention are described in greater detail in the Detailed Description that follows.

DETAILED DESCRIPTION

Figure 1:
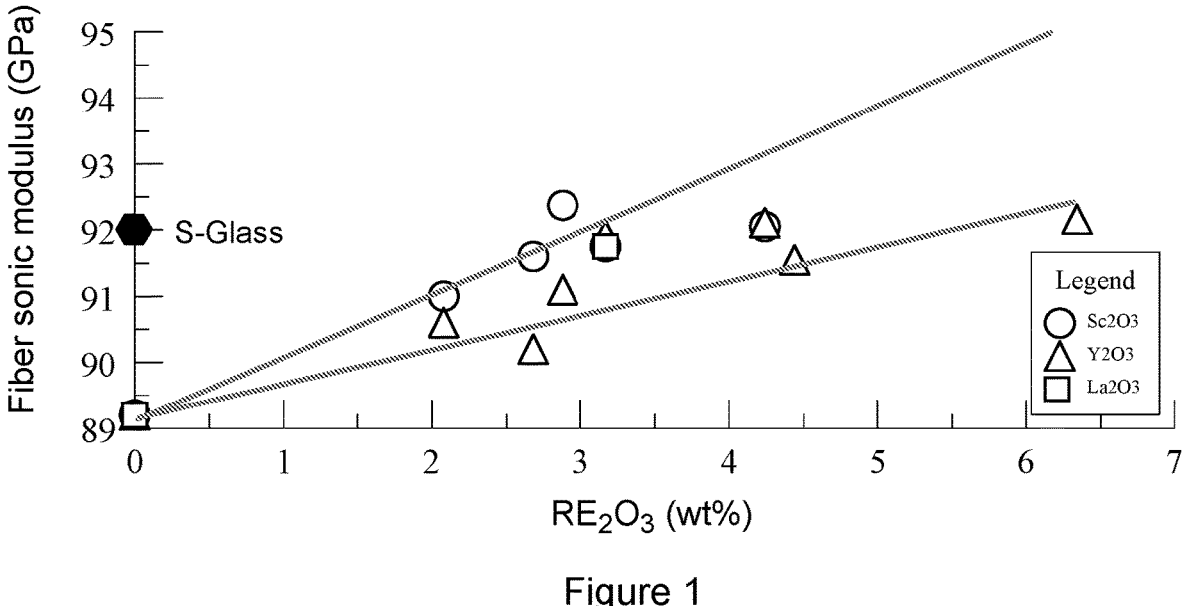
FIG. 1 is a chart showing Young's modulus values relative to the amount of rare earth oxides ($RE_2O_3$) in various glass compositions.

Unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

The present invention relates generally to glass compositions. In one aspect, the present invention provides glass fibers formed from glass compositions described herein. In some embodiments, glass fibers of the present invention can have improved mechanical properties, such as, for example, Young's modulus and pristine strength, as compared to conventional E-glass fibers.

Glass compositions of the present invention comprise rare earth oxides in addition to components typically found in glass compositions such as $SiO_2$, $Al_2O_3$, CaO, MgO, and others. Such glass compositions can be fiberizable and thus can be used to make fiber glass in various embodiments. As understood to those of skill in the art, the term "rare earth oxides" refers to oxides incorporating a rare earth metal and includes oxides of scandium ($Sc_2O_3$), yttrium ($Y_2O_3$), and the lanthanide elements (lanthanum ($La_2O_3$), cerium ($Ce_2O_3$ and $CeO_2$), praseodymium ($Pr_2O_3$), neodymium ($Nd_2O_3$), promethium ($Pm_2O_3$), samarium ($Sm_2O_3$), europium ($Eu_2O_3$ and EuO), gadolinium ($Gd_2O_3$), terbium ($Tb_2O_3$), dysprosium ($Dy_2O_3$), holmium ($Ho_2O_3$), erbium ($Er_2O_3$), thulium ($Tm_2O_3$), ytterbium ($Yb_2O_3$), and lutetium ($Lu_2O_3$)). The rare earth oxides are included in the glass compositions of the present invention in amounts that exceed those wherein the rare earth oxide is present only as a tramp material or impurity in a batch material included with a glass batch to provide another component. The glass compositions, in some embodiments, can comprise a combination of rare earth oxides (e.g., one or more of various rare earth oxides).

In some embodiments, one or more rare earth oxides can be present in a glass composition in an amount not less than about 0.05 weight percent. The one or more rare earth oxides can be present in an amount not less than about 0.5 weight percent in some embodiments. The one or more rare earth oxides can be present in an amount greater than about 3 weight percent in some embodiments. The one or more rare earth oxides can be present, in some embodiments, in an amount up to about 5 weight percent although greater amounts can be used in other embodiments. In some embodiments, the one or more rare earth oxides can be present in an amount up to about 8 weight percent. In some embodiments, the one or more rare earth oxides can be present in an amount up to about 10 weight percent. The one or more rare earth oxides, in some embodiments, can be present in an amount up to about 12 weight percent. The one or more rare earth oxides can be present in an amount up to about 15 weight percent in some embodiments. The one or more rare earth oxides, in some embodiments, can be present in an amount between about 0.05 and about 15 weight percent. The one or more rare earth oxides can be present in an amount between about 0.5 and about 15 weight percent in some embodiments. In some embodiments, the one or more rare earth oxides can be present in an amount between about 2.0 and about 15 weight percent. The one or more rare earth oxides, in some embodiments, can be present in an amount between about 3.0 and about 15 weight percent. In some embodiments, the one or more rare earth oxides can be present in an amount between about 4.0 and about 15 weight percent. The one or more rare earth oxides can be present in an amount between about 5.0 and about 15 weight percent in some embodiments. In some embodiments, the one or more rare earth oxides can be present in an amount between about 1 and about 8 weight percent. The one or more rare earth oxides, in some embodiments, can be present in an amount between about 3 and about 8 weight percent. The one or more rare earth oxides can be present in an amount between about 1 and about 5 weight percent in some embodiments.

The amount of rare earth oxides used in some embodiments can depend on the particular rare earth oxide used, whether other rare earth oxides are used in the composition, melt properties of the composition, and desired properties of the glass fibers to be formed from the composition, and others.

In some embodiments, the rare earth oxide used in glass compositions of the present invention can comprise $La_2O_3$ in an amount between about 0.5 and about 15 weight percent. As set forth above and in the Examples below, other amounts of $La_2O_3$ can also be included in glass compositions according to some embodiments. In some embodiments, the inclusion of $La_2O_3$ in glass compositions is believed to have a desirable impact on glass softening temperature and glass transition temperatures as well as on tensile strength, elongation, coefficient of thermal expansion, and other properties of glass fibers formed from the compositions.

In some embodiments, the rare earth oxide used in glass compositions of the present invention can comprise $Y_2O_3$ in an amount between about 0.5 and about 15 weight percent. As set forth above and in the Examples below, other amounts of $Y_2O_3$ can also be included in glass compositions according to some embodiments. In some embodiments, the inclusion of $Y_2O_3$ in glass compositions is believed to have a desirable impact on glass softening temperature and glass transition temperature as well as on modulus, tensile strength, elongation, coefficient of thermal expansion, and other properties of glass fibers formed from the compositions.

In some embodiments, the rare earth oxide used in glass compositions of the present invention can comprise $Sc_2O_3$ in an amount between about 0.5 and about 4 weight percent. As set forth above and in the Examples below, other amounts of $Sc_2O_3$ can also be included in glass compositions according to some embodiments. In some embodiments, while the inclusion of $Sc_2O_3$ in glass compositions is believed to have a desirable impact on some properties of glass fibers formed from the compositions (e.g., glass softening temperature, glass transition temperature, coefficient of thermal expansion, etc.), the presence of $Sc_2O_3$ has also been observed to raise the liquidus temperature of the compositions.

In some embodiments, the rare earth oxide used in glass compositions of the present invention can comprise $Nd_2O_3$ in an amount between about 0.5 and about 15 weight percent. As set forth above and in the Examples below, other amounts of $Nd_2O_3$ can also be included in glass compositions according to some embodiments. In some embodiments, the inclusion of $Nd_2O_3$ in glass compositions is believed to have a desirable impact on glass softening temperature and glass transition temperature as well as on modulus, tensile strength, elongation, coefficient of thermal expansion, and other properties of glass fibers formed from the compositions.

In some embodiments, the rare earth oxide used in glass compositions of the present invention can comprise $Sm_2O_3$ in an amount between about 0.5 and about 15 weight percent. As set forth above and in the Examples below, other amounts of $Sm_2O_3$ can also be included in glass compositions according to some embodiments. In some embodiments, the inclusion of $Sm_2O_3$ in glass compositions is believed to have a desirable impact on glass softening temperature and glass transition temperature as well as on modulus, tensile strength, elongation, coefficient of thermal expansion, and other properties of glass fibers formed from the compositions.

In some embodiments, the rare earth oxide used in glass compositions of the present invention can comprise $Gd_2O_3$ in an amount between about 0.5 and about 15 weight percent. As set forth above and in the Examples below, other amounts of $Gd_2O_3$ can also be included in glass compositions according to some embodiments. In some embodiments, the inclusion of $Gd_2O_3$ in glass compositions is believed to have a desirable impact on glass softening temperature and glass transition temperature as well as on modulus, tensile strength, elongation, coefficient of thermal expansion, and other properties of glass fibers formed from the compositions.

In some embodiments, the rare earth oxide used in glass compositions of the present invention can comprise $CeO_2$ in an amount between about 0.5 and about 15 weight percent. As set forth above and in the Examples below, other amounts of $CeO_2$ can also be included in glass compositions according to some embodiments. For example, in some embodiments, $CeO_2$ can be present in an amount between 0 and about 4 weight percent. Although cerium oxide can be introduced in the stable form of $CeO_2$, a majority of cerium in the glass, when melted at high temperature, reduces from $Ce^{4+}$ (in $CeO_2$) to $Ce^{3+}$ (becoming $Ce_2O_3$). In this regard, the inclusion of cerium oxide is believed to improve not only the sonic modulus and strength of glass fibers formed from the compositions, but also to increase glass quality through better fining of the glass during melting during which cerium oxide releases oxygen bubbles as Ce' ions in the melt reduce to $Ce^{3+}$ ions.

Various combinations of rare earth oxides can be also used to achieve desirable properties (e.g., tensile strength, modulus, specific strength, specific modulus, etc.). For example, the selection of a particular rare earth oxide and its relative amount can impact the fiber density which can in turn impact specific strength (tensile strength divided by density) and specific modulus (modulus divided by density). Likewise, the selection of a particular rare earth oxide and its relative amount can impact melt properties of the glass compositions. For example, as noted above, the presence of $Sc_2O_3$ in certain amounts can increase the liquidus temperature of a glass composition. Similarly, cerium oxide ($Ce_2O_3$ and $CeO_2$) can act as an oxidizing and fining agent, such that in some embodiments, the amount of cerium oxide can be no more than 4 weight percent. Finally, the selection of a particular rare earth oxide and its relative amount can impact the cost of making the glass fibers due to its impact on melt properties and due its cost as a raw material as the cost of rare earth oxides varies substantially. In general, for the same amount of rare earth oxide in a glass composition, the melt and mechanical properties of the glass can be controlled by selecting a combination of rare earth oxides with different field strengths as defined by $z/r^2$ where z is the charge and r is the radius of the rare earth cation.

As noted above, glass compositions of the present invention and in particular, fiberizable glass compositions also include other components including $SiO_2$, $Al_2O_3$, CaO, MgO, and others.

In one embodiment, a glass composition suitable for fiber forming comprises 51-65 weight percent $SiO_2$, 12.5-19 weight percent $Al_2O_3$, 0-16 weight percent CaO, 0-12 weight percent MgO, 0-2.5 weight percent $Na_2O$, 0-1 weight percent $K_2O$, 0-2 weight percent $Li_2O$, 0-3 weight percent $TiO_2$, 0-3 weight percent $ZrO_2$, 0-3 weight percent $B_2O_3$, 0-3 weight percent $P_2O_5$, 0-1 weight percent $Fe_2O_3$, at least one rare earth oxide in an amount not less than 0.05 weight percent, and 0-11 weight percent total other constituents. In some embodiments, the at least one rare earth oxide comprises at least one of $La_2O_3$, $Y_2O_3$, $Sc_2O_3$, and $Nd_2O_3$. The at least one rare earth oxide is present in an amount of at least 1 weight percent in some embodiments. The at least one rare earth oxide, in some embodiments, is present in an amount of at least 3 weight percent.

In one embodiment, a glass composition suitable for fiber forming comprises 51-65 weight percent $SiO_2$, 12.5-22 weight percent $Al_2O_3$, 0-16 weight percent CaO, 0-12 weight percent MgO, 0-2.5 weight percent $Na_2O$, 0-1 weight percent $K_2O$, 0-2 weight percent $Li_2O$, 0-3 weight percent $TiO_2$, 0-3 weight percent $ZrO_2$, 0-3 weight percent $B_2O_3$, 0-3 weight percent $P_2O_5$, 0-1 weight percent $Fe_2O_3$, at least one rare earth oxide in an amount not less than 0.05 weight percent, and 0-11 weight percent total other constituents, wherein the $Na_2O+K_2O+Li_2O$ content is greater than 1 weight percent. In some embodiments, the at least one rare earth oxide comprises at least one of $La_2O_3$, $Y_2O_3$, $Sc_2O_3$, and $Nd_2O_3$. The at least one rare earth oxide is present in an amount of at least 1 weight percent in some embodiments. The at least one rare earth oxide, in some embodiments, is present in an amount of at least 3 weight percent.

In one embodiment, a glass composition suitable for fiber forming comprises 51-63 weight percent $SiO_2$, 14.5-19 weight percent $Al_2O_3$, 0.5-10 weight percent CaO, 0-12 weight percent MgO, 0-1 weight percent $Na_2O$, 0-1 weight percent $K_2O$, 0-2 weight percent $Li_2O$, 0-3 weight percent $TiO_2$, 0-3 weight percent $ZrO_2$, 0-2 weight percent $B_2O_3$, 0-3 weight percent $P_2O_5$, 0-1 weight percent $Fe_2O_3$, at least one rare earth oxide in an amount not less than 0.5 weight percent, and 0-11 weight percent total other constituents. In some embodiments, the at least one rare earth oxide comprises at least one of $La_2O_3$, $Y_2O_3$, $Sc_2O_3$, and $Nd_2O_3$. The at least one rare earth oxide is present in an amount of at least 1 weight percent in some embodiments. The at least one rare earth oxide, in some embodiments, is present in an amount of at least 3 weight percent.

In one embodiment, a glass composition suitable for fiber forming comprises 56-68 weight percent $SiO_2$, 11 to less than 20 weight percent $Al_2O_3$; 12 weight percent or less CaO; 7-17 weight percent MgO; 0-1 weight percent $Na_2O$; 0-1 weight percent $K_2O$; 0-5 weight percent $Li_2O$; 0-2 weight percent $TiO_2$; 0-3 weight percent $B_2O_3$; 0-1 weight percent $Fe_2O_3$; 0-4 weight percent $SnO_2$; 0-4 weight percent ZnO; at least one rare earth oxide in an amount not less than 0.05 weight percent; and 0-11 weight percent total other constituents. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide is present in an amount of at least 1 weight percent in some embodiments. The at least one rare earth oxide, in some embodiments, is present in an amount of at least 3 weight percent. In some embodiments, the at least one rare earth oxide is present in an amount up to about 15 weight percent. The at least one rare earth oxide, in some embodiments, is present in an amount up to about 8 weight percent. In some embodiments, the at least one rare earth oxide is present in an amount up to about 5 weight percent.

In one embodiment, a glass composition suitable for fiber forming comprises 60-68 weight percent $SiO_2$, 14-19 weight percent $Al_2O_3$; 5 weight percent or less CaO; 10-16 weight percent MgO; 0-1 weight percent $Na_2O$; 0-1 weight percent $K_2O$; 0-2 weight percent $Li_2O$; 0-2 weight percent $TiO_2$; 0-3 weight percent $B_2O_3$; 0-1 weight percent $Fe_2O_3$; 0-4 weight percent $SnO_2$; 0-4 weight percent ZnO; at least one rare earth oxide in an amount not less than 1 weight percent; and 0-11 weight percent total other constituents. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide, in some embodiments, is present in an amount of at least 3 weight percent. In some embodiments, the at least one rare earth oxide is present in an amount up to about 15 weight percent. The at least one rare earth oxide, in some embodiments, is present in an amount up to about 8 weight percent. In some embodiments, the at least one rare earth oxide is present in an amount up to about 5 weight percent.

In one embodiment, a glass composition suitable for fiber forming comprises 60-68 weight percent $SiO_2$, 14-19 weight percent $Al_2O_3$; 5 weight percent or less CaO; 10-16 weight percent MgO; 0-1 weight percent $Na_2O$; 0-1 weight percent $K_2O$; 0.4-2 weight percent $Li_2O$; 0-2 weight percent $TiO_2$; 0-3 weight percent $B_2O_3$; 0-1 weight percent $Fe_2O_3$; 0-4 weight percent $SnO_2$; 0-4 weight percent ZnO; at least one rare earth oxide in an amount between about 1 and about 8 weight percent; and 0-11 weight percent total other constituents, wherein the $Na_2O+K_2O$ content is less than about 0.5 weight percent. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide, in some embodiments, is present in an amount of at least 3 weight percent. In some embodiments, the at least one rare earth oxide is present in an amount up to about 5 weight percent.

In one embodiment, a glass composition suitable for fiber forming comprises 59-62 weight percent $SiO_2$, 14-19 weight percent $Al_2O_3$; 4-8 weight percent CaO; 6-11 weight percent MgO; 0-1 weight percent $Na_2O$; 0-1 weight percent $K_2O$; 0-2 weight percent $Li_2O$; 0-3 weight percent $TiO_2$; 0-3 weight percent $B_2O_3$; 0-1 weight percent $Fe_2O_3$; 0-2 weight percent $Cu_2O$; 0-3 weight percent SrO; at least one rare earth oxide in an amount between about 2 and about 6 weight percent; and 0-11 weight percent total other constituents, wherein the $Na_2O+K_2O$ content is less than about 0.5 weight percent. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide, in some embodiments, is present in an amount of at least 3 weight percent. In some embodiments, the at least one rare earth oxide is present in an amount up to about 5 weight percent.

It should be understood that any component of a glass composition described as being present in amount between about 0 weight percent and another weight percent is not necessarily required in all embodiments. In other words, such components may be optional in some embodiments, depending of course on the amounts of other components included in the compositions. Likewise, in some embodiments, glass compositions can be substantially free of such components, meaning that any amount of the component present in the glass composition would result from the component being present as a trace impurity in a batch material.

Some embodiments of the present invention can be characterized by the amount of $SiO_2$ present in the glass compositions. $SiO_2$ can be present in an amount between about 51 and about 65 weight percent and between about 51 and about 63 weight percent in some embodiments. $SiO_2$ can be present, in some embodiments, in an amount between about 54 and about 65 weight percent and between about 54 and about 63 weight percent. In some embodiments, $SiO_2$ can be present in an amount between about 59 and about 62 weight percent and between about 59 and about 65 weight percent. $SiO_2$ can be present in some embodiments in an amount between about 56 and about 68 weight percent, and between about 60 and 68 weight percent in others. The glass compositions, in some embodiments, can comprise at least 60 weight percent $SiO_2$.

Some embodiments of the present invention can be characterized by the amount of $Al_2O_3$ present in the glass compositions. In some embodiments, glass compositions can comprise 12.5 to 22 weight percent $Al_2O_3$. $Al_2O_3$ can be present, in some embodiments, in an amount between about 12.5 and about 19 weight percent. $Al_2O_3$ can be present in an amount between about 11 and 20 weight percent in some embodiments. $Al_2O_3$ can be present, in some embodiments, in an amount between about 14 and 19 weight percent. $Al_2O_3$ can be present in an amount between about 14.5 and 19 weight percent in some embodiments. In some embodiments, $Al_2O_3$ can be present in an amount between about 15 and 19 weight percent and about 15 and 18 weight percent.

Some embodiments of the present invention can be characterized by the amount of CaO present in the glass compositions. CaO can be present in an amount between 0 and about 20 weight percent in some embodiments. CaO can be present, in some embodiments, in an amount between 0 and about 16 weight percent. In some embodiments, CaO can be present in an amount between about 0.5 and about 15 weight percent. Glass compositions of the present invention, in some embodiments, can comprise between about 0.5 and about 14 weight percent. CaO can be present in some embodiments in an amount less than about 12 weight percent. In some embodiments, CaO can be present in an amount between about 0.5 and about 10 weight percent. Glass compositions of the present invention, in some embodiments, can comprise less than about 5 weight percent CaO. Glass compositions of the present invention, in some embodiments, can comprise between about 4 and about 8 weight percent CaO.

Some embodiments of the present invention can be characterized by the amount of MgO present in the glass compositions. In some embodiments, glass compositions of the present invention comprise between 0 and about 12 weight percent MgO. MgO can be present in an amount up to about 9 weight percent in some embodiments. MgO can be present, in some embodiments, in an amount between about 6 and about 9 weight percent or about 6 and about 11 weight percent. In some embodiments, MgO can be present in an amount between about 7 and about 17 weight percent. MgO can be present, in some embodiments, in an amount between about 10 and about 16 weight percent.

Some embodiments of the present invention can be characterized by the amount of $Na_2O$ present in the glass compositions. In some embodiments, glass compositions of the present invention can comprise between about 0 and about 2.5 weight percent $Na_2O$. $Na_2O$ can be present, in some embodiments, in an amount between about 0 and about 1.5 weight percent. In some embodiments, $Na_2O$ can be present in an amount up to about 1.5 weight percent. $Na_2O$ can be present, in some embodiments, in an amount up to about 1.0 weight percent. In some embodiments, $Na_2O$ can be present in an amount up to about 0.5 weight percent. In some embodiments, glass compositions of the present invention comprise less than about 0.1 weight percent $Na_2O$.

Some embodiments of the present invention can be characterized by the amount of $K_2O$ present in the glass compositions. $K_2O$ can be present, in some embodiments, in an amount between about 0 and about 1 weight percent. In some embodiments, $K_2O$ can be present in an amount up to about 1 weight percent. In some embodiments, $K_2O$ can be present in an amount up to about 0.5 weight percent. In some embodiments, glass compositions of the present invention comprise less than about 0.1 weight percent $K_2O$.

Some embodiments of the present invention can be characterized by the amount of $Li_2O$ present in the glass compositions. Glass compositions of the present invention, in some embodiments, can comprise between about 0 and about 5 weight percent $Li_2O$. In some embodiments, glass compositions of the present invention can comprise between about 0 and about 2 weight percent $Li_2O$. In some embodiments, $Li_2O$ can be present, in some embodiments, in an amount between about 0.4 and about 2 weight percent. $Li_2O$ can be present, in some embodiments, in an amount between about 0 and about 1 weight percent. In some embodiments, $Li_2O$ can be present in an amount up to about 1 weight percent.

Some embodiments of the present invention can be characterized by the total amount of $Na_2O$, $K_2O$, and $Li_2O$ content. In some embodiments, the $Na_2O+K_2O+Li_2O$ content in glass compositions of the present invention is greater than 1 weight percent. The $Na_2O+K_2O+Li_2O$ content, in some embodiments, is up to about 2.5 weight percent. In some embodiments, the $Na_2O+K_2O+Li_2O$ content is greater than about 1 weight percent and up to about 2.5 weight percent.

Some embodiments of the present invention can be characterized by the total amount of $Na_2O$ and $K_2O$ content. In some embodiments, the $Na_2O+K_2O$ content in glass compositions of the present invention is less than about 0.5 weight percent. The $Na_2O+K_2O$ content, in some embodiments, is up to about 0.3 weight percent. In some embodiments, the $Na_2O+K_2O$ content is up to about 0.1 weight percent.

Some embodiments of the present invention can be characterized by the amount of $B_2O_3$ present in the glass compositions. $B_2O_3$ can be present in an amount between about 0 and about 3 weight percent in some embodiments. In some embodiments, $B_2O_3$ can be present in an amount between about 0 and about 2 weight percent. $B_2O_3$ can be present, in some embodiments, in an amount between about 0 and about 1 weight percent. In some embodiments, glass compositions of the present invention can be substantially free of $B_2O_3$, meaning that any $B_2O_3$ present in the glass composition would result from $B_2O_3$ being present as a trace impurity in a batch material. In other embodiments, glass compositions of the present invention can comprise greater than about 1 weigh percent $B_2O_3$. In some embodiments, $B_2O_3$ can be present in an amount up to about 10 weight percent.

Some embodiments of the present invention can be characterized by the amount of $Fe_2O_3$ present in the glass compositions. In some embodiments, $Fe_2O_3$ can be present in an amount less than 1.0 weight percent. $Fe_2O_3$ can be present, in some embodiments, in an amount between about 0 and about 0.5 weight percent. In some embodiments, $Fe_2O_3$ can be present in an amount up to about 0.4 weight percent.

Some embodiments of the present invention can be characterized by the amount of $TiO_2$ present in the glass compositions. $TiO_2$ can be present, in some embodiments, in an amount between about 0 and about 3 weight percent. In some embodiments, $TiO_2$ can be present in an amount up to about 3 weight percent. $TiO_2$ can be present, in some embodiments, between 0 and about 2 weight percent.

Some embodiments of the present invention can be characterized by the amount of $Cu_2O$ present in the glass compositions. $Cu_2O$ can be present, in some embodiments, in an amount between about 0 and about 2 weight percent. In some embodiments, $Cu_2O$ can be present in an amount up to 2 weight percent. $Cu_2O$ can be present, in some embodiments, between 0 and about 1.5 weight percent. $Cu_2O$ was used in the glass batch, in molten glass, in a mixture of oxidation states, $Cu^{1+}$ and $Cu^{2+}$ ions, which are believed to be stable in the glass. Without wishing to be bound to any theory, it is believed that monovalent $Cu^+$ ions function similar to alkalis and divalent $Cu^{2+}$ ions function similarly to ZnO, thereby improving the glass chemical durability. The oxidation of the $Cu^+$ ion to $Cu^{2+}$ ion on glass or glass fiber surface provides the benefit of higher glass and/or glass fiber strength. It is believed that the increased strength is provided by the formation of a structural passivation layer that slows down the penetration of molecular water from the surrounding environment into the glass and/or glass fibers.

Some embodiments of the present invention can be characterized by the amount of SrO present in the glass compositions. SrO can be present, in some embodiments, in an amount between about 0 and about 3 weight percent. In some embodiments, SrO can be present in an amount up to 3 weight percent. SrO can be present, in some embodiments, between 0 and 2.5 weight percent. SrO has the effect of decreasing glass viscosity as compared to either MgO or CaO. Therefore, the addition of SrO, as opposed to either MgO or CaO, will result in an improvement to the glass elastic modulus.

In some embodiments, glass compositions of the present invention can comprise ZnO. ZnO can be used to replace or reduce the amount of CaO in some embodiments of glass compositions. The inclusion of ZnO, in some embodiments, to at least partially replace CaO is believed to improve the sonic modulus and tensile strength of glass fibers from such compositions. Further, ZnO is believed to reduce the CaO activity in the glass melt and thus is believed to lower the risk of crystallization of wollastonite ($CaO \cdot SiO_2$) and/or anorthite ($CaO \cdot Al_2O_3 \cdot 2SiO_3$) in the melt. Glass fibers containing higher concentrations of ZnO can also provide improved resistance to acid corrosion in some embodiments. In embodiments where ZnO is included, ZnO can be present in an amount up to about 4 weight percent. In some embodiments where ZnO is included, ZnO can be present in an amount up to about 4 weight percent and the amount of CaO can be between about 0 and about 5 weight percent.

In some embodiments, glass compositions of the present invention can comprise tin oxide. Although tin oxide can be introduced in the form of $SnO_2$, a majority of tin in the glass, when melted at high temperature, reduces from $Sn^{4+}$ (from $SnO_2$) to $Sn^{2+}$ (becoming SnO). In this regard, the inclusion of tin oxide is believed to improve not only the sonic modulus and strength of glass fibers formed from the compositions, but also to increase glass quality through better fining of the glass during melting during which tin oxide releases oxygen bubbles as $Sn^{4+}$ ions in the melt reduce to $Sn^{2+}$ ions. In addition, the presence of SnO in the glass, in some embodiments, can permit the at least partial replacement of CaO. Further, the presence of SnO is believed to reduce the CaO activity in the glass melt and thus is believed to lower the risk of crystallization of wollastonite ($CaO \cdot SiO_2$) and/or anorthite ($CaO \cdot Al_2O_3 \cdot 2SiO_3$) in the melt. In this regard, tin oxide can also be added in the form of SnO, in some embodiments, without the potential impact on fining. In embodiments where tin oxide is included, tin oxide can be present in an amount up to about 4 weight percent. In some embodiments where tin oxide is included, tin oxide can be present in an amount up to about 4 weight percent and the amount of CaO can be between about 0 and about 5 weight percent.

In some embodiments, glass compositions of the present invention can be characterized by the amount of $SnO_2$ and $CeO_2$. As these oxides can have similar effects on the glass melt and fibers formed therefrom, some glass compositions can comprise both $SnO_2$ and $CeO_2$. In some embodiments, the $SnO_2 + CeO_2$ content can be up to about 8 weight percent. The $SnO_2 + CeO_2$ content, in some embodiments, can be up to about 6 weight percent. The $SnO_2 + CeO_2$ content can be up to about 4 weight percent in some embodiments. In some embodiments, $SnO_2$ can be present in an amount up to about 4 weight percent and $CeO_2$ can also be present in an amount up to about 4 weight percent.

Some embodiments of the present invention can be characterized by the amount of $ZrO_2$ present in the glass compositions. $ZrO_2$ can be present, in some embodiments, in an amount between about 0 and about 3 weight percent. In some embodiments, $ZrO_2$ can be present in an amount up to about 2 weight percent. In some embodiments, glass compositions of the present invention can be substantially free of $ZrO_2$, meaning that any $ZrO_2$ present in the glass composition would result from $ZrO_2$ being present as a trace impurity in a batch material.

Some embodiments of the present invention can be characterized by the amount of $P_2O_5$ present in the glass compositions. $P_2O_5$ can be present, in some embodiments, in an amount between about 0 and about 3 weight percent. In some embodiments, $P_2O_5$ can be present in an amount up to about 2.5 weight percent. In some embodiments, glass compositions of the present invention can be substantially free of $P_2O_5$, meaning that any $P_2O_5$ present in the glass composition would result from $P_2O_5$ being present as a trace impurity in a batch material. $P_2O_5$ functions as a glass network former and, like $SiO_2$, forms a tetrahedral unit ($PO_4$) in the glass. In some embodiments, $P_2O_5$ can be used to replace $SiO_2$ to lower the liquidus temperature of glasses containing particularly high concentrations of rare earth oxides.

Some embodiments of the present invention can be characterized by the amount of niobium oxide ($Nb_2O_5$) present in the glass compositions. $Nb_2O_5$ functions as a glass network former, but forms octahedral units ($NbO_6$) as opposed to $SiO_2$, which as a glass network former forms tetrahedral units ($SiO_4$). The substitution of $Nb_2O_5$ for some $SiO_2$ content is believed to lower melt viscosity. With the presence of both $NbO_6$ and $SiO_4$ in alkaline earth-containing aluminosilicate glasses or in alkali containing aluminosilicate glasses, both 4-fold ($AlO_4$) and 6-fold ($AlO_6$) of aluminum exist, and the presence of a higher concentration of $AlO_6$ results in a higher concentration of $Nb_2O_5$, which is believed to result in a lower melt viscosity and a higher sonic modulus and tensile strength in glass fibers formed from the composition. In embodiments where $Nb_2O_5$ is included, $Nb_2O_5$ can be present in an amount up to about 5 weight percent.

Sulfate (expressed as $SO_3$) may also be present as a refining agent. Small amounts of impurities may also be present from raw materials or from contamination during the melting processes, such as SrO, BaO, $Cl_2$, $P_2O_5$, $Cr_2O_3$, or NiO (not limited to these particular chemical forms). Other refining agents and/or processing aids may also be present such as $As_2O_3$, MnO, $MnO_2$, or $Sb_2O_3$ (not limited to these particular chemical forms). These impurities and refining agents, when present, are each typically present in amounts less than 0.5% by weight of the total glass composition.

As noted above, glass compositions, according to some embodiments of the present invention are fiberizable. In some embodiments, glass compositions of the present invention have forming temperatures ($T_F$) desirable for use in commercial fiber glass manufacturing operations. As used herein, the term "forming temperature" or $T_F$, means the temperature at which the glass composition has a viscosity of 1000 poise (or "log 3 temperature"). Glass compositions of the present invention, in some embodiments, have a forming temperature ($T_F$) ranging from about 1250° C. to about 1415° C. In another embodiment, glass compositions of the present invention have a forming temperature ranging from about 1250° C. to about 1350° C. In some embodiments, glass compositions have a forming temperature ranging from about 1250° C. to about 1310° C.

Glass compositions of the present invention, in some embodiments, have a liquidus temperature ranging from about 1150° C. to about 1515° C. In some embodiments, glass compositions of the present invention have a liquidus temperature ranging from about 1130° C. to about 1235° C. In another embodiment, glass compositions of the present invention have a liquidus temperature ranging from about 1190° C. to about 1300° C. In some embodiments, glass compositions of the present invention have a liquidus temperature ranging from about 1190° C. to about 1260° C.

In some embodiments, the difference between the forming temperature and the liquidus temperature of a glass composition of the present invention is desirable for commercial fiber glass manufacturing operations. For example, for some embodiments of glass compositions, the difference between the forming temperature and the liquidus temperature ranges from about 35° C. to greater than 60° C. In some embodiments, the difference between the forming temperature and the liquidus temperature of a glass composition of the present invention is at least 50° C. In other embodiments, the difference between the forming temperature and the liquidus temperature of the glass composition of the present invention ranges from about 70° C. to about 190° C.

As provided herein, glass fibers can be formed from some embodiments of the glass compositions of the present invention. Thus, embodiments of the present invention can comprise glass fibers formed from any of the glass compositions described herein. In some embodiments, the glass fibers may be arranged into a fabric. In some embodiments, glass fibers of the present invention can be provided in other forms including, for example and without limitation, as continuous strands, chopped strands (dry or wet), yarns, rovings, prepregs, etc. In short, various embodiments of the glass compositions (and any fibers formed therefrom) can be used in a variety of applications.

Some embodiments of the present invention relate to fiber glass strands. Some embodiments of the present invention relate to yarns comprising fiber glass strands. Some embodiments of yarns of the present invention are particularly suitable for weaving applications. In addition, some embodiments of the present invention relate to glass fiber fabrics. Some embodiments of fiber glass fabrics of the present invention are particularly suitable for use in reinforcement applications, especially reinforcement applications in which high modulus, high strength, and/or high elongation are important. Further, some embodiments of the present invention relate to composites that incorporate fiber glass strands, fiber glass yarns, and fiber glass fabrics, such as fiber reinforced polymer composites. Some composites of the present invention are particularly suitable for use in reinforcement applications, especially reinforcement applications in which high modulus, high strength, and/or high elongation are important, such as wind energy (e.g., windmill blades), automotive applications, safety/security applications (e.g., ballistics armor or armor panels), aerospace or aviation applications (e.g., interior floors of planes), high pressure vessels or tanks, missile casings, and others. Some embodiments of the present invention relate to automotive composites. Some embodiments of the present invention relate to aerospace composites. Other embodiments of the present application relate to aviation composites. Still other embodiments of the present invention relate to composites suitable for use in wind energy applications. Some embodiments of the present invention relate to prepregs. Some embodiments of the present invention relate to composites for safety/security applications such as armor panels. Other embodiments of the present invention relate to composites for high pressure vessels or storage tanks. Some embodiments of the present invention relate to composites for missile casings. Other embodiments of the present invention relate to composites for use in high temperature thermal insulation applications. Some embodiments of the present invention relate to printed circuit boards where lower coefficients of thermal expansion are particularly desirable such as substrates for chip packaging.

Some embodiments of the present invention relate to fiber glass strands. In some embodiments, a fiber glass strand of the present invention comprises a plurality of glass fibers comprising a glass composition that comprises the following components:

51-65 weight percent $SiO_2$;
    12.5-19 weight percent $Al_2O_3$;
    0-16 weight percent CaO;

0-12 weight percent MgO;
    0-2.5 weight percent $Na_2O$;
    0-1 weight percent $K_2O$;
    0-2 weight percent $Li_2O$;
    0-3 weight percent $TiO_2$;
    0-3 weight percent $ZrO_2$;
    0-3 weight percent $B_2O_3$;
    0-3 weight percent $P_2O_5$;
    0-1 weight percent $Fe_2O_3$;
    at least one rare earth oxide in an amount not less than 0.05 weight percent; and
    0-11 weight percent total other constituents.

In some embodiments, the at least one rare earth oxide comprises at least one of $La_2O_3$, $Y_2O_3$, $Sc_2O_3$, and $Nd_2O_3$. The at least one rare earth oxide is present in an amount of at least 1 weight percent in some embodiments. The at least one rare earth oxide, in some embodiments, is present in an amount of at least 3 weight percent.

In some embodiments, a fiber glass strand of the present invention comprises a plurality of glass fibers comprising a glass composition that comprises the following components:

51-65 weight percent $SiO_2$;
    12.5-22 weight percent $Al_2O_3$;
    0-16 weight percent CaO;
    0-12 weight percent MgO;
    0-2.5 weight percent $Na_2O$;
    0-1 weight percent $K_2O$;
    0-2 weight percent $Li_2O$;
    0-3 weight percent $TiO_2$;
    0-3 weight percent $ZrO_2$;
    0-3 weight percent $B_2O_3$;
    0-3 weight percent $P_2O_5$;
    0-1 weight percent $Fe_2O_3$;
    at least one rare earth oxide in an amount not less than 0.05 weight percent; and
    0-11 weight percent total other constituents,
wherein the $Na_2O+K_2O+Li_2O$ content is greater than 1 weight percent. In some embodiments, the at least one rare earth oxide comprises at least one of $La_2O_3$, $Y_2O_3$, $Sc_2O_3$, and $Nd_2O_3$. The at least one rare earth oxide is present in an amount of at least 1 weight percent in some embodiments. The at least one rare earth oxide, in some embodiments, is present in an amount of at least 3 weight percent.

In some embodiments, a fiber glass strand of the present invention comprises a plurality of glass fibers comprising a glass composition that comprises the following components:

51-63 weight percent $SiO_2$;
    14.5-19 weight percent $Al_2O_3$;
    0.5-10 weight percent CaO;
    0-12 weight percent MgO;
    0-1 weight percent $Na_2O$;
    0-1 weight percent $K_2O$;
    0-2 weight percent $Li_2O$;
    0-3 weight percent $TiO_2$;
    0-3 weight percent $ZrO_2$;
    0-2 weight percent $B_2O_3$;
    0-3 weight percent $P_2O_5$;
    0-1 weight percent $Fe_2O_3$;
    at least one rare earth oxide in an amount not less than 0.5 weight percent; and
    0-11 weight percent total other constituents.

In some embodiments, the at least one rare earth oxide comprises at least one of $La_2O_3$, $Y_2O_3$, $Sc_2O_3$, and $Nd_2O_3$. The at least one rare earth oxide is present in an amount of at least 1 weight percent in some embodiments. The at least one rare earth oxide, in some embodiments, is present in an amount of at least 3 weight percent.

In some embodiments, a fiber glass strand of the present invention comprises a plurality of glass fibers comprising a glass composition that comprises the following components:

56-68 weight percent $SiO_2$;

11 to less than 20 weight percent $Al_2O_3$;

12 weight percent or less CaO;

7-17 weight percent MgO;

0-1 weight percent $Na_2O$;

0-1 weight percent $K_2O$;

0-5 weight percent $Li_2O$;

0-2 weight percent $TiO_2$;

0-3 weight percent $B_2O_3$;

0-1 weight percent $Fe_2O_3$;

0-4 weight percent $SnO_2$;

0-4 weight percent ZnO;

at least one rare earth oxide in an amount not less than 0.05 weight percent; and 0-11 weight percent total other constituents.

In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide is present in an amount of at least 1 weight percent in some embodiments. The at least one rare earth oxide, in some embodiments, is present in an amount of at least 3 weight percent. In some embodiments, the at least one rare earth oxide is present in an amount up to about 15 weight percent. The at least one rare earth oxide, in some embodiments, is present in an amount up to about 8 weight percent. In some embodiments, the at least one rare earth oxide is present in an amount up to about 5 weight percent.

In some embodiments, a fiber glass strand of the present invention comprises a plurality of glass fibers comprising a glass composition that comprises the following components:

60-68 weight percent $SiO_2$;

14-19 weight percent $Al_2O_3$;

5 weight percent or less CaO;

10-16 weight percent MgO;

0-1 weight percent $Na_2O$;

0-1 weight percent $K_2O$;

0-2 weight percent $Li_2O$;

0-2 weight percent $TiO_2$;

0-3 weight percent $B_2O_3$;

0-1 weight percent $Fe_2O_3$;

0-4 weight percent $SnO_2$;

0-4 weight percent ZnO;

at least one rare earth oxide in an amount not less than 1 weight percent; and 0-11 weight percent total other constituents.

In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide, in some embodiments, is present in an amount of at least 3 weight percent. In some embodiments, the at least one rare earth oxide is present in an amount up to about 15 weight percent. The at least one rare earth oxide, in some embodiments, is present in an amount up to about 8 weight percent. In some embodiments, the at least one rare earth oxide is present in an amount up to about 5 weight percent.

In some embodiments, a fiber glass strand of the present invention comprises a plurality of glass fibers comprising a glass composition that comprises the following components:

60-68 weight percent $SiO_2$;

14-19 weight percent $Al_2O_3$;

5 weight percent or less CaO;

10-16 weight percent MgO;

0-1 weight percent $Na_2O$;

0-1 weight percent $K_2O$;

0.4-2 weight percent $Li_2O$;

0-2 weight percent $TiO_2$;

0-3 weight percent $B_2O_3$;

0-1 weight percent $Fe_2O_3$;

0-4 weight percent $SnO_2$;

0-4 weight percent ZnO;

at least one rare earth oxide in an amount between about 1 and about 8 weight percent; and 0-11 weight percent total other constituents, wherein the $Na_2O+K_2O$ content is less than about 0.5 weight percent. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide, in some embodiments, is present in an amount of at least 3 weight percent. In some embodiments, the at least one rare earth oxide is present in an amount up to about 5 weight percent.

In some embodiments, a fiber glass strand of the present invention comprises a plurality of glass fibers comprising a glass composition that comprises the following components:

59-62 weight percent $SiO_2$;

14-19 weight percent $Al_2O_3$;

4-8 weight percent CaO;

6-11 weight percent MgO;

0-1 weight percent $Na_2O$;

0-1 weight percent $K_2O$;

0-2 weight percent $Li_2O$;

0-3 weight percent $TiO_2$;

0-3 weight percent $B_2O_3$;

0-1 weight percent $Fe_2O_3$;

0-2 weight percent $Cu_2O$;

0-3 weight percent SrO;

at least one rare earth oxide in an amount between about 2 and about 6 weight percent; and 0-11 weight percent total other constituents, wherein the $Na_2O+K_2O$ content is less than about 0.5 weight percent. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide, in some embodiments, is present in an amount of at least 3 weight percent. In some embodiments, the at least one rare earth oxide is present in an amount up to about 5 weight percent.

A number of other glass compositions are disclosed herein as part of the present invention, and other embodiments of the present invention relate to fiber glass strands formed from such compositions.

In some embodiments, glass fibers of the present invention can exhibit desirable mechanical and other properties. Glass fibers of the present invention, in some embodiments, can exhibit one or more improved mechanical properties relative to glass fibers formed from E-glass. In some embodiments, glass fibers of the present invention can provide one or more improved properties relative to glass fibers formed from R-glass and/or S-glass. Examples of desirable properties exhibited by some embodiments of glass fibers of the present invention include, without limitation, tensile strength, Young's modulus, coefficient of thermal expansion, softening point, elongation, and dielectric constant.

Glass fibers of the present invention can have desirable Young's modulus (E) values in some embodiments. In some embodiments, fibers formed from glass compositions of the present invention can have a Young's modulus greater than about 87 GPa. In some embodiments, glass fibers of the present invention can have a Young's modulus greater than about 90 GPa. Fibers formed from glass compositions of the present invention can have a Young's modulus greater than about 92 GPa in some embodiments. In some embodiments, glass fibers of the present invention can have a Young's modulus greater than about 93 GPa. Glass fibers of the present invention can have a Young's modulus greater than about 95 GPa in some embodiments. Unless otherwise stated herein, Young's modulus values discussed herein are determined using the procedure set forth in the Examples section below.

Glass fibers of the present invention, in some embodiments, can have desirable tensile strengths. In some embodiments, glass fibers of the present invention can have a tensile strength greater than 4000 MPa. Glass fibers of the present invention, in some embodiments, can have a tensile strength greater than 4,500 MPa. In some embodiments, glass fibers of the present invention can have a tensile strength greater than about 5000 MPa. Glass fibers of the present invention, in some embodiments, can have a tensile strength greater than about 5500 MPa or greater than about 5700 MPa. Unless otherwise stated herein, tensile strength values are determined using the procedure set forth in the Examples section.

Glass fibers of the present invention, in some embodiments, can have desirable elongation values. In some embodiments, glass fibers of the present invention can have an elongation of at least 5.0%. Glass fibers of the present invention can have an elongation of at least 5.5% in some embodiments. Glass fibers of the present invention can have an elongation of at least 6.0% in other embodiments. Unless otherwise stated herein, elongation values are determined using the procedure set forth in the Examples section.

Glass fibers of the present invention, in some embodiments, can have desirable coefficients of thermal expansion. In some embodiments, glass fibers of the present invention can have a coefficient of thermal expansion less than about 4.5 ppm/° C. Glass fibers of the present invention, in some embodiments, can have a coefficient of thermal expansion less than about 3.1 ppm/° C. Unless otherwise stated, coefficients of thermal expansion are determined using the procedure set forth in the Examples section.

Glass fibers of the present invention, in some embodiments, can have desirable softening points. In some embodiments, glass fibers of the present invention can have a softening point of at least about 900° C. Glass fibers of the present invention, in some embodiments, can have a softening point of at least about 950° C. Unless otherwise stated, softening point values are determined using the procedure set forth in the Examples section.

Glass fibers of the present invention, in some embodiments, can have dielectric constant values $(D_k)$ desirable for use in electronics applications. In some embodiments, glass fibers of the present invention can have a dielectric constant value $(D_k)$ of less than about 6.0 at 1 MHz frequency. Unless otherwise stated herein, dielectric constant $(D_k)$ is determined from 1 MHz to 1 GHz by ASTM Test Method D150—"Standard Test Methods for A-C Loss Characteristics and Permittivity (Dielectric Constant) of Solid Electrical Insulating Materials."

Fiber glass strands can comprise glass fibers of various diameters, depending on the desired application. In some embodiments, a fiber glass strand of the present invention comprises at least one glass fiber having a diameter between about 5 and about 18 μm. In other embodiments, the at least one glass fiber has a diameter between about 5 and about 10 μm.

In some embodiments, fiber glass strands of the present invention can be formed into rovings. Rovings can comprise assembled, multi-end, or single-end direct draw rovings. Rovings comprising fiber glass strands of the present invention can comprise direct draw single-end rovings having various diameters and densities, depending on the desired application. In some embodiments, a roving comprising fiber glass strands of the present invention exhibits a density up to about 112 yards/pound.

Some embodiments of the present invention relate to yarns comprising at least one fiber glass strand as disclosed herein. In some embodiments, a yarn of the present invention comprises at least one fiber glass strand comprising a glass composition that comprises 56-68 weight percent $SiO_2$, 11 to less than 20 weight percent $Al_2O_3$, 12 weight percent or less CaO, 7-17 weight percent MgO, 0-1 weight percent $Na_2O$, 0-1 weight percent $K_2O$, 0-5 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 0.05 weight percent, and 0-11 weight percent total other constituents. A yarn, in some embodiments, comprises at least one fiber glass strand comprising a glass composition that comprises 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 1 weight percent, and 0-11 weight percent total other constituents. In some embodiments, a yarn of the present invention comprises at least one fiber glass strand comprising a glass composition that comprises 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0.4-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount between about 1 and about 8 weight percent, and 0-11 weight percent total other constituents, wherein the $Na_2O+K_2O$ content is less than about 0.5 weight percent. In other embodiments, a yarn of the present invention can comprise at least one fiber glass strand comprising one of the other glass compositions disclosed herein as part of the present invention. In some embodiments, a yarn of the present invention comprises at least one fiber glass strand comprising a glass composition that comprises 59-62 weight percent $SiO_2$, 14-19 weight percent $Al_2O_3$; 4-8 weight percent CaO; 6-11 weight percent MgO; 0-1 weight percent $Na_2O$; 0-1 weight percent $K_2O$; 0-2 weight percent $Li_2O$; 0-3 weight percent $TiO_2$; 0-3 weight percent $B_2O_3$; 0-1 weight percent $Fe_2O_3$; 0-2 weight percent $Cu_2O$; 0-3 weight percent SrO; at least one rare earth oxide in an amount between about 2 and about 6 weight percent; and 0-11 weight percent total other constituents, wherein the $Na_2O+K_2O$ content is less than about 0.5 weight percent. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide, in some embodiments, is present in an amount of at least 3 weight percent. In some embodiments, the at least one rare earth oxide is present in an amount up to about 5 weight percent.

In some embodiments, a yarn of the present invention comprises at least one fiber glass strand as disclosed herein, wherein the at least one fiber glass strand is at least partially coated with a sizing composition. In some embodiments, the sizing composition is compatible with a thermosetting polymeric resin. In other embodiments, the sizing composition can comprise a starch-oil sizing composition.

Yarns can have various linear mass densities, depending on the desired application. In some embodiments, a yarn of the present invention has a linear mass density from about 5,000 yards/pound to about 10,000 yards/pound.

Yarns can have various twist levels and directions, depending on the desired application. In some embodiments, a yarn of the present invention has a twist in the z direction of about 0.5 to about 2 turns per inch. In other embodiments, a yarn of the present invention has a twist in the z direction of about 0.7 turns per inch.

Yarns can be made from one or more strands that are twisted together and/or plied, depending on the desired application. Yarns can be made from one or more strands that are twisted together but not plied; such yarns are known as "singles." Yarns of the present invention can be made from one or more strands that are twisted together but not plied. In some embodiments, yarns of the present invention comprise 1-4 strands twisted together. In other embodiments, yarns of the present invention comprise 1 twisted strand.

Some embodiments of the present invention relate to fabrics comprising at least one fiber glass strand. In some embodiments, a fabric comprises at least one fiber glass strand comprising a glass composition that comprises 56-68 weight percent $SiO_2$, 11 to less than 20 weight percent $Al_2O_3$, 12 weight percent or less CaO, 7-17 weight percent MgO, 0-1 weight percent $Na_2O$, 0-1 weight percent $K_2O$, 0-5 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 0.05 weight percent, and 0-11 weight percent total other constituents. A fabric, in some embodiments, comprises at least one fiber glass strand comprising a glass composition that comprises 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 1 weight percent, and 0-11 weight percent total other constituents. In some embodiments, a fabric comprises at least one fiber glass strand comprising a glass composition that comprises 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0.4-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount between about 1 and about 8 weight percent, and 0-11 weight percent total other constituents, wherein the $Na_2O+K_2O$ content is less than about 0.5 weight percent. In some embodiments, a fabric comprises at least one fiber glass strand comprising a glass composition that comprises 59-62 weight percent $SiO_2$, 14-19 weight percent $Al_2O_3$; 4-8 weight percent CaO; 6-11 weight percent MgO; 0-1 weight percent $Na_2O$; 0-1 weight percent $K_2O$; 0-2 weight percent $Li_2O$; 0-3 weight percent $TiO_2$; 0-3 weight percent $B_2O_3$; 0-1 weight percent $Fe_2O_3$; 0-2 weight percent $Cu_2O$; 0-3 weight percent SrO; at least one rare earth oxide in an amount between about 2 and about 6 weight percent; and 0-11 weight percent total other constituents, wherein the $Na_2O+K_2O$ content is less than about 0.5 weight percent. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide, in some embodiments, is present in an amount of at least 3 weight percent. In some embodiments, the at least one rare earth oxide is present in an amount up to about 5 weight percent. In other embodiments, a fabric of the present invention can comprise at least one fiber glass strand comprising one of the other glass compositions disclosed herein as part of the present invention. In some embodiments, a fabric of the present invention comprises a yarn as disclosed herein. Fabrics of the present invention, in some embodiments, can comprise at least one fill yarn comprising at least one fiber glass strand as disclosed herein. Fabrics of the present invention, in some embodiments, can comprise at least one warp yarn comprising at least one fiber glass strand as disclosed herein. In some embodiments, a fabric of the present invention comprises at least one fill yarn comprising at least one fiber glass strand as disclosed herein and at least one warp yarn comprising at least one fiber glass strand as disclosed herein.

In some embodiments of the present invention comprising a fabric, the glass fiber fabric is a fabric woven in accordance with industrial fabric style no. 7781. In other embodiments, the fabric comprises a plain weave fabric, a twill fabric, a crowfoot fabric, a satin weave fabric, a stitch bonded fabric (also known as a non-crimp fabric), or a "three-dimensional" woven fabric.

Some embodiments of the present invention relate to composites. In some embodiments, a composite of the present invention comprises a polymeric resin and a plurality of glass fibers disposed in the polymeric resin, wherein at least one of the plurality of glass fibers comprises a glass composition that comprises the following components: 56-68 weight percent $SiO_2$, 11 to less than 20 weight percent $Al_2O_3$, 12 weight percent or less CaO, 7-17 weight percent MgO, 0-1 weight percent $Na_2O$, 0-1 weight percent $K_2O$, 0-5 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 0.05 weight percent, and 0-11 weight percent total other constituents. A composite of the present invention, in some embodiments, comprises a polymeric resin and a plurality of glass fibers disposed in the polymeric resin, wherein at least one of the plurality of glass fibers comprises a glass composition that comprises the following components: 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 1 weight percent, and 0-11 weight percent total other constituents. In some embodiments, a composite of the present invention comprises a polymeric resin and a plurality of glass fibers disposed in the polymeric resin, wherein at least one of the plurality of glass fibers comprises a glass composition that comprises the following components: 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0.4-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount between about 1 and about 8 weight percent, and 0-11 weight percent total other constituents, wherein the $Na_2O+K_2O$ content is less than about 0.5 weight percent. A composite of the present invention, in some embodiments, comprises a polymeric resin and a plurality of glass fibers disposed in the polymeric resin, wherein at least one of the plurality of glass fibers comprises a glass composition that comprises the following components: 59-62 weight percent $SiO_2$, 14-19 weight percent $Al_2O_3$; 4-8 weight percent CaO; 6-11 weight percent MgO; 0-1 weight percent $Na_2O$; 0-1 weight percent $K_2O$; 0-2 weight percent $Li_2O$; 0-3 weight percent $TiO_2$; 0-3 weight percent $B_2O_3$; 0-1 weight percent $Fe_2O_3$; 0-2 weight percent $Cu_2O$; 0-3 weight percent SrO; at least one rare earth oxide in an amount between about 2 and about 6 weight percent; and 0-11 weight percent total other constituents, wherein the $Na_2O+K_2O$ content is less than about 0.5 weight percent. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide, in some embodiments, is present in an amount of at least 3 weight percent. In some embodiments, the at least one rare earth oxide is present in an amount up to about 5 weight percent. In other embodiments, a composite of the present invention can comprise a polymeric resin and a plurality of glass fibers disposed in the polymeric resin, wherein at least one of the plurality of glass fibers was formed from one of the other glass compositions disclosed herein as part of the present invention. In some embodiments, a composite of the present invention comprises a polymeric resin and at least one fiber glass strand as disclosed herein disposed in the polymeric resin. In some embodiments, a composite of the present invention comprises a polymeric resin and at least a portion of a roving comprising at least one fiber glass strand as disclosed herein disposed in the polymeric resin. In other embodiments, a composite of the present invention comprises a polymeric resin and at least one yarn as disclosed herein disposed in the polymeric resin. In still other embodiments, a composite of the present invention comprises a polymeric resin and at least one fabric as disclosed herein disposed in the polymeric resin. In some embodiments, a composite of the present invention comprises at least one fill yarn comprising at least one fiber glass strand as disclosed herein and at least one warp yarn comprising at least one fiber glass strand as disclosed herein.

Composites of the present invention can comprise various polymeric resins, depending on the desired properties and applications. In some embodiments of the present invention comprising a composite, the polymeric resin comprises an epoxy resin. In other embodiments of the present invention comprising a composite, the polymeric resin can comprise polyethylene, polypropylene, polyamide, polyimide, polybutylene terephthalate, polycarbonate, thermoplastic polyurethane, phenolic, polyester, vinyl ester, polydicyclopentadiene, polyphenylene sulfide, polyether ether ketone, cyanate esters, bis-maleimides, and thermoset polyurethane resins.

Some embodiments of the present invention relate to aerospace composites. In some embodiments, an aerospace composite of the present invention exhibits properties desirable for use in aerospace applications, such as high strength, high elongation, high modulus, and/or low density.

In some embodiments, an aerospace composite of the present invention comprises a polymeric resin and a plurality of glass fibers disposed in the polymeric resin, wherein at least one of the plurality of glass fibers comprises a glass composition that comprises the following components: 56-68 weight percent $SiO_2$, 11 to less than 20 weight percent $Al_2O_3$, 12 weight percent or less CaO, 7-17 weight percent MgO, 0-1 weight percent $Na_2O$, 0-1 weight percent $K_2O$, 0-5 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 0.05 weight percent, and 0-11 weight percent total other constituents. An aerospace composite of the present invention, in some embodiments, comprises a polymeric resin and a plurality of glass fibers disposed in the polymeric resin, wherein at least one of the plurality of glass fibers comprises a glass composition that comprises the following components: 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 1 weight percent, and 0-11 weight percent total other constituents. In some embodiments, an aerospace composite of the present invention comprises a polymeric resin and a plurality of glass fibers disposed in the polymeric resin, wherein at least one of the plurality of glass fibers comprises a glass composition that comprises the following components: 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0.4-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount between about 1 and about 8 weight percent, and 0-11 weight percent total other constituents, wherein the $Na_2O+K_2O$ content is less than about 0.5 weight percent. In some embodiments, an aerospace composite of the present invention comprises a polymeric resin and a plurality of glass fibers disposed in the polymeric resin, wherein at least one of the plurality of glass fibers comprises a glass composition that comprises the following components: 59-62 weight percent $SiO_2$, 14-19 weight percent $Al_2O_3$; 4-8 weight percent CaO; 6-11 weight percent MgO; 0-1 weight percent $Na_2O$; 0-1 weight percent $K_2O$; 0-2 weight percent $Li_2O$; 0-3 weight percent $TiO_2$; 0-3 weight percent $B_2O_3$; 0-1 weight percent $Fe_2O_3$; 0-2 weight percent $Cu_2O$; 0-3 weight percent SrO; at least one rare earth oxide in an amount between about 2 and about 6 weight percent; and 0-11 weight percent total other constituents, wherein the $Na_2O+K_2O$ content is less than about 0.5 weight percent. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide, in some embodiments, is present in an amount of at least 3 weight percent. In some embodiments, the at least one rare earth oxide is present in an amount up to about 5 weight percent. In other embodiments, an aerospace composite of the present invention can comprise a polymeric resin and a plurality of glass fibers disposed in the polymeric resin, wherein at least one of the plurality of glass fibers was formed from one of the other glass compositions disclosed herein as part of the present invention.

In some embodiments, an aerospace composite of the present invention comprises a polymeric resin and at least one fiber glass strand as disclosed herein disposed in the polymeric resin. In some embodiments, an aerospace composite of the present invention comprises a polymeric resin and at least a portion of a roving comprising at least one fiber glass strand as disclosed herein disposed in the polymeric resin. In other embodiments, an aerospace composite of the present invention comprises a polymeric resin and at least one yarn as disclosed herein disposed in the polymeric resin. In still other embodiments, an aerospace composite of the present invention comprises a polymeric resin and at least one fabric as disclosed herein disposed in the polymeric resin. In some embodiments, an aerospace composite of the present invention comprises at least one fill yarn comprising at least one fiber glass strand as disclosed herein and at least one warp yarn comprising at least one fiber glass strand as disclosed herein.

Aerospace composites of the present invention can comprise various polymeric resins, depending on the desired properties and applications. In some embodiments of the present invention comprising an aerospace composite, the polymeric resin comprises an epoxy resin. In other embodiments of the present invention comprising an aerospace composite, the polymeric resin can comprise polyethylene, polypropylene, polyamide, polyimide, polybutylene terephthalate, polycarbonate, thermoplastic polyurethane, phenolic, polyester, vinyl ester, polydicyclopentadiene, polyphenylene sulfide, polyether ether ketone, cyanate esters, bismaleimides, and thermoset polyurethane resins. Examples of parts in which aerospace composites of the present invention might be used can include, but are not limited to floor panels, overhead bins, galleys, seat back, and other internal compartments that are potentially prone to impact, as well as external components such as helicopter rotor blades.

Some embodiments of the present invention relate to aviation composites. In some embodiments, an aviation composite of the present invention exhibits properties desirable for use in aviation applications, such as high strength, high elongation, high modulus, lower density, high specific strength, and/or high specific modulus. The high elongation of some aviation composites of the present invention can make such composites especially desirable for use in aviation applications in which high impact resistance is important, such as aircraft interior applications. In some embodiments, aviation composites of the present invention can demonstrate increased impact performance as compared to composites formed from E-glass fabrics. Aviation composites of the present invention can be suitable for use in aircraft interiors (including, among other things, luggage storage bins, seats, and floors).

In some embodiments, an aviation composite of the present invention comprises a polymeric resin and a plurality of glass fibers disposed in the polymeric resin, wherein at least one of the plurality of glass fibers comprises a glass composition that comprises the following components: 56-68 weight percent $SiO_2$, 11 to less than 20 weight percent $Al_2O_3$, 12 weight percent or less CaO, 7-17 weight percent MgO, 0-1 weight percent $Na_2O$, 0-1 weight percent $K_2O$, 0-5 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 0.05 weight percent, and 0-11 weight percent total other constituents. An aviation composite of the present invention, in some embodiments, comprises a polymeric resin and a plurality of glass fibers disposed in the polymeric resin, wherein at least one of the plurality of glass fibers comprises a glass composition that comprises the following components: 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 1 weight percent, and 0-11 weight percent total other constituents. In some embodiments, an aviation composite of the present invention comprises a polymeric resin and a plurality of glass fibers disposed in the polymeric resin, wherein at least one of the plurality of glass fibers comprises a glass composition that comprises the following components: 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0.4-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount between about 1 and about 8 weight percent, and 0-11 weight percent total other constituents, wherein the $Na_2O+K_2O$ content is less than about 0.5 weight percent. In some embodiments, an aviation composite of the present invention comprises a polymeric resin and a plurality of glass fibers disposed in the polymeric resin, wherein at least one of the plurality of glass fibers comprises a glass composition that comprises the following components: 59-62 weight percent $SiO_2$, 14-19 weight percent $Al_2O_3$; 4-8 weight percent CaO; 6-11 weight percent MgO; 0-1 weight percent $Na_2O$; 0-1 weight percent $K_2O$; 0-2 weight percent $Li_2O$; 0-3 weight percent $TiO_2$; 0-3 weight percent $B_2O_3$; 0-1 weight percent $Fe_2O_3$; 0-2 weight percent $Cu_2O$; 0-3 weight percent SrO; at least one rare earth oxide in an amount between about 2 and about 6 weight percent; and 0-11 weight percent total other constituents, wherein the $Na_2O+K_2O$ content is less than about 0.5 weight percent. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide, in some embodiments, is present in an amount of at least 3 weight percent. In some embodiments, the at least one rare earth oxide is present in an amount up to about 5 weight percent. In other embodiments, an aviation composite of the present invention can comprise a polymeric resin and a plurality of glass fibers disposed in the polymeric resin, wherein at least one of the plurality of glass fibers was formed from one of the other glass compositions disclosed herein as part of the present invention.

In some embodiments, an aviation composite of the present invention comprises a polymeric resin and at least one fiber glass strand as disclosed herein disposed in the polymeric resin. In some embodiments, an aviation composite of the present invention comprises a polymeric resin and at least a portion of a roving comprising at least one fiber glass strand as disclosed herein disposed in the polymeric resin. In other embodiments, an aviation composite of the present invention comprises a polymeric resin and at least one yarn as disclosed herein disposed in the polymeric resin. In still other embodiments, an aviation composite of the present invention comprises a polymeric resin and at least one fabric as disclosed herein disposed in the polymeric resin. In some embodiments, an aviation composite of the present invention comprises at least one fill yarn comprising at least one fiber glass strand as disclosed herein and at least one warp yarn comprising at least one fiber glass strand as disclosed herein.

Aviation composites of the present invention can comprise various polymeric resins, depending on the desired properties and applications. In some embodiments of the present invention comprising an aviation composite, the polymeric resin comprises a phenolic resin. In other embodiments of the present invention comprising an aviation composite, the polymeric resin can comprise epoxy, polyethylene, polypropylene, polyamide, polyimide, polybutylene terephthalate, polycarbonate, thermoplastic polyurethane, phenolic, polyester, vinyl ester, polydicyclopentadiene, polyphenylene sulfide, polyether ether ketone, cyanate esters, bis-maleimides, and thermoset polyurethane resins. Examples of parts in which aviation composites of the present invention might be used can include, but are not limited to, floor panels, overhead bins, galleys, seat back, and other internal compartments that are potentially prone to impact, as well as external components such as helicopter rotor blades.

Some embodiments of the present invention relate to automotive composites. In some embodiments, an automotive composite of the present invention exhibits properties desirable for use in automotive applications, such as high strength, high elongation and low fiber density. The combination of high strength and high elongation (or failure-to-strain) of some composites of the present invention can make such composites especially desirable for use in automotive applications in which high impact resistance is important, such as automobile structural components, bodies, and bumpers. In some embodiments, automotive composites of the present invention can demonstrate increased impact performance as compared to composites formed from E-glass fabrics, R-glass fabrics, and/or S-glass fabrics.

In some embodiments, an automotive composite of the present invention comprises a polymeric resin and a plurality of glass fibers disposed in the polymeric resin, wherein at least one of the plurality of glass fibers comprises a glass composition that comprises the following components: 56-68 weight percent $SiO_2$, 11 to less than 20 weight percent $Al_2O_3$, 12 weight percent or less CaO, 7-17 weight percent MgO, 0-1 weight percent $Na_2O$, 0-1 weight percent $K_2O$, 0-5 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 0.05 weight percent, and 0-11 weight percent total other constituents. An automotive composite of the present invention, in some embodiments, comprises a polymeric resin and a plurality of glass fibers disposed in the polymeric resin, wherein at least one of the plurality of glass fibers comprises a glass composition that comprises the following components: 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 1 weight percent, and 0-11 weight percent total other constituents. In some embodiments, an automotive composite of the present invention comprises a polymeric resin and a plurality of glass fibers disposed in the polymeric resin, wherein at least one of the plurality of glass fibers comprises a glass composition that comprises the following components: 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0.4-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount between about 1 and about 8 weight percent, and 0-11 weight percent total other constituents, wherein the $Na_2O+K_2O$ content is less than about 0.5 weight percent. In some embodiments, an automotive composite of the present invention comprises a polymeric resin and a plurality of glass fibers disposed in the polymeric resin, wherein at least one of the plurality of glass fibers comprises a glass composition that comprises the following components: 59-62 weight percent $SiO_2$, 14-19 weight percent $Al_2O_3$; 4-8 weight percent CaO; 6-11 weight percent MgO;

0-1 weight percent $Na_2O$; 0-1 weight percent $K_2O$; 0-2 weight percent $Li_2O$; 0-3 weight percent $TiO_2$; 0-3 weight percent $B_2O_3$; 0-1 weight percent $Fe_2O_3$; 0-2 weight percent $Cu_2O$; 0-3 weight percent SrO; at least one rare earth oxide in an amount between about 2 and about 6 weight percent; and 0-11 weight percent total other constituents, wherein the $Na_2O+K_2O$ content is less than about 0.5 weight percent. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide, in some embodiments, is present in an amount of at least 3 weight percent. In some embodiments, the at least one rare earth oxide is present in an amount up to about 5 weight percent. In other embodiments, an automotive composite of the present invention can comprise a polymeric resin and a plurality of glass fibers disposed in the polymeric resin, wherein at least one of the plurality of glass fibers was formed from one of the other glass compositions disclosed herein as part of the present invention.

In some embodiments, an automotive composite of the present invention comprises a polymeric resin and at least one fiber glass strand as disclosed herein disposed in the polymeric resin. In some embodiments, an automotive composite of the present invention comprises a polymeric resin and at least a portion of a roving comprising at least one fiber glass strand as disclosed herein disposed in the polymeric resin. In other embodiments, an automotive composite of the present invention comprises a polymeric resin and at least one yarn as disclosed herein disposed in the polymeric resin. In still other embodiments, an automotive composite of the present invention comprises a polymeric resin and at least one fabric as disclosed herein disposed in the polymeric resin. In some embodiments, an automotive composite of the present invention comprises at least one fill yarn comprising at least one fiber glass strand as disclosed herein and at least one warp yarn comprising at least one fiber glass strand as disclosed herein.

Automotive composites of the present invention can comprise various polymeric resins, depending on the desired properties and applications. In some embodiments of the present invention comprising an automotive composite, the polymeric resin can comprise a thermoplastic resin or a thermosetting resin. Examples of common thermoplastic resins used in automotive composites include, without limitation, polypropylene, polyamide, high temperature polyamide, polyester, and other thermoplastic resins known to those of skill in the art. Examples of common thermosetting resins used in automotive composites include, without limitation, epoxy, phenolic, polyester, and other thermosetting resins known to those of skill in the art. Examples of parts in which automotive composites of the present invention might be used can include, but are not limited to, automobile structural components, bodies, and bumpers.

Some embodiments of the present invention relate to composites that can be used in wind energy applications. In some embodiments, a composite of the present invention suitable for use in wind energy applications exhibits properties desirable for use in wind energy applications, such as high modulus, high elongation, low fiber density, and/or high specific modulus. Composites of the present invention can be suitable for use in wind turbine blades, particularly long wind turbine blades that are lighter weight but still strong compared to other long wind turbine blades.

In some embodiments, a composite of the present invention suitable for use in wind energy applications comprises a polymeric resin and a plurality of glass fibers disposed in the polymeric resin, wherein at least one of the plurality of glass fibers comprises a glass composition that comprises the following components: 56-68 weight percent $SiO_2$, 11 to less than 20 weight percent $Al_2O_3$, 12 weight percent or less CaO, 7-17 weight percent MgO, 0-1 weight percent $Na_2O$, 0-1 weight percent $K_2O$, 0-5 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 0.05 weight percent, and 0-11 weight percent total other constituents. A composite of the present invention suitable for use in wind energy applications, in some embodiments, comprises a polymeric resin and a plurality of glass fibers disposed in the polymeric resin, wherein at least one of the plurality of glass fibers comprises a glass composition that comprises the following components: 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 1 weight percent, and 0-11 weight percent total other constituents. In some embodiments, a composite of the present invention suitable for use in wind energy applications comprises a polymeric resin and a plurality of glass fibers disposed in the polymeric resin, wherein at least one of the plurality of glass fibers comprises a glass composition that comprises the following components: 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0.4-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount between about 1 and about 8 weight percent, and 0-11 weight percent total other constituents, wherein the $Na_2O+K_2O$ content is less than about 0.5 weight percent. In some embodiments, a composite of the present invention suitable for use in wind energy applications comprises a polymeric resin and a plurality of glass fibers disposed in the polymeric resin, wherein at least one of the plurality of glass fibers comprises a glass composition that comprises the following components: 59-62 weight percent $SiO_2$, 14-19 weight percent $Al_2O_3$; 4-8 weight percent CaO; 6-11 weight percent MgO; 0-1 weight percent $Na_2O$; 0-1 weight percent $K_2O$; 0-2 weight percent $Li_2O$; 0-3 weight percent $TiO_2$; 0-3 weight percent $B_2O_3$; 0-1 weight percent $Fe_2O_3$; 0-2 weight percent $Cu_2O$; 0-3 weight percent SrO; at least one rare earth oxide in an amount between about 2 and about 6 weight percent; and 0-11 weight percent total other constituents, wherein the $Na_2O+K_2O$ content is less than about 0.5 weight percent. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide, in some embodiments, is present in an amount of at least 3 weight percent. In some embodiments, the at least one rare earth oxide is present in an amount up to about 5 weight percent. In other embodiments, a composite suitable for use in wind energy applications of the present invention can comprise a polymeric resin and a plurality of glass fibers disposed in the polymeric resin, wherein at least one of the plurality of glass fibers was formed from one of the other glass compositions disclosed herein as part of the present invention.

In some embodiments, a composite of the present invention suitable for use in wind energy applications comprises a polymeric resin and at least one fiber glass strand as disclosed herein disposed in the polymeric resin. In some embodiments, a composite of the present invention suitable for use in wind energy applications comprises a polymeric resin and at least a portion of a roving comprising at least one fiber glass strand as disclosed herein disposed in the polymeric resin. In other embodiments, a composite of the present invention suitable for use in wind energy applications comprises a polymeric resin and at least one yarn as disclosed herein disposed in the polymeric resin. In still other embodiments, a composite of the present invention suitable for use in wind energy applications comprises a polymeric resin and at least one fabric as disclosed herein disposed in the polymeric resin. In some embodiments, a composite of the present invention suitable for use in wind energy applications comprises at least one fill yarn comprising at least one fiber glass strand as disclosed herein and at least one warp yarn comprising at least one fiber glass strand as disclosed herein.

Composites of the present invention suitable for use in wind energy applications can comprise various polymeric resins, depending on the desired properties and applications. In some embodiments of the present invention comprising a composite suitable for use in wind energy applications, the polymeric resin comprises an epoxy resin. In other embodiments of the present invention comprising a composite suitable for use in wind energy applications, the polymeric resin can comprise polyester resins, vinyl esters, thermoset polyurethanes, or polydicyclopentadiene resins.

Some embodiments of the present invention relate to composites for use in high pressure vessels and/or tanks. In some embodiments, a composite for use in high pressure vessels and/or tanks of the present invention exhibits properties desirable for use in such applications, such as high strength, high elongation, low density, and/or high specific strength.

In some embodiments, a composite for use in high pressure vessels and/or tanks of the present invention comprises a polymeric resin and a plurality of glass fibers disposed in the polymeric resin, wherein at least one of the plurality of glass fibers comprises a glass composition that comprises the following components: 56-68 weight percent $SiO_2$, 11 to less than 20 weight percent $Al_2O_3$, 12 weight percent or less CaO, 7-17 weight percent MgO, 0-1 weight percent $Na_2O$, 0-1 weight percent $K_2O$, 0-5 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 0.05 weight percent, and 0-11 weight percent total other constituents. A composite for use in high pressure vessels and/or tanks of the present invention, in some embodiments, comprises a polymeric resin and a plurality of glass fibers disposed in the polymeric resin, wherein at least one of the plurality of glass fibers comprises a glass composition that comprises the following components: 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 1 weight percent, and 0-11 weight percent total other constituents. In some embodiments, a composite for use in high pressure vessels and/or tanks of the present invention comprises a polymeric resin and a plurality of glass fibers disposed in the polymeric resin, wherein at least one of the plurality of glass fibers comprises a glass composition that comprises the following components: 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0.4-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount between about 1 and about 8 weight percent, and 0-11 weight percent total other constituents, wherein the $Na_2O+K_2O$ content is less than about 0.5 weight percent. In some embodiments, a composite for use in high pressure vessels and/or tanks of the present invention comprises a polymeric resin and a plurality of glass fibers disposed in the polymeric resin, wherein at least one of the plurality of glass fibers comprises a glass composition that comprises the following components: 59-62 weight percent $SiO_2$, 14-19 weight percent $Al_2O_3$; 4-8 weight percent CaO; 6-11 weight percent MgO; 0-1 weight percent $Na_2O$; 0-1 weight percent $K_2O$; 0-2 weight percent $Li_2O$; 0-3 weight percent $TiO_2$; 0-3 weight percent $B_2O_3$; 0-1 weight percent $Fe_2O_3$; 0-2 weight percent $Cu_2O$; 0-3 weight percent SrO; at least one rare earth oxide in an amount between about 2 and about 6 weight percent; and 0-11 weight percent total other constituents, wherein the $Na_2O+K_2O$ content is less than about 0.5 weight percent. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide, in some embodiments, is present in an amount of at least 3 weight percent. In some embodiments, the at least one rare earth oxide is present in an amount up to about 5 weight percent. In other embodiments, a composite for use in high pressure vessels and/or tanks of the present invention can comprise a polymeric resin and a plurality of glass fibers disposed in the polymeric resin, wherein at least one of the plurality of glass fibers was formed from one of the other glass compositions disclosed herein as part of the present invention.

In some embodiments, a composite for use in high pressure vessels and/or tanks of the present invention comprises a polymeric resin and at least one fiber glass strand as disclosed herein disposed in the polymeric resin. In some embodiments, a composite for use in high pressure vessels and/or tanks of the present invention comprises a polymeric resin and at least a portion of a roving comprising at least one fiber glass strand as disclosed herein disposed in the polymeric resin. In other embodiments, a composite for use in high pressure vessels and/or tanks of the present invention comprises a polymeric resin and at least one yarn as disclosed herein disposed in the polymeric resin. In still other embodiments, a composite for use in high pressure vessels and/or tanks of the present invention comprises a polymeric resin and at least one fabric as disclosed herein disposed in the polymeric resin. In some embodiments, a composite for use in high pressure vessels and/or tanks of the present invention comprises at least one fill yarn comprising at least one fiber glass strand as disclosed herein and at least one warp yarn comprising at least one fiber glass strand as disclosed herein.

Composites for use in high pressure vessels and/or tanks of the present invention can comprise various polymeric resins, depending on the desired properties and applications. In some embodiments of the present invention comprising a composite for use in high pressure vessels and/or tanks, the polymeric resin can comprise a thermosetting resin. Examples of common thermosetting resins used in high pressure vessels and/or tanks include, without limitation, epoxy, phenolic, polyester, vinyl ester and other thermosetting resins known to those of skill in the art.

In some embodiments, composites of the present invention can be useful in safety and/or security applications. For example, composites of the present invention, in some embodiments, are suitable for use in high mechanical stress applications, including, but not limited to, high energy impact applications. Glass fibers useful in some embodiments of the present invention can exhibit properties especially desirable for high energy impact applications such as ballistic or blast resistance applications. Compared to glass fibers comprising E-glass, glass fibers useful in some embodiments of the present invention can exhibit low dielectric constant, low dielectric loss, high glass transition temperature and/or low thermal expansion.

In some embodiments, composites of the present invention can be suitable for use in armor applications. For example, some embodiments of composites can be used in the production of armor panels. In some embodiments, a composite of the present invention can be formed into a panel, wherein the panel are expected to exhibit desirable 0.30 cal FSP ("fragment simulating projectile") V50 values (e.g., at least about 900 feet per second (fps) at a panel areal density of about 2 $lb/ft^2$ and a panel thickness of about 5-6 mm) when measured by the U.S. Department of Defense Test Method Standard for V50 Ballistic Test for Armor, MIL-STD-662F, December 1997 (hereinafter "MIL-STD-662F"), the entirety of which is incorporated herein by reference. In this context, the term "composite" refers generically to a material comprising a polymeric resin and a plurality of glass fibers disposed in the polymeric resin, whereas the term "panel" refers to a composite having sheet-like physical dimensions or shape. In other embodiments, a composite of the present invention can be formed into a panel, wherein the panel is expected to exhibit desirable 0.50 cal FSP V50 values (e.g., at least about 1200 fps at a panel areal density of about 4.8-4.9 $lb/ft^2$ and a panel thickness of about 13-13.5 mm) when measured by MIL-STD-662F. As V50 values can depend on the panel areal density and the panel thickness, composites of the present invention can have different V50 values depending on how the panel is constructed. One advantage of some embodiments of the present invention is the provision of composites having higher V50 values than similarly constructed composites assembled using E-glass fibers.

In some embodiments, a composite of the present invention comprises a polymeric resin and a plurality of glass fibers disposed in the polymeric resin, wherein at least one of the plurality of glass fibers comprises a glass composition that comprises the following components: 56-68 weight percent $SiO_2$, 11 to less than 20 weight percent $Al_2O_3$, 12 weight percent or less CaO, 7-17 weight percent MgO, 0-1 weight percent $Na_2O$, 0-1 weight percent $K_2O$, 0-5 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 0.05 weight percent, and 0-11 weight percent total other constituents, wherein the composite is adapted for use in ballistics or blast resistance applications. A composite of the present invention, in some embodiments, comprises a polymeric resin and a plurality of glass fibers disposed in the polymeric resin, wherein at least one of the plurality of glass fibers comprises a glass composition that comprises the following components: 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 1 weight percent, and 0-11 weight percent total other constituents, and wherein the composite is adapted for use in ballistics or blast resistance applications. In some embodiments, a composite of the present invention comprises a polymeric resin and a plurality of glass fibers disposed in the polymeric resin, wherein at least one of the plurality of glass fibers comprises a glass composition that comprises the following components: 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0.4-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount between about 1 and about 8 weight percent, and 0-11 weight percent total other constituents, wherein the $Na_2O+K_2O$ content is less than about 0.5 weight percent, wherein the composite is adapted for use in ballistics or blast resistance applications. A composite of the present invention, in some embodiments, comprises a polymeric resin and a plurality of glass fibers disposed in the polymeric resin, wherein at least one of the plurality of glass fibers comprises a glass composition that comprises the following components: 59-62 weight percent $SiO_2$, 14-19 weight percent $Al_2O_3$; 4-8 weight percent CaO; 6-11 weight percent MgO; 0-1 weight percent $Na_2O$; 0-1 weight percent $K_2O$; 0-2 weight percent $Li_2O$; 0-3 weight percent $TiO_2$; 0-3 weight percent $B_2O_3$; 0-1 weight percent $Fe_2O_3$; 0-2 weight percent $Cu_2O$; 0-3 weight percent SrO; at least one rare earth oxide in an amount between about 2 and about 6 weight percent; and 0-11 weight percent total other constituents, wherein the $Na_2O+K_2O$ content is less than about 0.5 weight percent. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide, in some embodiments, is present in an amount of at least 3 weight percent. In some embodiments, the at least one rare earth oxide is present in an amount up to about 5 weight percent and wherein the composite is adapted for use in ballistics or blast resistance applications. In other embodiments, a composite of the present invention adapted for use in ballistics or blast resistance applications can comprise a polymeric resin and a plurality of glass fibers disposed in the polymeric resin, wherein at least one of the plurality of glass fibers was formed from one of the other glass compositions disclosed herein as part of the present invention.

Some embodiments of the present invention relate to panels, such as armor panels, comprising composites of the present invention. In some embodiments, a composite of the present invention can be formed into a panel, wherein the panel is expected to exhibit desirable 0.30 cal FSP V50 values (e.g., at least about 900 fps at a panel areal density of about 2 lb/ft$^2$ and a panel thickness of about 5-6 mm) when measured by MIL-STD-662F. In other embodiments, a composite of the present invention can be formed into a panel, wherein the panel is expected to exhibit desirable 0.30 cal FSP V50 values (e.g., at least about 1000 fps at a panel areal density of about 2 lb/ft$^2$ and a panel thickness of about 5-6 mm) when measured by MIL-STD-662F. In still other embodiments of the present invention, a composite can be formed into a panel, wherein the panel is expected to exhibit desirable 0.30 cal FSP V50 values (e.g., at least about 1100 fps at a panel areal density of about 2 lb/ft$^2$ and a panel thickness of about 5-6 mm) when measured by MIL-STD-662F. In some embodiments of the present invention, a composite can be formed into a panel, wherein the panel is expected to exhibit desirable 0.30 cal FSP V50 values (e.g., about 900 fps to about 1140 fps at a panel areal density of about 2 lb/ft$^2$ and a panel thickness of about 5-6 mm) when measured by MIL-STD-662F.

In some embodiments, a composite of the present invention can be formed into a panel, wherein the panel is expected to exhibit desirable 0.50 cal FSP V50 values (e.g., at least about 1200 fps at a panel areal density of about 4.8-4.9 lb/ft$^2$ and a panel thickness of about 13-13.5 mm) when measured by MIL-STD-662F. In other embodiments of the present invention, a composite can be formed into a panel, wherein the panel is expected to exhibit desirable 0.50 cal FSP V50 values (at least about 1300 fps at a panel areal density of about 4.8-4.9 lb/ft$^2$ and a panel thickness of about 13-13.5 mm) when measured by MIL-STD-662F. In still other embodiments of the present invention, a composite can be formed into a panel, wherein the panel is expected to exhibit desirable 0.50 cal FSP V50 values (at least about 1400 fps at a panel areal density of about 4.8-4.9 lb/ft$^2$ and a panel thickness of about 13-13.5 mm) when measured by MIL-STD-662F. In some embodiments of the present invention, a composite can be formed into a panel, wherein the panel is expected to exhibit desirable 0.50 cal FSP V50 values (e.g., about 1200 fps to about 1440 fps at a panel areal density of about 4.8-4.9 lb/ft$^2$ and a panel thickness of about 13-13.5 mm) when measured by MIL-STD-662F.

Composites of the present invention adapted for use in ballistics or blast resistance can comprise various polymeric resins. In some embodiments of the present invention, a composite comprises a polymeric resin and a plurality of glass fibers disposed in the polymeric resin, wherein at least one of the plurality of glass fibers comprises a glass composition as disclosed herein, the composite can be formed into a panel, such as an armor panel for ballistic or blast resistance, and the polymeric resin comprises an epoxy resin. A composite of the present invention, in some embodiments, comprises a polymeric resin and a plurality of glass fibers disposed in the polymeric resin, wherein at least one of the plurality of glass fibers comprises a glass composition as disclosed herein, the composite can be formed into a panel, such as an armor panel for ballistic or blast resistance, and the polymeric resin comprises a polydicyclopentadiene resin. In some embodiments of the present invention, the polymeric resin can comprise polyethylene, polypropylene, polyamides (including Nylon), polybutylene terephthalate, polycarbonate, thermoplastic polyurethane, phenolic, polyester, vinyl ester, thermoset polyurethane, cyanate esters, or bis-maleimide resins.

Some embodiments of the present invention relate to composites for use in casings for missiles and other explosive delivery devices. In some embodiments, a composite for use in casings for missiles and other explosive delivery devices of the present invention exhibits properties desirable for use in such applications, such as high modulus, high strength, high elongation, low coefficient of thermal expansion, high glass softening temperature, and/or high glass transition temperature.

In some embodiments, a composite for use in casings for missiles and other explosive delivery devices of the present invention comprises a polymeric resin and a plurality of glass fibers disposed in the polymeric resin, wherein at least one of the plurality of glass fibers comprises a glass composition that comprises the following components: 56-68 weight percent $SiO_2$, 11 to less than 20 weight percent $Al_2O_3$, 12 weight percent or less CaO, 7-17 weight percent MgO, 0-1 weight percent $Na_2O$, 0-1 weight percent $K_2O$, 0-5 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 0.05 weight percent, and 0-11 weight percent total other constituents. A composite for use in casings for missiles and other explosive delivery devices of the present invention, in some embodiments, comprises a polymeric resin and a plurality of glass fibers disposed in the polymeric resin, wherein at least one of the plurality of glass fibers comprises a glass composition that comprises the following components: 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 1 weight percent, and 0-11 weight percent total other constituents. In some embodiments a composite for use in casings for missiles and other explosive delivery devices of the present invention comprises a polymeric resin and a plurality of glass fibers disposed in the polymeric resin, wherein at least one of the plurality of glass fibers comprises a glass composition that comprises the following components: 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0.4-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount between about 1 and about 8 weight percent, and 0-11 weight percent total other constituents, wherein the $Na_2O+K_2O$ content is less than about 0.5 weight percent. In some embodiments, a composite for use in casings for missiles and other explosive delivery devices of the present invention comprises a polymeric resin and a plurality of glass fibers disposed in the polymeric resin, wherein at least one of the plurality of glass fibers comprises a glass composition that comprises the following components: 59-62 weight percent $SiO_2$, 14-19 weight percent $Al_2O_3$; 4-8 weight percent CaO; 6-11 weight percent MgO; 0-1 weight percent $Na_2O$; 0-1 weight percent $K_2O$; 0-2 weight percent $Li_2O$; 0-3 weight percent $TiO_2$; 0-3 weight percent $B_2O_3$; 0-1 weight percent $Fe_2O_3$; 0-2 weight percent $Cu_2O$; 0-3 weight percent SrO; at least one rare earth oxide in an amount between about 2 and about 6 weight percent; and 0-11 weight percent total other constituents, wherein the $Na_2O+K_2O$ content is less than about 0.5 weight percent. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide, in some embodiments, is present in an amount of at least 3 weight percent. In some embodiments, the at least one rare earth oxide is present in an amount up to about 5 weight percent. In other embodiments, a composite for use in casings for missiles and other explosive delivery devices of the present invention can comprise a polymeric resin and a plurality of glass fibers disposed in the polymeric resin, wherein at least one of the plurality of glass fibers was formed from one of the other glass compositions disclosed herein as part of the present invention.

In some embodiments, a composite for use in casings for missiles and other explosive delivery devices of the present invention comprises a polymeric resin and at least one fiber glass strand as disclosed herein disposed in the polymeric resin. In some embodiments, a composite for use in casings for missiles and other explosive delivery devices of the present invention comprises a polymeric resin and at least a portion of a roving comprising at least one fiber glass strand as disclosed herein disposed in the polymeric resin. In other embodiments, a composite for use in casings for missiles and other explosive delivery devices of the present invention comprises a polymeric resin and at least one yarn as disclosed herein disposed in the polymeric resin. In still other embodiments, a composite for use in casings for missiles and other explosive delivery devices of the present invention comprises a polymeric resin and at least one fabric as disclosed herein disposed in the polymeric resin. In some embodiments, a composite for use in casings for missiles and other explosive delivery devices of the present invention comprises at least one fill yarn comprising at least one fiber glass strand as disclosed herein and at least one warp yarn comprising at least one fiber glass strand as disclosed herein.

Composites for use in casings for missiles and other explosive delivery devices of the present invention can comprise various polymeric resins, depending on the desired properties and applications. In some embodiments of the present invention comprising a composite for use in casings for missiles and other explosive delivery devices, the polymeric resin can comprise a thermosetting resin. Examples of common thermosetting resins that can be used in such applications include, without limitation, epoxy, phenolic, polyester, and other thermosetting resins known to those of skill in the art.

While a number of exemplary uses and applications for composites of the present invention are described herein, persons of skill in the art can identify other potential uses for such composites including, for example, other applications in the oil and gas industry, other applications related to transportation and infrastructure, other applications in alternative energy, other high temperature thermal insulation (i.e., thermal shielding) applications (due to higher strength, higher modulus, higher softening temperature and higher glass transition temperature), etc.

Some embodiments of the present invention relate to prepregs. Prepregs of the present invention can comprise a polymeric resin and at least one fiber glass strand as disclosed herein. In some embodiments, a prepreg of the present invention comprises a polymeric resin and a plurality of glass fibers in contact with the polymeric resin, wherein at least one of the plurality of glass fibers comprises a glass composition that comprises the following components: 56-68 weight percent $SiO_2$, 11 to less than 20 weight percent $Al_2O_3$, 12 weight percent or less CaO, 7-17 weight percent MgO, 0-1 weight percent $Na_2O$, 0-1 weight percent $K_2O$, 0-5 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 0.05 weight percent, and 0-11 weight percent total other constituents. A prepreg of the present invention, in some embodiments, comprises a polymeric resin and a plurality of glass fibers in contact with the polymeric resin, wherein at least one of the plurality of glass fibers comprises a glass composition that comprises the following components: 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount not less than 1 weight percent, and 0-11 weight percent total other constituents. In some embodiments, a prepreg of the present invention comprises a polymeric resin and a plurality of glass fibers in contact with the polymeric resin, wherein at least one of the plurality of glass fibers comprises a glass composition that comprises the following components: 60-68 weight percent $SiO_2$, 14-19 weight percent $Al_2O_3$, 5 weight percent or less CaO, 10-16 weight percent MgO, 0-1 weight percent $Na_2O$, 0-1 weight percent $K_2O$, 0.4-2 weight percent $Li_2O$, 0-2 weight percent $TiO_2$, 0-3 weight percent $B_2O_3$, 0-1 weight percent $Fe_2O_3$, 0-4 weight percent $SnO_2$, 0-4 weight percent ZnO, at least one rare earth oxide in an amount between about 1 and about 8 weight percent, and 0-11 weight percent total other constituents, wherein the $Na_2O+K_2O$ content is less than about 0.5 weight percent. In some embodiments, a prepreg of the present invention comprises a polymeric resin and a plurality of glass fibers in contact with the polymeric resin, wherein at least one of the plurality of glass fibers comprises a glass composition that comprises the following components: 59-62 weight percent $SiO_2$, 14-19 weight percent $Al_2O_3$; 4-8 weight percent CaO; 6-11 weight percent MgO; 0-1 weight percent $Na_2O$; 0-1 weight percent $K_2O$; 0-2 weight percent $Li_2O$; 0-3 weight percent $TiO_2$; 0-3 weight percent $B_2O_3$; 0-1 weight percent $Fe_2O_3$; 0-2 weight percent $Cu_2O$; 0-3 weight percent SrO; at least one rare earth oxide in an amount between about 2 and about 6 weight percent; and 0-11 weight percent total other constituents, wherein the $Na_2O+K_2O$ content is less than about 0.5 weight percent. In some embodiments, the at least one rare earth oxide comprises at least one of $La_2O_3$, $Y_2O_3$, $Sc_2O_3$, $Nd_2O_3$, $CeO_2$, $Sm_2O_3$, and $Gd_2O_3$. The at least one rare earth oxide, in some embodiments, is present in an amount of at least 3 weight percent. In some embodiments, the at least one rare earth oxide is present in an amount up to about 5 weight percent. In other embodiments, a prepreg of the present invention can comprise a polymeric resin and a plurality of glass fibers in contact with the polymeric resin, wherein at least one of the plurality of glass fibers was formed from one of the other glass compositions disclosed herein as part of the present invention.

In some embodiments, a prepreg of the present invention comprises a polymeric resin and at least one fiber glass strand as disclosed herein in contact with the polymeric resin. In some embodiments, a prepreg of the present invention comprises a polymeric resin and at least a portion of a roving comprising at least one fiber glass strand as disclosed herein disposed in the polymeric resin. In other embodiments, a prepreg of the present invention comprises a polymeric resin and at least one yarn as disclosed herein in contact with the polymeric resin. In still other embodiments, a prepreg of the present invention comprises a polymeric resin and at least one fabric as disclosed herein in contact with the polymeric resin. In some embodiments, a prepreg of the present invention comprises at least one fill yarn comprising at least one fiber glass strand as disclosed herein and at least one warp yarn comprising at least one fiber glass strand as disclosed herein.

Prepregs of the present invention can comprise various polymeric resins, depending on the desired properties and applications. In some embodiments of the present invention comprising a prepreg, the polymeric resin comprises an epoxy resin. In other embodiments of the present invention comprising a prepreg, the polymeric resin can comprise polyethylene, polypropylene, polyamide, polyimide, polybutylene terephthalate, polycarbonate, thermoplastic polyurethane, phenolic, polyester, vinyl ester, polydicyclopentadiene, polyphenylene sulfide, polyether ether ketone, cyanate esters, bis-maleimides, and thermoset polyurethane resins.

While many of the applications for the glass fibers described herein are reinforcement applications, some embodiments of glass fibers of the present invention can be utilized in electronics applications such as printed circuit boards ("PCB"). More particularly, some embodiments of the present invention relate to glass fiber reinforcements that have electrical properties that permit enhancing performance of a PCB. For example, some embodiments of glass fibers of the present invention can have a dielectric constant $(D_k)$ desirable for electronics applications. The dielectric constant of a material $(D_k)$, also known as "permittivity," is a measure of the ability of a material to store electric energy. A material to be used as a capacitor desirably has a relatively high $D_k$, whereas a material to be used as part of a PCB substrate desirably has a low $D_k$, particularly for high speed circuits. $D_k$ is the ratio of the charge that would be stored (i.e., the capacitance) of a given material between two metal plates to the amount of charge that would be stored by a void (air or vacuum) between the same two metal plates. As another example, some embodiments of glass fibers of the present invention can have a coefficient for thermal expansion desirable for electronics applications. Accordingly, some embodiments of the present invention can be used in a variety of electrical applications including, without limitation, printed circuit boards, precursors to printed circuit boards (e.g., fabrics, laminates, prepregs, etc.). In such embodiments, the printed circuit board or other composite to be used in electrical applications can comprise a polymeric resin and a plurality of glass fibers in contact with the polymeric resin, wherein at least one of the plurality of glass fibers was formed from any of the glass compositions disclosed herein as part of the present invention. The polymeric resin can include any of those known to those of skill in the art for use in printed circuit boards or other electrical applications.

Turning now to methods of manufacturing glass fibers of the present invention and related products, glass fibers of the present invention can be prepared in the conventional manner well known in the art, by blending the raw materials used to supply the specific oxides that form the composition of the fibers. Glass fibers according to the various embodiments of the present invention can be formed using any process known in the art for forming glass fibers, and more desirably, any process known in the art for forming essentially continuous glass fibers. For example, although not limiting herein, the glass fibers according to non-limiting embodiments of the present invention can be formed using direct-melt or indirect-melt fiber forming methods. These methods are well known in the art and further discussion thereof is not believed to be necessary in view of the present disclosure. See, e.g., K. L. Loewenstein, *The Manufacturing Technology of Continuous Glass Fibers,* 3rd Ed., Elsevier, N.Y., 1993 at pages 47-48 and 117-234.

Following formation of the glass fibers, a primary sizing composition can be applied to the glass fibers using any suitable method known to one of ordinary skill in the art. In some embodiments, the sizing composition can be applied immediately after forming the glass fibers. In general, glass fibers used to form fiber glass strands, fabrics, composites, laminates, and prepregs of the present invention will be at least partially coated with a sizing composition. One skilled in the art may choose one of many commercially available sizing compositions for the glass fibers based upon a number of factors including, for example, performance properties of the sizing compositions, desired flexibility of the resulting fabric, cost, and other factors. In some embodiments, the sizing composition does not comprise a starch-oil sizing composition. In some embodiments of the present invention comprising a sizing composition that does not comprise a starch-oil sizing composition, a sized glass fiber or glass fiber strand need not be further treated with a slashing composition prior to using the fiber or strand in weaving applications. In other embodiments comprising a sizing composition that does not comprise a starch-oil sizing composition, a sized glass fiber or glass fiber strand may optionally be further treated with a slashing composition prior to using the fiber or strand in weaving applications. In some embodiments of the present invention comprising a primary sizing composition, the sizing composition can comprise a starch-oil sizing composition. In some embodiments of the present invention comprising a starch-oil sizing composition, the starch-oil sizing composition may later be removed from a fabric formed from at least one sized glass fiber or fiber glass strand. In some embodiments, the starch-oil sizing may be removed from a fabric using any suitable method known to one of ordinary skill in the art, such as but not limited to heat cleaning. In embodiments of the present invention comprising fabrics from which a starch-oil sizing composition has been removed, a fabric of the present invention may further be treated with a finish coating.

Non-limiting examples of commercially available sizing compositions that can be used in some embodiments of the present invention include sizing compositions often used on single-end rovings, such as Hybon® 2026, Hybon® 2002, Hybon® 1383, Hybon® 2006, Hybon® 2022, Hybon® 2032, Hybon® 2016, and Hybon® 1062, as well as sizing compositions often used on yarns, such as 1383, 611, 900, 610, 695, and 690, each of which refer to sizing compositions for products commercially available from PPG Industries, Inc.

Fiber glass strands of the present invention can be prepared by any suitable method known to one of ordinary skill in the art. Glass fiber fabrics of the present invention can generally be made by any suitable method known to one of ordinary skill in the art, such as but not limited to inter-weaving weft yarns (also referred to as "fill yarns") into a plurality of warp yarns. Such interweaving can be accomplished by positioning the warp yarns in a generally parallel, planar array on a loom, and thereafter weaving the weft yarns into the warp yarns by passing the weft yarns over and under the warp yarns in a predetermined repetitive pattern. The pattern used depends upon the desired fabric style.

Warp yarns can generally be prepared using techniques known to those of skill in the art. Warp yarns can be formed by attenuating a plurality of molten glass streams from a bushing or spinner. Thereafter, a sizing composition can be applied to the individual glass fibers and the fibers can be gathered together to form a strand. The strands can be subsequently processed into yarns by transferring the strands to a bobbin via a twist frame. During this transfer, the strands can be given a twist to aid in holding the bundle of fibers together. These twisted strands can then be wound about the bobbin, and the bobbins can be used in the weaving processes.

Positioning of the warp yarns on the loom can generally be done using techniques known to those of ordinary skill in the art. Positioning of the warp yarns on the loom can be done by way of a loom beam. A loom beam comprises a specified number of warp yarns (also referred to as "ends") wound in an essentially parallel arrangement (also referred to as "warp sheet") about a cylindrical core. Loom beam preparation can comprise combining multiple yarn packages, each package comprising a fraction of the number of ends required for the loom beam, into a single package or loom beam. For example and although not limiting herein, a 50 inch (127 cm) wide, 7781 style fabric which utilizes a DE75 yarn input typically requires 2868 ends. However, conventional equipment for forming a loom beam does not allow for all of these ends to be transferred from bobbins to a single beam in one operation. Therefore, multiple beams comprising a fraction of the number of required ends, typically referred to as "section beams," can be produced and thereafter combined to form the loom beam. In a manner similar to a loom beam, a section beam can include a cylindrical core comprising a plurality of essentially parallel warp yarns wound thereabout. While it will be recognized by one skilled in the art that the section beam can comprise any number of warp yarns required to form the final loom beam, generally the number of ends contained on a section beam is limited by the capacity of the warping creel. For a 7781 style fabric, four section beams of 717 ends each of DE75 yarn are typically provided and when combined offer the required 2868 ends for the warp sheet, as discussed above.

Composites of the present invention can be prepared by any suitable method known to one of ordinary skill in the art, such as but not limited to vacuum assisted resin infusion molding, extrusion compounding, compression molding, resin transfer molding, filament winding, prepreg/autoclave curing, and pultrusion. Composites of the present invention can be prepared using such molding techniques as known to those of ordinary skill in the art. In particular, embodiments of composites of the present invention that incorporate woven fiber glass fabrics can be prepared using techniques known to those of skill in the art for preparation of such composites.

As an example, some composites of the present invention can be made using vacuum assisted compression molding, which technique is well-known to those of skill in the art and described briefly below. As known to those of skill in the art, with vacuum assisted compression molding, a stack of pre-impregnated glass fabrics is placed within a press platen. In some embodiments of the present invention, the stack of pre-impregnated glass fabrics can include one or more fabrics of the present invention as described herein that have been cut to a desired size and shape. Upon completion of the stacking operation for the corresponding number of layers, the press is closed and the platens are connected to a vacuum pump so that the upper platen compresses on the stack of fabrics until the desired pressure is achieved. The vacuum aids in the evacuation of entrapped air within the stack and provides for a reduced void content in the molded laminate. Following connection of the platens to a vacuum pump, the temperature of the platens is then increased to accelerate the conversion rate of the resin (e.g., a thermosetting resin) to a predetermined temperature setting particular to the resin utilized, and kept at that temperature and pressure setting until the laminate reaches full cure. At this point, the heat is turned off and the platens are cooled by water circulation until they reach room temperature. The platens can then be opened, and the molded laminate can be removed from the press.

As another example, some composites of the present invention can be made using vacuum assisted resin infusion technology, as further described herein. A stack of glass fiber fabrics of the present invention may be cut to a desired size and placed on a silicone release treated glass table. The stack may then be covered with a peel ply, fitted with a flow enhancing media, and vacuum bagged using nylon bagging film. Next, the so-called "lay up" may be subjected to a vacuum pressure of about 27 inches Hg. Separately, the polymeric resin that is to be reinforced with the fiber glass fabrics can be prepared using techniques known to those of skill in the art for that particular resin. For example, for some polymeric resins, an appropriate resin (e.g., an amine-curable epoxy resin) may be mixed with an appropriate curing agent (e.g., an amine for an amine-curable epoxy resin) in the proportions recommended by the resin manufacturer or otherwise known to a person of ordinary skill in the art. The combined resin may then be degassed in a vacuum chamber for 30 minutes and infused through the fabric preform until substantially complete wet out of the fabric stack is achieved. At this point, the table may be covered with heated blankets (set to a temperature of about 45-50° C.) for 24 hours. The resulting rigid composites may then be de-molded and post cured at about 250° F. for 4 hours in a programmable convection oven. As is known to persons of ordinary skill in the art, however, various parameters such as degassing time, heating time, and post curing conditions may vary based on the specific resin system used, and persons of ordinary skill in the art understand how to select such parameters based on a particular resin system.

Prepregs of the present invention can be prepared by any suitable means known to one of ordinary skill in the art, such as but not limited to passing fiber glass strands, rovings, or fabrics through a resin bath; using a solvent-based resin; or using a resin film.

As noted above, composites of the present invention can comprise a polymeric resin, in some embodiments. A variety of polymeric resins can be used. Polymeric resins that are known to be useful in reinforcement applications can be particularly useful in some embodiments. In some embodiments, the polymeric resin can comprise a thermoset resin. Thermoset resin systems useful in some embodiments of the present invention can include but are not limited to epoxy resin systems, phenolic based resins, polyesters, vinyl esters, thermoset polyurethanes, polydicyclopentadiene (pDCPD) resins, cyanate esters, and bis-maleimides. In some embodiments, the polymeric resin can comprise an epoxy resin. In other embodiments, the polymeric resin can comprise a thermoplastic resin. Thermoplastic polymers useful in some embodiments of the present invention include but are not limited to polyethylene, polypropylene, polyamides (including Nylon), polybutylene terephthalate, polycarbonate, thermoplastic polyurethanes (TPU), polyphenylene sulfides, and polyether ether ketone (PEEK). Non-limiting examples of commercially available polymeric resins useful in some embodiments of the present invention include EPIKOTE Resin MGS® RIMR 135 epoxy with Epikure MGS RIMH 1366 curing agent (available from Momentive Specialty Chemicals Inc. of Columbus, Ohio), Applied Poleramic MMFCS2 epoxy (available from Applied Poleramic, Inc., Benicia, California), and EP255 modified epoxy (available from Barrday Composite Solutions, Millbury, MA).

The invention will be illustrated through the following series of specific embodiments. However, it will be understood by one of skill in the art that many other embodiments are contemplated by the principles of the invention.

EXAMPLES

Table 1 provides a plurality of fiberizable glass compositions according to various embodiments of the present invention as well as data relating to various properties of such compositions. Examples 1, 20, 21, 25, 62, and 77 are comparative examples, while the remaining examples represent various embodiments of the present invention. Table 2 provides a plurality of fiberizable glass compositions according to various other embodiments of the present invention as well as data relating to various properties of such compositions. Table 3 also provides a plurality of fiberizable glass compositions according to various other embodiments of the present invention as well as data relating to various properties of such compositions.

The glasses in these examples were made by melting mixtures of commercial and reagent grade chemicals (reagent grade chemicals were used only for the rare earth oxides) in powder form in 10% Rh/Pt crucibles at the temperatures between 1500° C. and 1550° C. (2732° F..-2822° F.) for four hours. Each batch was about 1000 grams. After the 4 hour melting period, the molten glass was poured onto a steel plate for quenching. Volatile species, such as fluoride and alkali oxides, were not adjusted in the batches for their emission loss because of their low concentrations in the glasses. The compositions in the Examples represent as-batched compositions. Commercial ingredients were used in preparing the glasses. In the batch calculation, special raw material retention factors were considered to calculate the oxides in each glass. The retention factors are based on years of glass batch melting and oxides yield in the glass as measured. Hence, the as-batched compositions illustrated in the examples are considered to be close to the measured compositions.

Melt Properties

Melt viscosity as a function of temperature and liquidus temperature was determined by using ASTM Test Method C965 "Standard Practice for Measuring Viscosity of Glass Above the Softening Point," and C829 "Standard Practices for Measurement of Liquidus Temperature of Glass by the Gradient Furnace Method," respectively.

Tables 1-3 include measured liquidus temperature ($T_L$), reference temperature of forming ($T_F$) defined by melt viscosity of 1000 Poise, and reference temperature of melting ($T_m$) defined by viscosity of 100 Poise, for the glass compositions. The difference between the forming temperature and the liquidus temperature ($\Delta T$) is also shown. Tables 1-3 also provide softening temperatures ($T_{soft}$), glass transition temperatures ($T_g$), and coefficients of thermal expansion (CTE) for some of the compositions. Softening temperature ($T_{soft}$) values were measured in accordance with ASTM Test Method C338-93 "Standard Test Method for Softening Point of Glass" (2008). Glass transition temperature ($T_g$) values were measured in accordance with ASTM Test Method C336-71 "Annealing Point and Strain Point by Fiber Elongation." Coefficient of thermal expansion (CTE) values were determined in accordance with ASTM E228-11 "Standard Test Method for Linear Thermal Expansion of Solid Materials with a Push-Rod Dilatometer."

Mechanical Properties

For the fiber tensile strength test, fiber samples from the glass compositions were produced from a 10 Rh/90 Pt single tip fiber drawing unit. Approximately, 85 grams of cullet of a given composition was fed into the bushing melting unit and conditioned at a temperature close or equal to the 100 Poise melt viscosity for two hours. The melt was subsequently lowered to a temperature close or equal to the 1000 Poise melt viscosity and stabilized for one hour prior to fiber drawing. Fiber diameter was controlled to produce an approximately 10 μm diameter fiber by controlling the speed of the fiber drawing winder. All fiber samples were captured in air without any contact with foreign objects. The fiber drawing was completed in a room with a controlled humidity of between 40 and 45% RH.

Fiber tensile strength was measured using a Kawabata KES-G1 (Kato Tech Co. Ltd., Japan) tensile strength analyzer equipped with a Kawabata type C load cell. Fiber samples were mounted on paper framing strips using a resin adhesive. A tensile force was applied to the fiber until failure, from which the fiber strength was determined based on the fiber diameter and breaking stress. The test was done at room temperature under the controlled humidity between 40-45% RH. The average values were computed based on a sample size of 65-72 fibers for each composition. Tables 1-3 report the average tensile strengths for fibers formed from some of the compositions. Specific strengths were calculated by dividing the tensile strength values (in N/m$^2$) by the corresponding densities (in g/m$^3$).

Young's modulus was also measured for certain glass compositions in Tables 1 and 2 using the following technique. Approximately 50 grams of glass cullet having a composition corresponding to the appropriate example in Table 1, Table 2, or Table 3 was re-melted in a 90 Pt/10 Rh crucible for two hours at a melting temperature defined by 100 Poise. The crucible was subsequently transferred into a vertical tube, electrically heated furnace. The furnace temperature was preset at a fiber pulling temperature close or equal to a 1000 Poise melt viscosity. The glass was equilibrated at the temperature for one hour before fiber drawing. The top of the fiber drawing furnace had a cover with a center hole, above which a water-cooled copper coil was mounted to regulate the fiber cooling. A silica rod was then manually dipped into the melt through the cooling coil, and a fiber about 1-1.5 m long was drawn out and collected. The diameter of the fiber ranged from 100μ at one end to 1000 μm at the other end.

Elastic moduli were determined using an ultrasonic acoustic pulse technique (Panatherm 5010 unit from Panametrics, Inc. of Waltham, Massachusetts) for the fibers drawn from the glass melts. Extensional wave reflection time was obtained using twenty micro-second duration, 200 kHz pulses. The sample length was measured and the respective extensional wave velocity ($V_E$) was calculated. Fiber density (ρ) was measured using a Micromeritics AccuPyc 1330 pycnometer. About 20 measurements were made for each composition and the average Young's modulus (E) was calculated from the following formula:

$$E = V_E^2 \times \rho$$

The modulus tester uses a wave guide with a diameter of 1 mm, which sets the fiber diameter at the contact side with the wave guide to be about the same as the wave guide diameter. In other words, the end of the fiber having a diameter of 1000 μm was connected at the contact side of the wave guide. Fibers with various diameters were tested for Young's modulus and the results show that a fiber diameter from 100 to 1000 μm does not affect fiber modulus. Specific modulus values were calculated by dividing the Young's modulus values by the corresponding densities.

The values of "Fiber Failure strain (%)" (i.e., fiber elongation) in Tables 1-3 were determined based on Hooke's law by dividing the tensile strength values by the corresponding Young's modulus values (in the same units (e.g., all in MPa)), and multiplying by 100.

TABLE 1

| | 1 | 2 | 3 | 4 | 5 | 6 |
|---|---|---|---|---|---|---|
| SiO$_2$ | 61.49 | 61.46 | 61.37 | 61.46 | 61.37 | 61.46 |
| Al$_2$O$_3$ | 15.28 | 15.36 | 15.57 | 15.36 | 15.57 | 15.36 |
| Fe$_2$O$_3$ | 0.29 | 0.29 | 0.29 | 0.29 | 0.29 | 0.29 |
| CaO | 15.43 | 13.18 | 12.51 | 13.18 | 12.51 | 13.18 |
| MgO | 6.12 | 6.26 | 6.21 | 6.26 | 6.21 | 6.26 |
| Na$_2$O | 0.05 | 0.05 | 0.05 | 0.05 | 0.05 | 0.05 |
| K$_2$O | 0.09 | 0.09 | 0.09 | 0.09 | 0.09 | 0.09 |
| Sc$_2$O$_3$ | 0.00 | 2.08 | 2.68 | 0.00 | 0.00 | 0.00 |
| Y$_2$O$_3$ | 0.00 | 0.00 | 0.00 | 2.08 | 2.68 | 0.00 |
| La$_2$O$_3$ | 0.00 | 0.00 | 0.00 | 0.00 | 0.00 | 2.08 |
| Nd$_2$O$_3$ | 0.00 | 0.00 | 0.00 | 0.00 | 0.00 | 0.00 |
| TiO$_2$ | 0.50 | 0.50 | 0.51 | 0.50 | 0.51 | 0.50 |
| Li$_2$O | 0.74 | 0.72 | 0.72 | 0.72 | 0.72 | 0.72 |
| SO$_3$ | 0.01 | 0.01 | 0.01 | 0.01 | 0.01 | 0.01 |
| ZrO$_2$ | 0.00 | 0.00 | 0.00 | 0.00 | 0.00 | 0.00 |
| B$_2$O$_3$ | 0.00 | 0.00 | 0.00 | 0.00 | 0.00 | 0.00 |
| | | | | | | |
| TOTAL | 100.00 | 100.00 | 100.00 | 100.00 | 100.00 | 100.00 |
| T$_L$ (° C.) | 1198 | 1197 | 1241 | 1197 | 1201 | 1199 |
| T$_F$ (° C.) | 1285 | 1288 | 1296 | 1306 | 1312 | 1300 |
| ΔT (° C.) | 87 | 91 | 55 | 109 | 111 | 101 |
| T$_m$ (° C.) | 1489 | 1485 | 1495 | 1509 | 1513 | 1507 |
| Fiber Density (g/cm$^3$) | 2.62 | 2.62 | 2.62 | 2.62 | 2.63 | 2.63 |
| Fiber Modulus (GPa) | 89.2 | 91.0 | 91.6 | 90.6 | 90.2 | 88.0 |
| Fiber Strength (MPa) | 3570 | 4108 | 4376 | 4264 | 4727 | 4321 |
| Fiber Failure Strain (%) | 4.0 | 4.5 | 4.8 | 4.7 | 5.2 | 4.9 |
| Specific Fiber Modulus (×10$^6$ m) | 3.5 | 3.6 | 3.6 | 3.5 | 3.5 | 3.4 |
| Specific Fiber Strength (×10$^5$ m) | 1.4 | 1.6 | 1.7 | 1.7 | 1.8 | 1.7 |
| | | | | | | |
| | 7 | 8 | 9 | 10 | 11 | 12 |
| SiO$_2$ | 61.37 | 61.46 | 61.37 | 59.74 | 59.73 | 59.73 |
| Al$_2$O$_3$ | 15.57 | 15.36 | 15.57 | 16.00 | 17.46 | 17.46 |
| Fe$_2$O$_3$ | 0.29 | 0.29 | 0.29 | 0.27 | 0.29 | 0.29 |
| CaO | 12.51 | 13.18 | 12.51 | 9.63 | 7.46 | 7.46 |

TABLE 1-continued

| | | | | | | |
|---|---|---|---|---|---|---|
| MgO | 6.21 | 6.26 | 6.21 | 8.58 | 7.13 | 7.13 |
| $Na_2O$ | 0.05 | 0.05 | 0.05 | 0.19 | 0.19 | 0.19 |
| $K_2O$ | 0.09 | 0.09 | 0.09 | 0.09 | 0.09 | 0.09 |
| $Sc_2O_3$ | 0.00 | 0.00 | 0.00 | 4.24 | 6.34 | 4.44 |
| $Y_2O_3$ | 0.00 | 0.00 | 0.00 | 0.00 | 0.00 | 0.00 |
| $La_2O_3$ | 2.68 | 0.00 | 0.00 | 0.00 | 0.00 | 1.90 |
| $Nd_2O_3$ | 0.00 | 2.08 | 2.68 | 0.00 | 0.00 | 0.00 |
| $TiO_2$ | 0.51 | 0.50 | 0.51 | 0.63 | 0.69 | 0.69 |
| $Li_2O$ | 0.72 | 0.72 | 0.72 | 0.61 | 0.61 | 0.61 |
| $SO_3$ | 0.01 | 0.01 | 0.01 | 0.02 | 0.02 | 0.02 |
| $ZrO_2$ | 0.00 | 0.00 | 0.00 | 0.00 | 0.00 | 0.00 |
| $B_2O_3$ | 0.00 | 0.00 | 0.00 | 0.00 | 0.00 | 0.00 |
| TOTAL | 100.00 | 100.00 | 100.00 | 100.00 | 100.00 | 100.00 |
| $T_L$ (° C.) | 1198 | 1201 | 1201 | 1355 | | 1376 |
| $T_F$ (° C.) | 1309 | 1300 | 1308 | 1308 | 1349 | 1315 |
| $\Delta T$ (° C.) | 111 | 99 | 107 | −47 | | −61 |
| $T_m$ (° C.) | 1515 | 1506 | 1513 | 1491 | 1515 | 1507 |
| Fiber Density ($g/cm^3$) | 2.63 | 2.62 | 2.62 | 2.63 | | |
| Fiber Modulus (GPa) | 88.4 | 88.1 | 88.9 | 92.1 | | |
| Fiber Strength (MPa) | 4639 | | | | | |
| Fiber Failure Strain (%) | 5.3 | | | | | |
| Specific Fiber Modulus ($\times10^6$ m) | 3.4 | 3.4 | 3.5 | 3.6 | | |
| Specific Fiber Strength ($\times10^5$ m) | 1.8 | | | | | |

| | 13 | 14 | 15 | 16 | 17 | 18 |
|---|---|---|---|---|---|---|
| $SiO_2$ | 59.73 | 59.74 | 59.73 | 59.73 | 59.73 | 59.73 |
| $Al_2O_3$ | 17.46 | 16.00 | 17.46 | 17.46 | 17.46 | 17.46 |
| $Fe_2O_3$ | 0.29 | 0.27 | 0.29 | 0.29 | 0.29 | 0.29 |
| CaO | 7.46 | 9.63 | 7.46 | 7.46 | 7.46 | 7.46 |
| MgO | 7.13 | 8.58 | 7.13 | 7.13 | 7.13 | 7.13 |
| $Na_2O$ | 0.19 | 0.19 | 0.19 | 0.19 | 0.19 | 0.19 |
| $K_2O$ | 0.09 | 0.09 | 0.09 | 0.09 | 0.09 | 0.09 |
| $Sc_2O_3$ | 3.17 | 0.00 | 0.00 | 0.00 | 0.00 | 4.44 |
| $Y_2O_3$ | 0.00 | 4.24 | 6.34 | 4.44 | 3.17 | 0.00 |
| $La_2O_3$ | 3.17 | 0.00 | 0.00 | 1.90 | 3.17 | 0.00 |
| $Nd_2O_3$ | 0.00 | 0.00 | 0.00 | 0.00 | 0.00 | 0.00 |
| $TiO_2$ | 0.69 | 0.63 | 0.69 | 0.69 | 0.69 | 2.59 |
| $Li_2O$ | 0.61 | 0.61 | 0.61 | 0.61 | 0.61 | 0.61 |
| $SO_3$ | 0.02 | 0.02 | 0.02 | 0.02 | 0.02 | 0.02 |
| $ZrO_2$ | 0.00 | 0.00 | 0.00 | 0.00 | 0.00 | 0.00 |
| $B_2O_3$ | 0.00 | 0.00 | 0.00 | 0.00 | 0.00 | 0.00 |
| TOTAL | 100.00 | 100.00 | 100.00 | 100.00 | 100.00 | 100.00 |
| $T_L$ (° C.) | 1302 | 1194 | 1194 | 1193 | 1197 | |
| $T_F$ (° C.) | 1317 | 1287 | 1327 | 1326 | 1330 | |
| $\Delta T$ (° C.) | 15 | 93 | 133 | 133 | 133 | |
| $T_m$ (° C.) | 1512 | 1476 | 1515 | 1523 | 1532 | |
| Fiber Density ($g/cm^3$) | 2.64 | 2.65 | 2.65 | 2.65 | 2.65 | |
| Fiber Modulus (GPa) | 91.8 | 92.1 | 92.2 | 91.5 | 91.9 | |
| Fiber Strength (MPa) | | | 5255 | 5181 | 5195 | |
| Fiber Failure Strain (%) | | | 5.7 | 5.7 | 5.7 | |
| Specific Fiber Modulus ($\times10^6$ m) | 3.5 | 3.5 | 3.5 | 3.5 | 3.5 | |
| Specific Fiber Strength ($\times10^5$ m) | | | 2.0 | 2.0 | 2.0 | |

| | 19 | 20 | 21 | 22 | 23 | 24 |
|---|---|---|---|---|---|---|
| $SiO_2$ | 59.73 | 60.31 | 60.22 | 59.85 | 59.85 | 60.37 |
| $Al_2O_3$ | 17.46 | 15.62 | 16.28 | 15.58 | 15.58 | 14.48 |
| $Fe_2O_3$ | 0.29 | 0.23 | 0.28 | 0.27 | 0.27 | 0.25 |
| CaO | 7.46 | 13.84 | 13.06 | 11.05 | 11.05 | 5.46 |
| MgO | 7.13 | 8.63 | 8.61 | 8.70 | 8.70 | 8.03 |
| $Na_2O$ | 0.19 | 0.06 | 0.06 | 0.20 | 0.20 | 0.18 |
| $K_2O$ | 0.09 | 0.07 | 0.09 | 0.09 | 0.09 | 0.08 |
| $Sc_2O_3$ | 4.44 | 0.00 | 0.00 | 2.88 | 0.00 | 0.00 |
| $Y_2O_3$ | 0.00 | 0.00 | 0.00 | 0.00 | 2.88 | 0.00 |
| $La_2O_3$ | 0.00 | 0.00 | 0.00 | 0.00 | 0.00 | 9.87 |

TABLE 1-continued

|  |  |  |  |  |  |  |
|---|---|---|---|---|---|---|
| $Nd_2O_3$ | 0.00 | 0.00 | 0.00 | 0.00 | 0.00 | 0.00 |
| $TiO_2$ | 0.69 | 0.45 | 0.64 | 0.61 | 0.61 | 0.57 |
| $Li_2O$ | 0.61 | 0.78 | 0.75 | 0.76 | 0.76 | 0.70 |
| $SO_3$ | 0.02 | 0.02 | 0.02 | 0.02 | 0.02 | 0.01 |
| $ZrO_2$ | 1.90 | 0.00 | 0.00 | 0.00 | 0.00 | 0.00 |
| $B_2O_3$ |  |  |  |  |  |  |
| TOTAL | 100.00 | 100.00 | 100.00 | 100.00 | 100.00 | 100.00 |
| $T_L$ (° C.) |  | 1211 | 1225 | 1240 | 1195 | 1260 |
| $T_F$ (° C.) |  | 1251 | 1265 | 1264 | 1268 | 1320 |
| $\Delta T$ (° C.) |  | 40 | 40 | 24 | 73 | 60 |
| $T_m$ (° C.) |  | 1441 | 1457 | 1450 | 1458 | 1523 |
| Fiber Density ($g/cm^3$) |  | 2.62 | 2.62 | 2.64 | 2.64 | 2.70 |
| Fiber Modulus (GPa) |  | 90.2 | 90.5 | 92.4 | 91.1 | 89.5 |
| Fiber Strength (MPa) |  | 4622 | 4739 | 4913 | 4759 | 4978 |
| Fiber Failure Strain (%) |  | 5.13 | 5.2 | 5.3 | 5.2 | 5.6 |
| Specific Fiber Modulus ($\times 10^6$ m) |  | 3.51 | 3.5 | 3.6 | 3.5 | 3.4 |
| Specific Fiber Strength ($\times 10^5$ m) |  | 1.8 | 1.9 | 1.9 | 1.8 | 1.9 |

|  | 25 | 26 | 27 | 28 | 29 | 30 |
|---|---|---|---|---|---|---|
| $SiO_2$ | 59.54 | 59.73 | 59.77 | 62.85 | 54.20 | 59.94 |
| $Al_2O_3$ | 17.28 | 17.35 | 17.36 | 19.78 | 15.20 | 15.66 |
| $Fe_2O_3$ | 0.30 | 0.29 | 0.28 | 0.32 | 0.26 | 0.25 |
| CaO | 9.68 | 4.99 | 0.69 | 2.77 | 6.41 | 13.03 |
| MgO | 11.28 | 11.25 | 11.20 | 7.00 | 6.73 | 7.80 |
| $Na_2O$ | 1.12 | 1.12 | 1.12 | 2.40 | 0.03 | 0.03 |
| $K_2O$ | 0.10 | 0.09 | 0.09 | 0.00 | 0.07 | 0.09 |
| $Sc_2O_3$ | 0.00 | 0.00 | 0.00 | 3.16 | 3.88 | 0.00 |
| $Y_2O_3$ | 0.00 | 0.00 | 0.00 | 0.00 | 0.00 | 1.99 |
| $La_2O_3$ | 0.00 | 4.49 | 8.78 | 0.00 | 3.88 | 0.00 |
| $Nd_2O_3$ | 0.00 | 0.00 | 0.00 | 0.00 | 0.00 | 0.00 |
| $TiO_2$ | 0.68 | 0.68 | 0.68 | 0.78 | 0.02 | 0.52 |
| $Li_2O$ | 0.00 | 0.00 | 0.00 | 0.00 | 0.59 | 0.65 |
| $SO_3$ | 0.02 | 0.02 | 0.02 | 0.02 | 0.02 | 0.02 |
| $ZrO_2$ | 0.00 | 0.00 | 0.00 | 0.00 | 0.00 | 0.00 |
| $B_2O_3$ | 0.00 | 0.00 | 0.00 | 0.93 | 8.71 | 0 |
| TOTAL | 100.00 | 100.00 | 100.00 | 100.00 | 100.00 | 100.00 |
| $T_L$ (° C.) | 1265 | 1268 | 1324 | 1344 | 1300 | 1211 |
| $T_F$ (° C.) | 1285 | 1316 | 1361 | 1397 | 1414 | 1275 |
| $\Delta T$ (° C.) | 20 | 48 | 37 | 53 | 114 | 64 |
| $T_m$ (° C.) | 1471 | 1508 | 1559 | 1613 | 1631 | 1466 |
| Fiber Density ($g/cm^3$) | 2.61 | 2.64 | 2.67 | 2.51 | 2.53 | 2.64 |
| Fiber Modulus (GPa) | 90.0 | 90.5 | 90.1 | 87.1 | 85.9 | 90.4 |
| Fiber Strength (MPa) | 5105 | 5294 | 5445 | 5503 | 5492 |  |
| Fiber Failure Strain (%) | 5.7 | 5.9 | 6.0 | 6.3 | 6.4 |  |
| Specific Fiber Modulus ($\times 10^6$ m) | 3.5 | 3.5 | 3.4 | 3.5 | 3.5 | 3.5 |
| Specific Fiber Strength ($\times 10^5$ m) | 2.0 | 2.0 | 2.1 | 2.2 | 2.2 |  |

|  | 31 | 32 | 33 | 34 | 35 | 36 |
|---|---|---|---|---|---|---|
| $SiO_2$ | 59.94 | 59.94 | 60.85 | 61.67 | 61.67 | 59.52 |
| $Al_2O_3$ | 15.66 | 15.66 | 15.90 | 16.33 | 16.33 | 17.24 |
| $Fe_2O_3$ | 0.25 | 0.25 | 0.25 | 0.26 | 0.26 | 0.27 |
| CaO | 13.03 | 13.03 | 13.23 | 6.01 | 6.01 | 6.35 |
| MgO | 7.80 | 7.80 | 7.92 | 10.26 | 10.26 | 10.85 |
| $Na_2O$ | 0.03 | 0.03 | 0.03 | 0.16 | 0.16 | 0.17 |
| $K_2O$ | 0.09 | 0.09 | 0.10 | 0.09 | 0.09 | 0.10 |
| $Sc_2O_3$ | 0.00 | 1.99 | 0.51 | 0.00 | 0.00 | 0.00 |
| $Y_2O_3$ | 0.00 | 0.00 | 0.00 | 4.21 | 0.00 | 4.44 |
| $La_2O_3$ | 1.99 | 0.00 | 0.00 | 0.00 | 4.21 | 0.00 |
| $Nd_2O_3$ | 0.00 | 0.00 | 0.00 | 0.00 | 0.00 | 0.00 |
| $TiO_2$ | 0.52 | 0.52 | 0.53 | 0.58 | 0.58 | 0.61 |

TABLE 1-continued

| | | | | | | |
|---|---|---|---|---|---|---|
| Li$_2$O | 0.65 | 0.65 | 0.66 | 0.42 | 0.42 | 0.44 |
| SO$_3$ | 0.02 | 0.02 | 0.02 | 0.00 | 0.00 | 0.00 |
| ZrO$_2$ | 0.00 | 0.00 | 0.00 | 0.00 | 0.00 | 0.00 |
| B$_2$O$_3$ | 0 | 0 | 0 | 0 | 0 | 0 |
| TOTAL | 100.00 | 100.00 | 100.00 | 100.00 | 100.00 | 100.00 |
| T$_L$ (° C.) | 1209 | 1212 | 1213 | 1258 | 1247 | 1232 |
| T$_F$ (° C.) | 1265 | 1263 | 1270 | 1329 | 1331 | 1300 |
| ΔT (° C.) | 56 | 51 | 57 | 71 | 84 | 68 |
| T$_m$ (° C.) | 1458 | 1451 | 1466 | 1529 | 1535 | 1489 |
| Fiber Density (g/cm$^3$) | 2.64 | 2.64 | | 2.62 | 2.62 | 2.65 |
| Fiber Modulus (GPa) | 90.6 | 90.3 | | 92.2 | 90.9 | 94.1 |
| Fiber Strength (MPa) | | | | | | 5224 |
| Fiber Failure Strain (%) | | | | | | 5.6 |
| Specific Fiber Modulus (×10$^6$ m) | 3.5 | 3.5 | | 3.6 | 3.5 | 3.6 |
| Specific Fiber Strength (×10$^5$ m) | | | | | | 2.0 |

| | 37 | 38 | 39 | 40 | 41 | 42 |
|---|---|---|---|---|---|---|
| SiO$_2$ | 59.52 | 59.00 | 59.52 | 60.36 | 59.84 | 61.69 |
| Al$_2$O$_3$ | 17.24 | 17.25 | 17.40 | 17.65 | 18.14 | 21.64 |
| Fe$_2$O$_3$ | 0.27 | 0.29 | 0.29 | 0.29 | 0.30 | 0.34 |
| CaO | 6.35 | 6.18 | 5.37 | 4.05 | 3.57 | 1.01 |
| MgO | 10.85 | 10.65 | 10.73 | 10.86 | 11.85 | 10.12 |
| Na$_2$O | 0.17 | 0.02 | 0.02 | 0.02 | 0.02 | 0.02 |
| K$_2$O | 0.10 | 0.09 | 0.09 | 0.09 | 0.09 | 0.11 |
| Sc$_2$O$_3$ | 0.00 | 0.00 | 0.00 | 0.00 | 0.00 | 0.00 |
| Y$_2$O$_3$ | 0.00 | 5.84 | 5.90 | 5.98 | 5.47 | 4.21 |
| La$_2$O$_3$ | 4.44 | 0.00 | 0.00 | 0.00 | 0.00 | 0.00 |
| Nd$_2$O$_3$ | 0.00 | 0.00 | 0.00 | 0.00 | 0.00 | 0.00 |
| TiO$_2$ | 0.61 | 0.68 | 0.68 | 0.69 | 0.71 | 0.85 |
| Li$_2$O | 0.44 | 0.00 | 0.00 | 0.00 | 0.00 | 0.00 |
| SO$_3$ | 0.00 | 0.00 | 0.00 | 0.00 | 0.00 | 0.00 |
| ZrO$_2$ | 0.00 | 0.00 | 0.00 | 0.00 | 0.00 | 0.00 |
| B$_2$O$_3$ | 0.00 | 0.00 | 0.00 | 0.00 | 0.00 | 0.00 |
| TOTAL | 100.00 | 100.00 | 100.00 | 100.00 | 100.00 | 100.00 |
| T$_L$ (° C.) | 1237 | 1276 | 1297 | 1336 | 1316 | |
| T$_F$ (° C.) | 1302 | 1315 | 1324 | 1340 | 1332 | 1392 |
| ΔT (° C.) | 65 | 39 | 27 | 4 | 16 | |
| T$_m$ (° C.) | 1496 | 1500 | 1509 | 1529 | 1518 | 1599 |
| T$_{soft}$(° C.) | | 951 | 958 | 978 | 962 | 995 |
| CTE (10$^{-6}$/° C.) | | | | | | 3.1 |
| Fiber Density (g/cm$^3$) | 2.66 | 2.63 | 2.66 | 2.65 | 2.65 | 2.58 |
| Fiber Modulus (GPa) | 92.8 | 92.8 | 93.2 | 94.1 | 93.6 | 92.4 |
| Fiber Strength (MPa) | | 5076 | | | | |
| Fiber Failure Strain (%) | | 5.5 | | | | |
| Specific Fiber Modulus (×10$^6$ m) | 3.6 | 3.6 | 3.6 | 3.6 | 3.6 | 3.6 |
| Specific Fiber Strength (×10$^5$ m) | | 2.0 | | | | |

| | 43 | 44 | 45 | 46 | 47 | 48 |
|---|---|---|---|---|---|---|
| SiO$_2$ | 61.69 | 60.82 | 60.82 | 59.40 | 60.03 | 60.48 |
| Al$_2$O$_3$ | 21.64 | 21.34 | 21.34 | 17.25 | 17.40 | 17.67 |
| Fe$_2$O$_3$ | 0.34 | 0.34 | 0.34 | 0.25 | 0.26 | 0.26 |
| CaO | 1.01 | 0.99 | 0.99 | 5.78 | 5.93 | 4.95 |
| MgO | 10.12 | 9.98 | 9.98 | 10.78 | 10.83 | 10.64 |
| Na$_2$O | 0.02 | 0.02 | 0.02 | 0.05 | 0.04 | 0.04 |
| K$_2$O | 0.11 | 0.11 | 0.11 | 0.10 | 0.10 | 0.10 |
| Sc$_2$O$_3$ | 0.00 | 0.00 | 0.00 | 0.00 | 0.00 | 0.00 |
| Y$_2$O$_3$ | 0.00 | 5.56 | 0.00 | 4.79 | 4.03 | 4.34 |
| La$_2$O$_3$ | 4.21 | 0.00 | 5.56 | 0.00 | 0.00 | 0.00 |
| Nd$_2$O$_3$ | 0.00 | 0.00 | 0.00 | 0.00 | 0.00 | 0.00 |
| TiO$_2$ | 0.85 | 0.84 | 0.84 | 0.52 | 0.57 | 0.56 |
| Li$_2$O | 0.00 | 0.00 | 0.00 | 1.06 | 0.81 | 0.95 |

TABLE 1-continued

| | | | | | | |
|---|---|---|---|---|---|---|
| SO$_3$ | 0.00 | 0.00 | 0.00 | 0.00 | 0.00 | 0.00 |
| ZrO$_2$ | 0.00 | 0.00 | 0.00 | 0.00 | 0.00 | 0.00 |
| B$_2$O$_3$ | 0.00 | 0.00 | 0.00 | 0.00 | 0.00 | 0.00 |
| | | | | | | |
| TOTAL | 100.00 | 100.00 | 100.00 | 100.00 | 100.00 | 100.00 |
| T$_L$ (° C.) | | | | 1235 | 1237 | 1232 |
| T$_F$ (° C.) | 1401 | 1397 | 1390 | 1273 | 1289 | 1299 |
| ΔT (° C.) | | | | 38 | 52 | 67 |
| T$_{soft}$(° C.) | 992 | 993 | 990 | | | |
| T$_m$ (° C.) | 1603 | 1595 | 1589 | 1467 | 1484 | 1499 |
| Fiber Density (g/cm$^3$) | 2.58 | 2.60 | 2.61 | 2.65 | 2.64 | 2.63 |
| Fiber Modulus (GPa) | 91.6 | 92.7 | 92.0 | 94.7 | 93.8 | 93.1 |
| Fiber Strength (MPa) | | | | 5307 | 5237 | 5357 |
| Fiber Failure Strain (%) | | | | 5.6 | 5.6 | 5.8 |
| Specific Fiber Modulus (×10$^6$ m) | 3.6 | 3.6 | 3.6 | 3.6 | 3.6 | 3.6 |
| Specific Fiber Strength (×10$^5$ m) | | | | 2.0 | 2.0 | 2.1 |
| Dielectric Constant @ 1 GHz | 5.69 | 5.82 | 5.87 | | | |
| Dissipation loss @ 1 GHz | 0.0020 | 0.0018 | 0.0017 | | | |

| | 49 | 50 | 51 | 52 | 53 | 54 |
|---|---|---|---|---|---|---|
| SiO$_2$ | 59.90 | 56.85 | 54.76 | 57.72 | 60.07 | 59.40 |
| Al$_2$O$_3$ | 16.54 | 15.70 | 15.12 | 16.67 | 17.56 | 17.25 |
| Fe$_2$O$_3$ | 0.24 | 0.23 | 0.22 | 0.22 | 0.22 | 0.25 |
| CaO | 5.38 | 5.10 | 4.92 | 4.63 | 4.65 | 5.78 |
| MgO | 11.55 | 10.96 | 10.56 | 9.94 | 9.97 | 10.78 |
| Na$_2$O | 0.05 | 0.04 | 0.04 | 0.06 | 0.07 | 0.05 |
| K$_2$O | 0.10 | 0.09 | 0.09 | 0.11 | 0.12 | 0.10 |
| Sc$_2$O$_3$ | 0.00 | 0.00 | 0.00 | 0.00 | 0.00 | 0.00 |
| Y$_2$O$_3$ | 4.71 | 9.56 | 12.89 | 8.67 | 4.88 | 2.40 |
| La$_2$O$_3$ | 0.00 | 0.00 | 0.00 | 0.00 | 0.00 | 2.40 |
| Nd$_2$O$_3$ | 0.00 | 0.00 | 0.00 | 0.00 | 0.00 | 0.00 |
| TiO$_2$ | 0.50 | 0.48 | 0.46 | 0.43 | 0.39 | 0.52 |
| Li$_2$O | 1.03 | 0.98 | 0.94 | 1.55 | 2.08 | 1.06 |
| SO$_3$ | 0.00 | 0.00 | 0.00 | 0.00 | 0.00 | 0.01 |
| ZrO$_2$ | 0.00 | 0.00 | 0.00 | 0.00 | 0.00 | 0.00 |
| B$_2$O$_3$ | 0.00 | 0.00 | 0.00 | 0.00 | 0.00 | 0.00 |
| | | | | | | |
| TOTAL | 100.00 | 100.00 | 100.00 | 100.00 | 100.00 | 100.01 |
| T$_L$ (° C.) | 1252 | 1223 | 1225 | 1201 | 1216 | 1240 |
| T$_F$ (° C.) | 1273 | 1247 | 1232 | 1252 | 1262 | 1273 |
| ΔT (° C.) | 21 | 24 | 7 | 51 | 46 | 33 |
| T$_m$ (° C.) | 1464 | 1427 | 1403 | 1441 | 1465 | 1467 |
| Fiber Density (g/cm$^3$) | 2.65 | 2.74 | 2.81 | 2.71 | | |
| Fiber Modulus (GPa) | 93.8 | 96.4 | 97.6 | 95.3 | | |
| Fiber Strength (MPa) | | | | 5013 | | |
| Fiber Failure Strain (%) | | | | 5.3 | | |
| Specific Fiber Modulus (×10$^6$ m) | 3.6 | 3.6 | 3.5 | 3.6 | | |
| Specific Fiber Strength (×10$^5$ m) | | | | 1.8 | | |

| | 55 | 56 | 57 | 58 | 59 | 60 |
|---|---|---|---|---|---|---|
| SiO$_2$ | 59.40 | 60.03 | 60.03 | 60.16 | 60.16 | 59.43 |
| Al$_2$O$_3$ | 17.25 | 17.40 | 17.40 | 18.32 | 18.32 | 18.10 |
| Fe$_2$O$_3$ | 0.25 | 0.26 | 0.26 | 0.28 | 0.28 | 0.27 |
| CaO | 5.78 | 5.93 | 5.93 | 5.43 | 5.43 | 5.36 |
| MgO | 10.78 | 10.83 | 10.83 | 10.19 | 10.19 | 10.07 |
| Na$_2$O | 0.05 | 0.04 | 0.04 | 0.04 | 0.04 | 0.04 |
| K$_2$O | 0.10 | 0.10 | 0.10 | 0.11 | 0.11 | 0.10 |
| Sc$_2$O$_3$ | 0.00 | 0.00 | 0.00 | 0.00 | 0.00 | 0.00 |
| Y$_2$O$_3$ | 0.00 | 2.02 | 0.00 | 4.09 | 0.00 | 0.00 |
| La$_2$O$_3$ | 4.79 | 2.02 | 4.03 | 0.00 | 4.09 | 5.25 |
| Nd$_2$O$_3$ | 0.00 | 0.00 | 0.00 | 0.00 | 0.00 | 0.00 |
| TiO$_2$ | 0.52 | 0.57 | 0.57 | 0.61 | 0.61 | 0.60 |
| Li$_2$O | 1.06 | 0.81 | 0.81 | 0.79 | 0.79 | 0.78 |
| SO$_3$ | 0.01 | 0.01 | 0.01 | 0.00 | 0.00 | 0.00 |

TABLE 1-continued

| | | | | | | |
|---|---|---|---|---|---|---|
| ZrO$_2$ | 0.00 | 0.00 | 0.00 | 0.00 | 0.00 | 0.00 |
| B$_2$O$_3$ | 0.00 | 0.00 | 0.00 | 0.00 | 0.00 | 0.00 |
| TOTAL | 100.00 | 100.01 | 100.00 | 100.00 | 100.00 | 100.00 |
| T$_L$ (° C.) | 1245 | 1240 | 1245 | 1233 | 1233 | 1227 |
| T$_F$ (° C.) | 1275 | 1288 | 1290 | 1305 | 1302 | 1298 |
| ΔT (° C.) | 30 | 48 | 45 | 71 | 69 | 71 |
| T$_m$ (° C.) | 1473 | 1483 | 1487 | 1503 | 1503 | 1495 |
| Fiber Density (g/cm$^3$) | | 2.64 | 2.64 | 2.63 | 2.63 | 2.65 |
| Fiber Modulus (GPa) | | 93.1 | 92.9 | 92.8 | 91.4 | 91.6 |
| Fiber Strength (MPa) | | | | 5368 | | |
| Fiber Failure Strain (%) | | | | 5.8 | | |
| Specific Fiber Modulus (×10$^6$ m) | | 3.60 | | 3.6 | | |
| Specific Fiber Strength (×10$^5$ m) | | | | 2.1 | | |

| | 61 | 62 | 63 | 64 | 65 | 66 |
|---|---|---|---|---|---|---|
| SiO$_2$ | 59.99 | 60.51 | 60.39 | 60.20 | 59.60 | 58.69 |
| Al$_2$O$_3$ | 17.86 | 15.46 | 15.43 | 15.39 | 15.23 | 15.00 |
| Fe$_2$O$_3$ | 0.27 | 0.26 | 0.26 | 0.26 | 0.25 | 0.25 |
| CaO | 4.49 | 14.49 | 14.46 | 14.42 | 14.27 | 14.05 |
| MgO | 9.92 | 8.17 | 8.15 | 8.13 | 8.05 | 7.93 |
| Na$_2$O | 0.04 | 0.03 | 0.03 | 0.03 | 0.03 | 0.03 |
| K$_2$O | 0.10 | 0.09 | 0.09 | 0.09 | 0.09 | 0.09 |
| Sc$_2$O$_3$ | 0.00 | 0.00 | 0.00 | 0.00 | 0.00 | 0.00 |
| Y$_2$O$_3$ | 0.00 | 0.00 | 0.20 | 0.50 | 1.50 | 3.00 |
| La$_2$O$_3$ | 5.97 | 0.00 | 0.00 | 0.00 | 0.00 | 0.00 |
| Nd$_2$O$_3$ | 0.00 | 0.00 | 0.00 | 0.00 | 0.00 | 0.00 |
| TiO$_2$ | 0.59 | 0.55 | 0.54 | 0.54 | 0.54 | 0.53 |
| Li$_2$O | 0.77 | 0.43 | 0.43 | 0.43 | 0.43 | 0.42 |
| SO$_3$ | 0.00 | 0.01 | 0.01 | 0.01 | 0.01 | 0.01 |
| ZrO$_2$ | 0.00 | 0.00 | 0.00 | 0.00 | 0.00 | 0.00 |
| B$_2$O$_3$ | 0.00 | 0.00 | 0.00 | 0.00 | 0.00 | 0.00 |
| TOTAL | 100.00 | 99.99 | 99.99 | 99.99 | 99.99 | 99.99 |
| T$_L$ (° C.) | 1240 | 1205 | 1208 | 1200 | 1202 | 1209 |
| T$_F$ (° C.) | 1316 | 1273 | 1268 | 1271 | 1269 | 1256 |
| ΔT (° C.) | 76 | 68 | 60 | 71 | 67 | 47 |
| T$_m$ (° C.) | 1518 | 1468 | 1462 | 1465 | 1459 | 1440 |
| Fiber Density (g/cm$^3$) | 2.65 | 2.63 | | | | |
| Fiber Modulus (GPa) | 91.8 | 89.5 | | | | |
| Fiber Strength (MPa) | | | | | | |
| Fiber Failure Strain (%) | | | | | | |
| Specific Fiber Modulus (×10$^6$ m) | 3.5 | | | | | |
| Specific Fiber Strength (×10$^5$ m) | | | | | | |

| | 67 | 68 | 69 | 70 | 71 | 72 |
|---|---|---|---|---|---|---|
| SiO$_2$ | 58.08 | 57.48 | 56.27 | 60.39 | 60.20 | 59.60 |
| Al$_2$O$_3$ | 14.84 | 14.69 | 14.38 | 15.43 | 15.39 | 15.23 |
| Fe$_2$O$_3$ | 0.25 | 0.24 | 0.24 | 0.26 | 0.26 | 0.25 |
| CaO | 13.91 | 13.76 | 13.47 | 14.46 | 14.42 | 14.27 |
| MgO | 7.84 | 7.76 | 7.60 | 8.15 | 8.13 | 8.05 |
| Na$_2$O | 0.03 | 0.03 | 0.03 | 0.03 | 0.03 | 0.03 |
| K$_2$O | 0.09 | 0.09 | 0.09 | 0.09 | 0.09 | 0.09 |
| Sc$_2$O$_3$ | 0.00 | 0.00 | 0.00 | 0.00 | 0.00 | 0.00 |
| Y$_2$O$_3$ | 4.00 | 5.00 | 7.00 | 0.00 | 0.00 | 0.00 |
| La$_2$O$_3$ | 0.00 | 0.00 | 0.00 | 0.20 | 0.50 | 1.50 |
| Nd$_2$O$_3$ | 0.00 | 0.00 | 0.00 | 0.00 | 0.00 | 0.00 |
| TiO$_2$ | 0.52 | 0.52 | 0.51 | 0.54 | 0.54 | 0.54 |
| Li$_2$O | 0.42 | 0.41 | 0.40 | 0.43 | 0.43 | 0.43 |

TABLE 1-continued

|  |  |  |  |  |  |  |
|---|---|---|---|---|---|---|
| $SO_3$ | 0.01 | 0.01 | 0.01 | 0.01 | 0.01 | 0.01 |
| $ZrO_2$ | 0.00 | 0.00 | 0.00 | 0.00 | 0.00 | 0.00 |
| $B_2O_3$ | 0.00 | 0.00 | 0.00 | 0.00 | 0.00 | 0.00 |
| TOTAL | 99.99 | 100.00 | 100.00 | 99.99 | 99.99 | 99.99 |
| $T_L$ (° C.) | 1206 | 1208 | 1212 | 1207 | 1205 | 1204 |
| $T_F$ (° C.) | 1260 | 1255 | 1244 | 1265 | 1265 | 1259 |
| $\Delta T$ (° C.) | 54 | 47 | 32 | 58 | 60 | 55 |
| $T_m$ (° C.) | 1444 | 1463 | 1480 | 1456 | 1457 | 1447 |
| Fiber Density ($g/cm^3$) |  |  |  |  |  |  |
| Fiber Modulus (GPa) |  |  |  |  |  |  |
| Fiber Strength (MPa) |  |  |  |  |  |  |
| Fiber Failure Strain (%) |  |  |  |  |  |  |
| Specific Fiber Modulus ($\times 10^6$ m) |  |  |  |  |  |  |
| Specific Fiber Strength ($\times 10^5$ m) |  |  |  |  |  |  |

|  | 73 | 74 | 75 | 76 | 77 | 78 | 79 | 80 |
|---|---|---|---|---|---|---|---|---|
| $SiO_2$ | 58.69 | 58.08 | 57.48 | 56.27 | 60.72 | 60.81 | 58.91 | 58.91 |
| $Al_2O_3$ | 15.00 | 14.84 | 14.69 | 14.38 | 15.57 | 13.01 | 16.95 | 16.95 |
| $Fe_2O_3$ | 0.25 | 0.25 | 0.24 | 0.24 | 0.27 | 0.23 | 0.25 | 0.25 |
| CaO | 14.05 | 13.91 | 13.76 | 13.47 | 22.52 | 19.17 | 4.35 | 4.35 |
| MgO | 7.93 | 7.84 | 7.76 | 7.60 | 0.19 | 0.16 | 10.49 | 10.49 |
| $Na_2O$ | 0.03 | 0.03 | 0.03 | 0.03 | 0.01 | 0.01 | 0.04 | 0.04 |
| $K_2O$ | 0.09 | 0.09 | 0.09 | 0.09 | 0.08 | 0.07 | 0.10 | 0.10 |
| $Sc_2O_3$ | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 6.01 | 3.98 | 0.00 |
| $La_2O_3$ | 3.00 | 4.00 | 5.00 | 7.00 | 0.00 | 0.00 | 0.00 | 3.98 |
| $Nd_2O_3$ | 0.00 | 0.00 | 0.00 | 0.00 | 0.00 | 0.00 | 0.00 | 0.00 |
| $TiO_2$ | 0.53 | 0.52 | 0.52 | 0.51 | 0.63 | 0.53 | 2.09 | 2.09 |
| $Li_2O$ | 0.42 | 0.42 | 0.41 | 0.40 | 0.00 | 0.00 | 0.78 | 0.78 |
| $SO_3$ | 0.01 | 0.01 | 0.01 | 0.01 | 0.00 | 0.00 | 0.00 | 0.00 |
| $ZrO_2$ | 0.00 | 0.00 | 0.00 | 0.00 | 0.00 | 0.00 | 2.05 | 2.05 |
| $B_2O_3$ | 0.00 | 0.00 | 0.00 | 0.00 | 0.00 | 0.00 | 0.00 | 0.00 |
| TOTAL | 99.99 | 99.99 | 100.00 | 100.00 | 100.00 | 100.00 | 100.00 | 100.00 |
| $T_L$ (° C.) | 1202 | 1199 | 1196 |  | 1231 | 1272 |  |  |
| $T_F$ (° C.) | 1253 | 1248 | 1245 |  | 1325 | 1346 | 1297 | 1298 |
| $\Delta T$ (° C.) | 51 | 49 | 49 |  | 94 | 74 |  |  |
| $T_m$ (° C.) | 1440 | 1432 | 1427 |  | 1528 | 1543 | 1491 | 1496 |
| $T_{soft}$ (° C.) |  |  |  |  | 943 | 962 | 912 | 904 |
| $T_g$ (° C.6) |  |  |  |  |  |  | 722 | 716 |
| CTE ($10^{-6}/$° C.) |  |  |  |  |  |  | 4.11 | 4.13 |
| Fiber Density ($g/cm^3$) |  |  |  |  | 2.62 | 2.68 | 2.66 | 2.66 |
| Fiber Modulus (GPa) |  |  |  |  | 82.0 | 83.7 | 93.8 | 92.4 |
| Fiber Strength (MPa) |  |  |  |  | 3948 | 4029 |  |  |
| Fiber Failure Strain (%) |  |  |  |  | 4.8 | 4.8 |  |  |
| Specific Fiber Modulus ($\times 10^6$ m) |  |  |  |  | 3.2 | 3.2 | 3.6 | 3.5 |
| Specific Fiber Strength ($\times 10^5$ m) |  |  |  |  | 1.5 | 1.5 |  |  |

|  | 81 | 82 | 83 | 84 | 85 | 86 | 87 | 88 | 89 |
|---|---|---|---|---|---|---|---|---|---|
| $SiO_2$ | 61.43 | 59.81 | 59.04 | 58.66 | 57.41 | 58.17 | 54.56 | 56.41 | 51.18 |
| $Al_2O_3$ | 15.14 | 14.74 | 14.55 | 14.45 | 14.15 | 14.33 | 13.44 | 13.90 | 12.61 |
| $Fe_2O_3$ | 0.26 | 0.26 | 0.25 | 0.25 | 0.25 | 0.25 | 0.23 | 0.24 | 0.22 |
| CaO | 14.70 | 12.52 | 11.46 | 10.95 | 10.72 | 12.17 | 9.36 | 11.80 | 8.78 |
| MgO | 7.98 | 7.77 | 7.67 | 7.62 | 7.45 | 7.55 | 7.08 | 7.32 | 6.65 |
| $Na_2O$ | 0.00 | 0.00 | 0.00 | 0.00 | 0.00 | 0.00 | 0.00 | 0.00 | 0.00 |
| $K_2O$ | 0.00 | 0.00 | 0.00 | 0.00 | 0.00 | 0.00 | 0.00 | 0.00 | 0.00 |
| $Sc_2O_3$ | 0.00 | 4.43 | 6.56 | 7.60 | 9.56 | 0.00 | 0.00 | 0.00 | 0.00 |
| $Y_2O_3$ | 0.00 | 0.00 | 0.00 | 0.00 | 0.00 | 7.05 | 14.88 | 0.00 | 0.00 |
| $La_2O_3$ | 0.00 | 0.00 | 0.00 | 0.00 | 0.00 | 0.00 | 0.00 | 9.87 | 20.15 |
| $Nd_2O_3$ | 0.00 | 0.00 | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 | 0.00 | 0.00 |
| $Li_2O$ | 0.49 | 0.48 | 0.47 | 0.47 | 0.46 | 0.47 | 0.44 | 0.45 | 0.41 |

TABLE 1-continued

| | | | | | | | | | |
|---|---|---|---|---|---|---|---|---|---|
| SO₃ | 0.00 | 0.00 | 0.00 | 0.00 | 0.00 | 0.00 | 0.00 | 0.00 | 0.00 |
| ZrO₂ | 0.00 | 0.00 | 0.00 | 0.00 | 0.00 | 0.00 | 0.00 | 0.00 | 0.00 |
| B₂O₃ | 0.00 | 0.00 | 0.00 | 0.00 | 0.00 | 0.00 | 0.00 | 0.00 | 0.00 |
| TOTAL | 100.0 | 100.0 | 100.0 | 100.0 | 100.0 | 100.0 | 100.0 | 100.0 | 100.0 |
| $T_L$ (° C.) | 1199 | 1337 | 1434 | 1462 | 1516 | 1204 | 1294 | 1184 | 1158 |
| $T_F$ (° C.) | 1296 | 1285 | 1284 | 1307 | 1348 | 1280 | 1260 | 1266 | 1237 |
| ΔT (° C.) | 97 | −52 | −150 | −155 | −168 | 76 | −34 | 82 | 79 |
| $T_m$ (° C.) | 1495 | 1471 | 1458 | 1447 | 1449 | 1464 | 1426 | 1450 | 1406 |
| $T_{soft}$ (° C.) | 898 | 917 | 920 | 925 | 931 | 911 | 922 | 899 | 903 |
| $T_g$ (° C.) | 717 | 740 | 750 | 759 | 757 | 734 | 748 | 721 | 729 |
| CTE (10⁻⁶/° C.) | 4.63 | 4.61 | 4.54 | 4.54 | 4.44 | | | | |
| Fiber Density (g/cm³) | 2.60 | 2.64 | | | | 2.70 | | 2.78 | |
| Fiber Modulus (GPa) | 89.4 | 92.4 | | | | 91.6 | | 90.8 | |
| Fiber Strength (MPa) | | | | | | | | | |
| Fiber Failure Strain (%) | | | | | | | | | |
| Specific Fiber Modulus (×10⁶ m) | 3.5 | 3.6 | | | | 3.5 | | 3.3 | |
| Specific Fiber Strength (×10⁵ m) | | | | | | | | | |

| | 90 | 91 | 92 | 93 |
|---|---|---|---|---|
| SiO₂ | 63.08 | 65.03 | 65.03 | 64.49 |
| Al₂O₃ | 16.16 | 15.35 | 15.35 | 14.61 |
| Fe₂O₃ | 0.24 | 0.23 | 0.23 | 0.19 |
| CaO | 4.40 | 3.37 | 3.37 | 3.00 |
| MgO | 10.63 | 10.86 | 10.86 | 9.67 |
| Na₂O | 0.04 | 0.04 | 0.04 | 0.03 |
| K₂O | 0.09 | 0.09 | 0.09 | 0.08 |
| Sc₂O₃ | 0.00 | 0.00 | 0.00 | 0.00 |
| Y₂O₃ | 0.00 | 0.00 | 3.68 | 0.00 |
| La₂O₃ | 4.04 | 3.68 | 0.00 | 4.33 |
| Nd₂O₃ | 0.00 | 0.00 | 0.00 | 0.00 |
| TiO₂ | 0.52 | 0.47 | 0.47 | 0.39 |
| Li₂O | 0.79 | 0.89 | 0.89 | 0.79 |
| SO₃ | 0.00 | 0.00 | 0.00 | 0.00 |
| ZrO₂ | 0.00 | 0.00 | 0.00 | 0.00 |
| B₂O₃ | 0.00 | 0.00 | 0.00 | 0.00 |
| P₂O₅ | 0.00 | 0.00 | 0.00 | 2.42 |
| TOTAL | 100.0 | 100.0 | 100.0 | 100.0 |
| $T_L$ (° C.) | 1267 | | | |
| $T_F$ (° C.) | 1332 | 1355 | 1350 | 1396 |
| ΔT (° C.) | 65 | | | |
| $T_m$ (° C.) | 1542 | 1572 | 1562 | 1619 |
| Fiber Density (g/cm³) | 2.60 | | | 2.55 |
| Fiber Modulus (GPa) | 91.4 | | | 87.7 |
| Fiber Strength (MPa) | | | | |
| Fiber Failure Strain (%) | | | | |
| Specific Fiber Modulus (×10⁶ m) | 3.6 | | | 3.5 |
| Specific Fiber Strength (×10⁵ m) | | | | |

Figure 2:
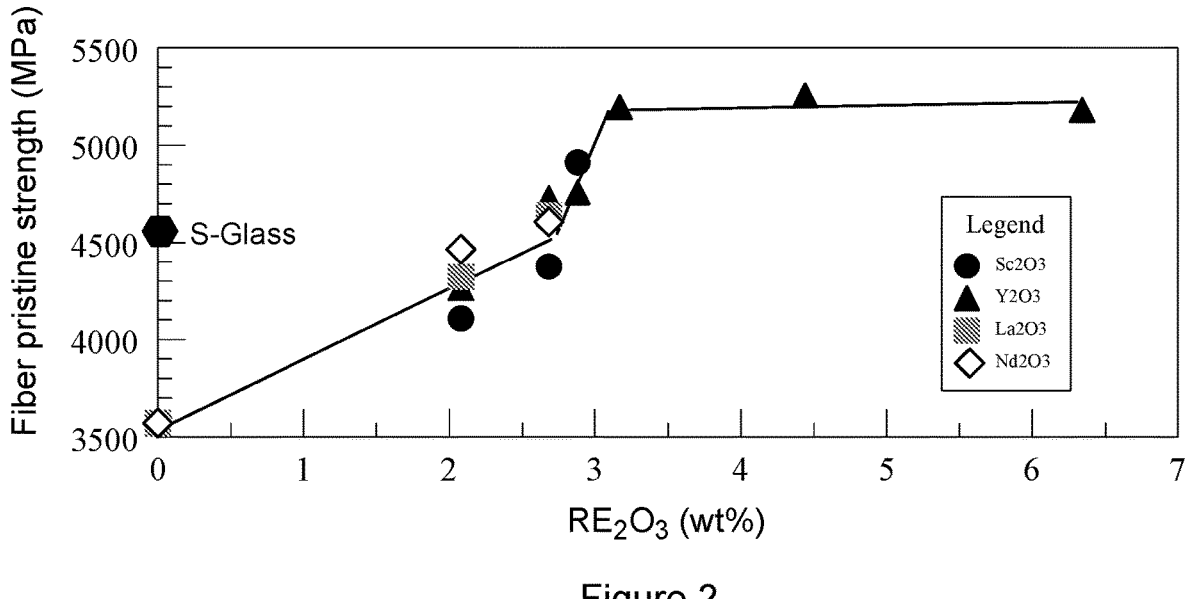
FIG. 2 is a chart showing pristine fiber tensile strength values relative to the amount of rare earth oxides ($RE_2O_3$) in various glass compositions.
Figure 3:
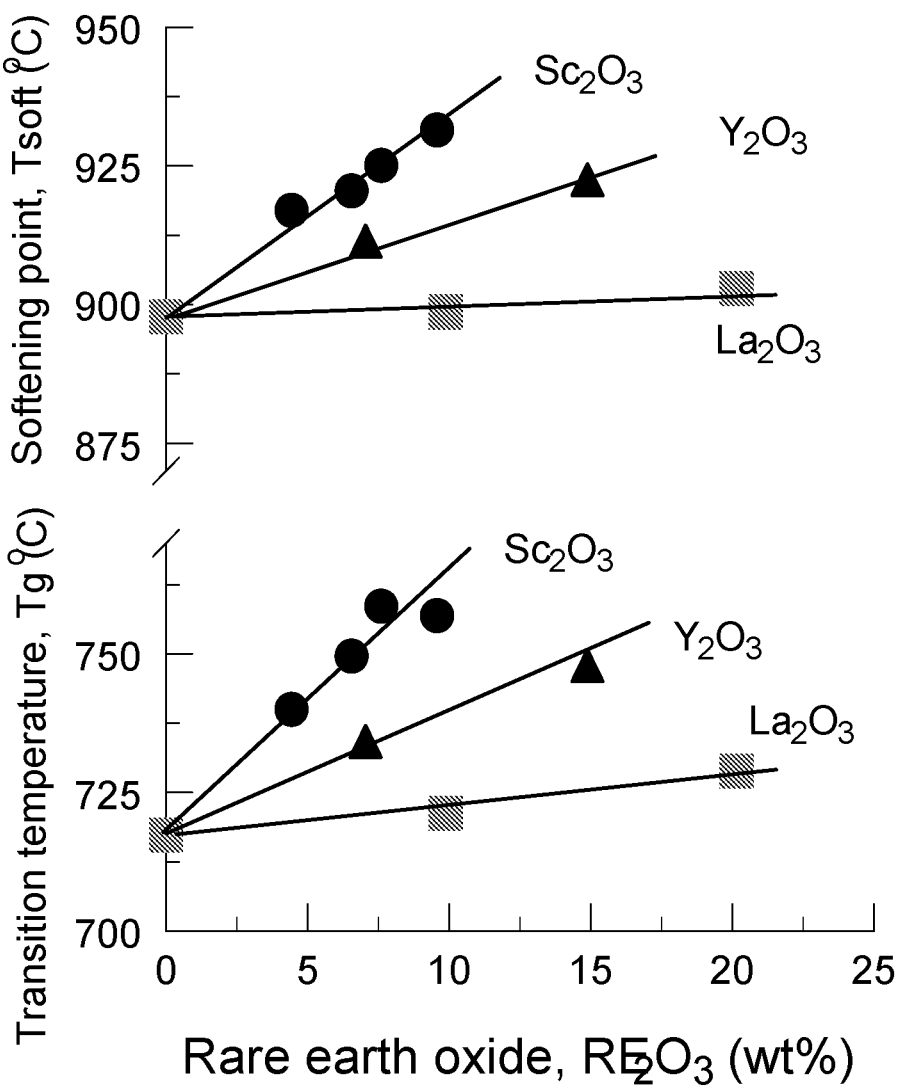
FIG. 3 is a chart showing softening and glass transition temperatures relative to the amount of rare earth oxides ($RE_2O_3$) in various glass compositions.
Figure 4:
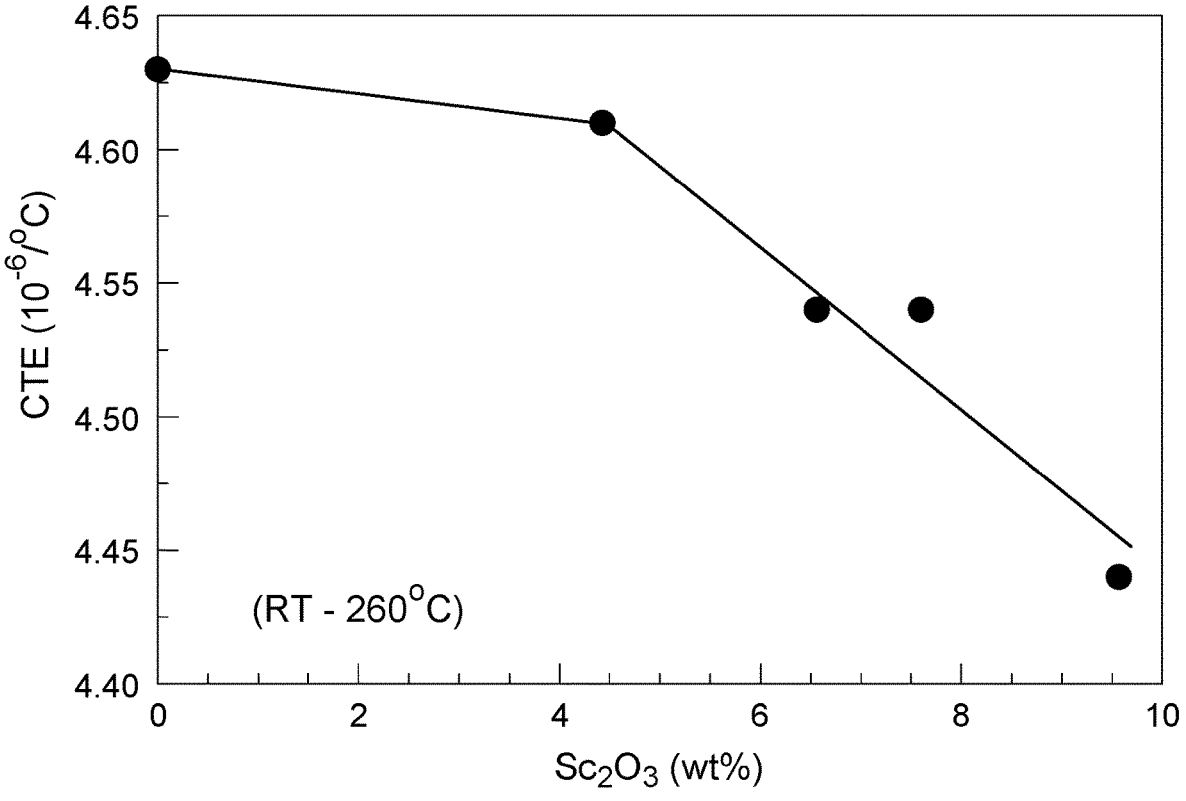
FIG. 4 is a chart showing linear coefficient of thermal expansion relative to the amount of scandium oxide ($Sc_2O_3$) in various glass compositions.

Certain of these data were plotted in FIGS. 1-4. FIG. 1 is a chart showing Young's modulus values relative to the amount of rare earth oxides (RE₂O₃) for the glass compositions in Examples 1-17, 22, and 23. FIG. 2 is a chart showing pristine fiber tensile strength values relative to the amount of rare earth oxides (RE₂O₃) for the glass compositions in Examples 1-17, 22, and 23. FIG. 3 is a chart showing softening and glass transition temperatures relative to the amount of rare earth oxides (RE₂O₃) for the glass compositions of Examples 81-89. FIG. 4 is a chart showing linear coefficient of thermal expansion relative to the amount of scandium oxide (Sc₂O₃) for the glass compositions of Examples 81-89.

TABLE 2

| | 94 | 95 | 96 | 97 | 98 | 99 |
|---|---|---|---|---|---|---|
| SiO₂ | 61.43 | 62.43 | 63.79 | 64.73 | 65.50 | 66.19 |
| Al₂O₃ | 17.40 | 16.96 | 17.33 | 17.59 | 15.91 | 14.41 |
| Fe₂O₃ | 0.28 | 0.27 | 0.27 | 0.27 | 0.25 | 0.23 |
| CaO | 3.71 | 3.61 | 1.54 | 0.11 | 0.12 | 0.13 |
| MgO | 11.96 | 11.66 | 11.88 | 12.04 | 12.76 | 13.41 |
| Na₂O | 0.03 | 0.03 | 0.03 | 0.03 | 0.03 | 0.03 |
| K₂O | 0.10 | 0.09 | 0.09 | 0.09 | 0.08 | 0.08 |
| Sc₂O₃ | 0 | 0 | 0 | 0 | 0 | 0 |
| Y₂O₃ | 0 | 0 | 0 | 0 | 0 | 0 |
| La₂O₃ | 4.05 | 3.95 | 4.03 | 4.09 | 4.34 | 4.56 |

TABLE 2-continued

| | | | | | | |
|---|---|---|---|---|---|---|
| Nd$_2$O$_3$ | 0 | 0 | 0 | 0 | 0 | 0 |
| TiO$_2$ | 0.62 | 0.61 | 0.62 | 0.63 | 0.56 | 0.50 |
| Li$_2$O | 0.41 | 0.40 | 0.41 | 0.42 | 0.44 | 0.47 |
| SO$_3$ | 0 | 0 | 0 | 0 | 0 | 0 |
| ZrO$_2$ | 0 | 0 | 0 | 0 | 0 | 0 |
| B$_2$O$_3$ | 0 | 0 | 0 | 0 | 0 | 0 |
| TOTAL | 100 | 100 | 100 | 100 | 100 | 100 |
| T$_L$ (° C.) | 1276 | 1305 | 1348 | 1378 | 1405 | 1424 |
| T$_F$ (° C.) | 1323 | 1337 | 1388 | 1367 | 1384 | 1379 |
| ΔT (° C.) | 47 | 32 | 40 | −11 | −21 | −45 |
| T$_m$ (° C.) | 1517 | 1536 | 1597 | 1571 | 1592 | 1589 |
| Fiber Density (g/cm$^3$) | | | | | | |
| Fiber Modulus (GPa) | | | | | | |
| Fiber Strength (MPa) | | | | | | |
| Fiber Failure Strain (%) | | | | | | |
| Specific Fiber Modulus (×10$^6$ m) | | | | | | |
| Specific Fiber Strength (×10$^5$ m) | | | | | | |

| | 100 | 101 | 102 | 103 | 104 | 105 |
|---|---|---|---|---|---|---|
| SiO$_2$ | 66.94 | 66.51 | 65.59 | 65.21 | 61.43 | 62.43 |
| Al$_2$O$_3$ | 17.28 | 17.08 | 16.85 | 18.89 | 17.40 | 16.96 |
| Fe$_2$O$_3$ | 0.21 | 0.20 | 0.19 | 0.13 | 0.28 | 0.27 |
| CaO | 0.11 | 0.11 | 0.11 | 0.10 | 3.71 | 3.61 |
| MgO | 10.46 | 10.67 | 10.52 | 7.75 | 11.96 | 11.66 |
| Na$_2$O | 0.07 | 0.08 | 0.08 | 0.14 | 0.03 | 0.03 |
| K$_2$O | 0.11 | 0.11 | 0.11 | 0.15 | 0.10 | 0.09 |
| Sc$_2$O$_3$ | 0 | 0 | 0 | 0 | 0 | 0 |
| Y$_2$O$_3$ | 0 | 0 | 0 | 0 | 4.05 | 3.95 |
| La$_2$O$_3$ | 2.42 | 2.67 | 4.00 | 2.95 | 0 | 0 |
| Nd$_2$O$_3$ | 0 | 0 | 0 | 0 | 0 | 0 |
| TiO$_2$ | 0.39 | 0.35 | 0.34 | 0.08 | 0.62 | 0.61 |
| Li$_2$O | 2.02 | 2.23 | 2.20 | 4.59 | 0.41 | 0.40 |
| SO$_3$ | 0 | 0 | 0 | 0 | 0 | 0 |
| ZrO$_2$ | 0 | 0 | 0 | 0 | 0 | 0 |
| B$_2$O$_3$ | 0 | 0 | 0 | 0 | 0 | 0 |
| TOTAL | 100 | 100 | 100 | 100 | 100 | 100 |
| T$_L$ (° C.) | 1254 | 1265 | | | 1285 | 1310 |
| T$_F$ (° C.) | 1377 | 1362 | | | 1321 | 1334 |
| ΔT (° C.) | 123 | 97 | | | 36 | 24 |
| T$_m$ (° C.) | 1605 | 1590 | | | 1515 | 1532 |
| Fiber Density (g/cm$^3$) | 2.49 | 2.49 | | | | |
| Fiber Modulus (GPa) | | | | | | |
| Fiber Strength (MPa) | 5262 | 5335 | | | | |
| Fiber Failure Strain (%) | | | | | | |
| Specific Fiber Modulus (×10$^6$ m) | | | | | | |
| Specific Fiber Strength (×10$^5$ m) | 2.2 | 2.2 | | | | |

| | 106 | 107 | 108 | 109 | 110 | 111 |
|---|---|---|---|---|---|---|
| SiO$_2$ | 63.79 | 64.73 | 65.50 | 66.19 | 66.94 | 66.51 |
| Al$_2$O$_3$ | 17.33 | 17.59 | 15.91 | 14.41 | 17.28 | 17.08 |
| Fe$_2$O$_3$ | 0.27 | 0.27 | 0.25 | 0.23 | 0.21 | 0.20 |
| CaO | 1.54 | 0.11 | 0.12 | 0.13 | 0.11 | 0.11 |
| MgO | 11.88 | 12.04 | 12.76 | 13.41 | 10.46 | 10.67 |
| Na$_2$O | 0.03 | 0.03 | 0.03 | 0.03 | 0.07 | 0.08 |
| K$_2$O | 0.09 | 0.09 | 0.08 | 0.08 | 0.11 | 0.11 |
| Sc$_2$O$_3$ | 0 | 0 | 0 | 0 | 0 | 0 |

TABLE 2-continued

| | | | | | | |
|---|---|---|---|---|---|---|
| Y$_2$O$_3$ | 4.03 | 4.09 | 4.34 | 4.56 | 2.42 | 2.67 |
| La$_2$O$_3$ | 0 | 0 | 0 | 0 | 0 | 0 |
| Nd$_2$O$_3$ | 0 | 0 | 0 | 0 | 0 | 0 |
| TiO$_2$ | 0.62 | 0.63 | 0.56 | 0.50 | 0.39 | 0.35 |
| Li$_2$O | 0.41 | 0.42 | 0.44 | 0.47 | 2.02 | 2.23 |
| SO$_3$ | 0 | 0 | 0 | 0 | 0 | 0 |
| ZrO$_2$ | 0 | 0 | 0 | 0 | 0 | 0 |
| B$_2$O$_3$ | 0 | 0 | 0 | 0 | 0 | 0 |
| TOTAL | 100 | 100 | 100 | 100 | 100 | 100 |
| T$_L$ (° C.) | 1361 | 1391 | 1412 | 1440 | 1270 | 1261 |
| T$_F$ (° C.) | 1366 | 1385 | 1381 | 1375 | 1374 | 1358 |
| ΔT (° C.) | 5 | −6 | −31 | −65 | 104 | 97 |
| T$_m$ (° C.) | 1568 | 1590 | 1585 | 1581 | 1599 | 1582 |
| Fiber Density (g/cm$^3$) | | | | | | 2.49 |
| Fiber Modulus (GPa) | | | | | | |
| Fiber Strength (MPa) | | | | | | 5291 |
| Fiber Failure Strain (%) | | | | | | |
| Specific Fiber Modulus (×10$^6$ m) | | | | | | |
| Specific Fiber Strength (×10$^5$ m) | | | | | | 2.2 |

| | 112 | 113 | 114 | 115 | 116 | 117 |
|---|---|---|---|---|---|---|
| SiO$_2$ | 65.59 | 65.21 | 60.52 | 60.52 | 60.52 | 60.52 |
| Al$_2$O$_3$ | 16.85 | 18.89 | 17.76 | 17.76 | 17.76 | 17.76 |
| Fe$_2$O$_3$ | 0.19 | 0.13 | 0.28 | 0.28 | 0.28 | 0.28 |
| CaO | 0.11 | 0.10 | 4.99 | 4.99 | 4.99 | 4.99 |
| MgO | 10.52 | 7.75 | 10.74 | 10.74 | 10.74 | 10.74 |
| Na$_2$O | 0.08 | 0.14 | 0.03 | 0.03 | 0.03 | 0.03 |
| K$_2$O | 0.11 | 0.15 | 0.10 | 0.10 | 0.10 | 0.10 |
| Sc$_2$O$_3$ | 0 | 0 | 0 | 0 | 0 | 0 |
| Y$_2$O$_3$ | 4.00 | 2.95 | 4.22 | 4.22 | 0 | 0 |
| La$_2$O$_3$ | 0 | 0 | 0 | 0 | 4.22 | 4.22 |
| Nd$_2$O$_3$ | 0 | 0 | 0 | 0 | 0 | 0 |
| TiO$_2$ | 0.34 | 0.08 | 0.63 | 0.63 | 0.63 | 0.63 |
| Li$_2$O | 2.20 | 4.59 | 0.50 | 0.50 | 0.50 | 0.50 |
| SO$_3$ | 0 | 0 | 0 | 0 | 0 | 0 |
| ZrO$_2$ | 0 | 0 | 0 | 0 | 0 | 0 |
| B$_2$O$_3$ | 0 | 0 | 0 | 0 | 0 | 0 |
| ZnO | 0 | 0 | 3.22 | 0 | 3.22 | 0 |
| SnO$_2$ | 0 | 0 | 0 | 3.22 | 0 | 3.22 |
| CeO$_2$ | 0 | 0 | 0 | 0 | 0 | 4.09 |
| TOTAL | 100 | 100 | 100 | 100 | 100 | 100 |
| T$_L$ (° C.) | 1254 | 1293 | | | | |
| T$_F$ (° C.) | 1347 | 1313 | | | | |
| ΔT (° C.) | 93 | 20 | | | | |
| T$_m$ (° C.) | 1568 | 1547 | | | | |
| Fiber Density (g/cm$^3$) | 2.49 | | | | | |
| Fiber Modulus (GPa) | | | | | | |
| Fiber Strength (MPa) | 5284 | | | | | |
| Fiber Failure Strain (%) | | | | | | |
| Specific Fiber Modulus (×10$^6$ m) | | | | | | |
| Specific Fiber Strength (×10$^5$ m) | 2.2 | | | | | |

| | 118 | 119 | 120 | 121 | 122 | 123 |
|---|---|---|---|---|---|---|
| SiO$_2$ | 60.52 | 60.34 | 57.31 | 60.48 | 60.48 | 60.48 |
| Al$_2$O$_3$ | 17.76 | 11.16 | 10.60 | 17.67 | 17.67 | 17.67 |
| Fe$_2$O$_3$ | 0.28 | 0.22 | 0.21 | 0.26 | 0.26 | 0.26 |

TABLE 2-continued

| | | | | | | |
|---|---|---|---|---|---|---|
| CaO | 4.99 | 11.86 | 11.26 | 4.95 | 4.95 | 4.95 |
| MgO | 10.74 | 15.88 | 15.08 | 10.64 | 10.64 | 10.64 |
| $Na_2O$ | 0.03 | 0.01 | 0.01 | 0.04 | 0.04 | 0.04 |
| $K_2O$ | 0.10 | 0.07 | 0.06 | 0.10 | 0.10 | 0.10 |
| $Sc_2O_3$ | 0 | 0 | 0 | 0 | 0 | 0 |
| $Y_2O_3$ | 0 | 0 | 0 | 0 | 0 | 0 |
| $La_2O_3$ | 0 | 0 | 5.05 | 0 | 0 | 0 |
| $Nd_2O_3$ | 4.22 | 0 | 0 | 0 | 0 | 0 |
| $Sm_2O_3$ | 0 | 0 | 0 | 0 | 4.34 | 0 |
| $Gd_2O_3$ | 0 | 0 | 0 | 0 | 0 | 4.34 |
| $TiO_2$ | 0.63 | 0.44 | 0.42 | 0.56 | 0.56 | 0.56 |
| $Li_2O$ | 0.50 | 0 | 0 | 0.95 | 0.95 | 0.95 |
| $SO_3$ | 0 | 0.01 | 0 | 0 | 0 | 0 |
| $ZrO_2$ | 0 | 0 | 0 | 0 | 0 | 0 |
| $B_2O_3$ | 0 | 0 | 0 | 0 | 0 | 0 |
| ZnO | 0 | 0 | 0 | 0 | 0 | 0 |
| $SnO_2$ | 3.32 | 0 | 0 | 0 | 0 | 0 |
| $CeO_2$ | 0 | 0 | 0 | 4.34 | 0 | 0 |
| $Nb_2O_5$ | 0 | 0 | 0 | 0 | 0 | 0 |
| TOTAL | 100 | 100 | 100 | 100 | 100 | 100 |
| $T_L$ (° C.) | | | | | | |
| $T_F$ (° C.) | | | | | | |
| $\Delta T$ (° C.) | | | | | | |
| $T_m$ (° C.) | | | | | | |
| Fiber Density ($g/cm^3$) | | | | | | |
| Fiber Modulus (GPa) | | | | | | |
| Fiber Strength (MPa) | | | | | | |
| Fiber Failure Strain (%) | | | | | | |
| Specific Fiber Modulus ($\times 10^6$ m) | | | | | | |
| Specific Fiber Strength ($\times 10^5$ m) | | | | | | |

| | 124 |
|---|---|
| $SiO_2$ | 60.48 |
| $Al_2O_3$ | 17.67 |
| $Fe_2O_3$ | 0.26 |
| CaO | 4.95 |
| MgO | 10.64 |
| $Na_2O$ | 0.04 |
| $K_2O$ | 0.10 |
| $Sc_2O_3$ | 0 |
| $Y_2O_3$ | 0 |
| $La_2O_3$ | 0 |
| $Nd_2O_3$ | 0 |
| $Sm_2O_3$ | 0 |
| $Gd_2O_3$ | 0 |
| $TiO_2$ | 0.56 |
| $Li_2O$ | 0.95 |
| $SO_3$ | 0 |
| $ZrO_2$ | 0 |
| $B_2O_3$ | 0 |
| ZnO | 0 |
| $SnO_2$ | 0 |
| $CeO_2$ | 0 |
| $Nb_2O_5$ | 4.34 |
| TOTAL | 100 |
| $T_L$ (° C.) | |
| $T_F$ (° C.) | |
| $\Delta T$ (° C.) | |
| $T_m$ (° C.) | |
| Fiber Density ($g/cm^3$) | |
| Fiber Modulus (GPa) | |
| Fiber Strength (MPa) | |

TABLE 2-continued

| | |
|---|---|
| Fiber Failure Strain (%) | |
| Specific Fiber Modulus ($\times 10^6$ m) | |
| Specific Fiber Strength ($\times 10^5$ m) | |

TABLE 3

| | 125 | 126 | 127 | 128 | 129 | 130 |
|---|---|---|---|---|---|---|
| $SiO_2$ | 61.42 | 60.85 | 60.07 | 61.02 | 61.28 | 60.18 |
| $Al_2O_3$ | 17.85 | 17.62 | 17.52 | 17.80 | 17.87 | 16.77 |
| $Fe_2O_3$ | 0.37 | 0.37 | 0.37 | 0.38 | 0.38 | 0.37 |
| CaO | 5.42 | 5.64 | 5.92 | 6.00 | 6.01 | 7.18 |
| MgO | 8.81 | 9.18 | 9.63 | 8.22 | 6.29 | 8.05 |
| $Na_2O$ | 0.04 | 0.05 | 0.04 | 0.04 | 0.04 | 0.04 |
| $K_2O$ | 0.11 | 0.10 | 0.10 | 0.11 | 0.11 | 0.10 |
| $Y_2O_3$ | 4.45 | 4.64 | 4.87 | 4.94 | 4.96 | 4.93 |
| $TiO_2$ | 0.56 | 0.55 | 0.56 | 0.57 | 2.13 | 1.36 |
| $Li_2O$ | 0.96 | 1.00 | 0.91 | 0.93 | 0.93 | 1.01 |
| $Cu_2O$ | 0.00 | 0.00 | 0.00 | 0.00 | 0.00 | 0.00 |
| SrO | 0.00 | 0.00 | 0.00 | 0.00 | 0.00 | 0.00 |
| TOTAL | 100.0 | 100.0 | 100.0 | 100.0 | 100.0 | 100.0 |
| $T_L$ (° C.) | 1188 | 1188 | 1200 | 1185 | 1208 | 1154 |
| $T_F$ (° C.) | 1319 | 1307 | 1297 | 1320 | 1338 | 1294 |
| $\Delta T$ (° C.) | 131 | 119 | 97 | 135 | 130 | 140 |
| $T_m$ (° C.) | 1522 | 1508 | 1494 | 1521 | 1549 | 1493 |
| Fiber Density ($g/cm^3$) | 2.61 | 2.62 | 2.63 | 2.62 | 2.61 | |
| Fiber Modulus (GPa) | 92.3 | 92.0 | 92.8 | 91.9 | 90.0 | |
| Fiber Strength (MPa) | 5490 | 5492 | 5340 | 5467 | | |
| Fiber Failure Strain (%) | 5.9 | 6.0 | 5.8 | 5.9 | | |
| Specific Fiber Modulus ($\times 10^6$ m) | 3.6 | 3.6 | 3.6 | 3.6 | 3.5 | |
| Specific Fiber Strength ($\times 10^5$ m) | 2.2 | 2.1 | 2.1 | 2.1 | 0.0 | |

| | 131 | 132 | 133 | 134 | 135 | 136 |
|---|---|---|---|---|---|---|
| $SiO_2$ | 61.28 | 60.18 | 60.83 | 60.12 | 59.78 | 61.00 |
| $Al_2O_3$ | 17.87 | 16.77 | 15.23 | 17.84 | 17.99 | 16.75 |
| $Fe_2O_3$ | 0.38 | 0.37 | 0.37 | 0.39 | 0.40 | 0.25 |
| CaO | 6.01 | 7.18 | 7.90 | 5.88 | 5.93 | 4.67 |
| MgO | 6.29 | 8.05 | 8.86 | 9.47 | 9.55 | 10.20 |
| $Na_2O$ | 0.04 | 0.04 | 0.04 | 0.04 | 0.04 | 0.04 |
| $K_2O$ | 0.11 | 0.10 | 0.09 | 0.10 | 0.10 | 0.10 |
| $Y_2O_3$ | 4.96 | 4.93 | 4.50 | 4.80 | 4.84 | 3.25 |
| $TiO_2$ | 0.56 | 0.56 | 1.41 | 0.59 | 0.59 | 0.55 |
| $Li_2O$ | 0.93 | 1.01 | 0.77 | 0.77 | 0.78 | 0.72 |
| $Cu_2O$ | 1.57 | 0.80 | 0.00 | 0.00 | 0.00 | 0.00 |
| SrO | 0.00 | 0.00 | 0.00 | 0.00 | 0.00 | 2.46 |
| TOTAL | 100.0 | 100.0 | 100.0 | 100.0 | 100.0 | 100.0 |
| $T_L$ (° C.) | 1153 | 1167 | 1219 | 1226 | 1201 | 1235 |
| $T_F$ (° C.) | 1336 | 1291 | 1289 | 1307 | 1299 | 1320 |
| $\Delta T$ (° C.) | 183 | 124 | 70 | 81 | 98 | 85 |
| $T_m$ (° C.) | 1547 | 1447 | 1491 | 1501 | 1493 | 1519 |
| Fiber Density ($g/cm^3$) | 2.62 | | 2.64 | | | 2.63 |
| Fiber Modulus (GPa) | 91.1 | | 91.8 | | | 92.6 |
| Fiber Strength (MPa) | 5321 | | 5243 | | | 5583 |
| Fiber Failure Strain (%) | 5.8 | | 5.7 | | | 6.03 |
| Specific Fiber Modulus ($\times 10^6$ m) | 3.5 | | 3.5 | | | 3.6 |
| Specific Fiber Strength ($\times 10^5$ m) | 2.1 | | 2.0 | | | 2.2 |

Desirable characteristics that can be exhibited by various but not necessarily all embodiments of the present invention can include, but are not limited to, the following: the provision of glass fibers, fiber glass strands, glass fiber fabrics, composites, and related products having a relatively low density; the provision of glass fibers, fiber glass strands, glass fiber fabrics, composites, and laminates having a relatively high tensile strength; the provision of glass fibers, fiber glass strands, glass fiber fabrics, composites, and related products having a relatively low density; the provision of glass fibers, fiber glass strands, glass fiber fabrics, composites, and laminates having a relatively high modulus; the provision of glass fibers, fiber glass strands, glass fiber fabrics, composites, and laminates having a relatively high elongation; the provision of glass fibers, fiber glass strands, glass fiber fabrics, prepregs, and other products useful for reinforcement applications; and others.

It is to be understood that the present description illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments disclosed, but is intended to cover modifications that are within the spirit and scope of the invention.

We claim:

1. A glass composition suitable for fiber forming comprising:

| | |
|---|---|
| $SiO_2$ | 56-68 weight percent; |
| $Al_2O_3$ | 11 to less than 18 weight percent; |
| CaO | 5.1 to 12 weight percent; |
| MgO | 7-17 weight percent; |
| $Na_2O$ | 0-0.2 weight percent; |
| $K_2O$ | greater than 0-1 weight percent; |
| $Li_2O$ | 0-5 weight percent; |
| $TiO_2$ | 0-2 weight percent; |
| $B_2O_3$ | 0-3 weight percent; |
| $Fe_2O_3$ | 0-1 weight percent; |
| $SnO_2$ | 0-4 weight percent; |
| ZnO | 0-4 weight percent; | at least one rare earth oxide in an amount not less than 0.05 weight percent; and other constituents 0-11 weight percent total.

2. The glass composition of claim 1, wherein the at least one rare earth oxide is selected from the group consisting of $La_2O_3$, $Y_2O_3$, $Sc_2O_3$, $CeO_2$, $Sm_2O_3$, $Nb_2O_5$, and $Gd_2O_3$.

3. The glass composition of claim 1, wherein $Al_2O_3$ is 14 to less than 18 weight percent.

4. The glass composition of claim 1, wherein MgO is 10-17 weight percent.

5. The glass composition of claim 1, wherein $Na_2O+K_2O$ is greater than 0 to less than 0.5 weight percent.

6. The glass composition of claim 1, wherein the at least one rare earth oxide is at least 3 weight percent.

7. The glass composition of claim 1, wherein ZnO is greater than 0 to 4 weight percent.

8. The glass composition of claim 1, wherein $SnO_2$ is greater than 0 to 4 weight percent.

9. The glass composition of claim 1, wherein $CeO_2$ is greater than 0 to 4 weight percent.

10. The glass composition of claim 1, wherein the glass composition is substantially free of $B_2O_3$.

11. A glass composition suitable for fiber forming comprising:

| | |
|---|---|
| $SiO_2$ | 56-68 weight percent; |
| $Al_2O_3$ | 11 to less than 18 weight percent; |
| CaO | 5.1 to 12 weight percent; |
| MgO | 7-17 weight percent; |
| $Na_2O$ | 0-0.2 weight percent; |
| $K_2O$ | greater than 0-1 weight percent; |
| $Li_2O$ | 0-5 weight percent; |
| $TiO_2$ | 0-2 weight percent; |
| $B_2O_3$ | 0-3 weight percent; |
| $Fe_2O_3$ | 0-1 weight percent; |
| $SnO_2$ | 0-4 weight percent; |
| ZnO | 0-4 weight percent; | at least one rare earth oxide in an amount greater than 3.0 weight percent; and other constituents 0-11 weight percent total.

12. The glass composition of claim 11, wherein the at least one rare earth oxide is selected from the group consisting of $La_2O_3$, $Y_2O_3$, $Sc_2O_3$, $CeO_2$, $Sm_2O_3$, $Nb_2O_5$, and $Gd_2O_3$.

13. The glass composition of claim 11, wherein $Al_2O_3$ is 14 to less than 18 weight percent.

14. The glass composition of claim 11, wherein MgO is 10-17 weight percent.

15. The glass composition of claim 11, wherein $Na_2O+K_2O$ is greater than 0 to less than 0.5 weight percent.

16. The glass composition of claim 11, wherein the at least one rare earth oxide is greater than 3 weight percent and the composition is substantially free of MnO.

17. The glass composition of claim 11, wherein ZnO is greater than 0 to 4 weight percent.

18. The glass composition of claim 11, wherein $SnO_2$ is greater than 0 to 4 weight percent.

19. The glass composition of claim 11, wherein $CeO_2$ is greater than 0 to 4 weight percent.

20. The glass composition of claim 11, wherein the glass composition is substantially free of $B_2O_3$.

* * * * *